(12) United States Patent
Lennon et al.

(10) Patent No.: US 7,099,946 B2
(45) Date of Patent: Aug. 29, 2006

(54) TRANSFERRING A MEDIA BROWSING SESSION FROM ONE DEVICE TO A SECOND DEVICE BY TRANSFERRING A SESSION IDENTIFIER AND A SESSION KEY TO THE SECOND DEVICE

(75) Inventors: Alison Joan Lennon, Balmain (AU); Michael Peter Anderson, Holder (AU); Ernest Yiu Cheong Wan, Carlingford (AU); Sue-Ken Yap, Lane Cove (AU)

(73) Assignee: Canon Kabushiki Kaishsa, Tokyo (JP)

( * ) Notice: Subject to any disclaimer, the term of this patent is extended or adjusted under 35 U.S.C. 154(b) by 702 days.

(21) Appl. No.: 09/986,809

(22) Filed: Nov. 13, 2001

(65) Prior Publication Data

US 2002/0107973 A1 Aug. 8, 2002

(30) Foreign Application Priority Data

Nov. 13, 2000 (AU) ................................. PR1474
Nov. 13, 2000 (AU) ................................. PR1475
Nov. 13, 2000 (AU) ................................. PR1477

(51) Int. Cl.
*G06F 15/16* (2006.01)
*G06F 15/173* (2006.01)

(52) U.S. Cl. ............. 709/227; 709/219; 709/231; 709/238

(58) Field of Classification Search ........ 709/227–229, 709/231–238, 217–219
See application file for complete search history.

(56) References Cited

U.S. PATENT DOCUMENTS 5,517,618 A * 5/1996 Wada et al. ................. 709/223
5,694,548 A * 12/1997 Baugher et al. ............. 709/227
5,771,399 A * 6/1998 Fishman ....................... 710/72

(Continued)

FOREIGN PATENT DOCUMENTS

WO WO 97/35377 9/1997

(Continued)

OTHER PUBLICATIONS

Wan, E., et al., "On the DDL Issues of Links, Constraints and 'Data inheritance'", ISO/EIC JTC1/SC29/WG11, MPEG 1999/M5104, MPEG Melbourne meeting, Oct. 1999.

*Primary Examiner*—David Wiley
*Assistant Examiner*—Joseph E. Avellino
(74) *Attorney, Agent, or Firm*—Fitzpatrick, Cella, Harper & Scinto

(57) ABSTRACT

A system is described in which a media browser (101), operating as a software application on a user terminal or preferably a server for a number of users, provides a user with a single user interface that facilitates browsing and searching different metadata collections over the Internet (102). A metadata server (212) is associated with each of the metadata collections. When the metadata server (212) receives a request from the media browser (101), the metadata server (212) interprets the request and replies with a description that satisfies the request and according to a predetermined scheme. The description contains at least one link which represents a return link which represents a return request to the metadata server (212). Specifically disclosed are methods of forming a table of contents for a particular user preferably based upon media reproduction attributes, methods of right to use and quality of service control, graphical user interfaces for facilitating the browsing process, methods of interpreting metadata, methods of communicating metadata between users, and method for transferring media sessions between users.

10 Claims, 23 Drawing Sheets

U.S. PATENT DOCUMENTS

| | | | |
|---|---|---|---|
| 5,951,694 A * | 9/1999 | Choquier et al. | 714/15 |
| 6,085,247 A * | 7/2000 | Parsons et al. | 709/227 |
| 6,269,402 B1 * | 7/2001 | Lin et al. | 709/227 |
| 6,349,337 B1 * | 2/2002 | Parsons et al. | 709/227 |
| 6,519,643 B1 * | 2/2003 | Foulkes et al. | 709/227 |
| 6,782,412 B1 * | 8/2004 | Brophy et al. | 709/204 |
| 6,804,254 B1 * | 10/2004 | Pearce et al. | 370/467 |
| 6,826,613 B1 * | 11/2004 | Wang et al. | 709/227 |
| 2002/0035617 A1 * | 3/2002 | Lynch et al. | 709/219 |
| 2003/0001848 A1 * | 1/2003 | Doyle et al. | 345/501 |
| 2003/0055974 A1 * | 3/2003 | Brophy et al. | 709/227 |
| 2003/0055977 A1 * | 3/2003 | Miller | 709/227 |
| 2003/0088676 A1 * | 5/2003 | Smith et al. | 709/227 |

FOREIGN PATENT DOCUMENTS

| | | |
|---|---|---|
| WO | WO 99/04345 | 1/1999 |
| WO | WO 00/08570 | 2/2000 |

* cited by examiner

Browse Process

Search Process

[CATEGORY]

Lifestyles —— Image1
　　　　　　Image2
　　　　　　Image3
　　　　　　etc.

[SUBCATEGORY]　
Sports ——　Basketball　——　Image1
　　　　　　　　　　　　　　　Image2
　　　　　　　　　　　　　　　Image3
　　　　　　　　　　　　　　　etc.

Football
　　　　　　Hockey
　　　　　　etc.

[SUBCATEGORY]　[CLASS]　
Animals ——　Zoo
　　　　　　Wild
　　　　　　Domestic ——　Cats
　　　　　　　　　　　　　Dogs
　　　　　　　　　　　　　Birds —— Image1
　　　　　　　　　　　　　　　　　 Image2
　　　　　　　　　　　　　　　　　 Image3
　　　　　　　　　　　　　　　　　 Etc.

Fig. 7

TRANSFERRING A MEDIA BROWSING SESSION FROM ONE DEVICE TO A SECOND DEVICE BY TRANSFERRING A SESSION IDENTIFIER AND A SESSION KEY TO THE SECOND DEVICE

FIELD OF THE INVENTION

The present invention relates generally to enabling access to electronically-accessible multimedia content and, in particular, to systems and processes by which access via browsing or searching to such content is facilitated through metadata of the content and operations associated with a user interface.

BACKGROUND

As network connectivity has continued its explosive growth, content providers are using the World Wide Web (the "Web") to provide access to their multimedia content (eg. images, video, audio, etc.). Unlike textual content, such as HTML pages, multimedia content is not directly accessible to standard Web search engines. These search engines can examine sites on the Web and extract information about the textual content of those sites. Such information is typically termed "metadata" which is data that describes or catalogues aspects of other data. The extracted information (metadata) can then provide users with access to that content using their customised metadata databases.

In the case of multimedia, content providers or distributors typically store information about the multimedia items to which they have access in metadata databases. The content providers then enable access to these databases by providing a search engine that users or customers can access from a Web site, typically the content provider/distributor's own Web site. Customers wanting to view, or maybe purchase, content that a content provider/distributor has access to, can visit the Web site and use the search engine to search the content provider/distributor's metadata database. Typically the metadata database contains visual identifiers of the content (eg. thumbnails, video abstracts, audio previews, etc) as part of the metadata. The user can then make decisions about which item(s) they may wish to purchase/use based on the metadata that is returned from their searches.

In many cases the multimedia content is digital and on-line, and potential customers can purchase the rights to use or purchase a copy of the desired multimedia item from the content provider/distributor's Web site. More often than not, this transaction is completed on the Web site and the potential customer can directly download their newly acquired content. However this model of providing access to multimedia content does not require that the content is on-line. For example, a potential customer might be able to purchase the rights to use, or a copy, of the desired content from the Web site but the content may be delivered to the potential customer by non-electronic means (ie. the postal system). Another variation is that the potential customer may be redirected from a distributor's site to the actual content provider in order to purchase and acquire a copy of the desired content. Other variations include the potential customer being directed to a physical location to purchase the content and being posted books containing the metadata associated with items to be purchased.

In all the abovementioned situations, the potential customer can only gain access to the content to which each content provider/distributor has access. If the potential customer wanted to perform a search across several different content providers/distributors, the potential customer would have to visit the Web site and use the search engine of each of the different content providers/distributors. Such actions are often time consuming and annoying because the potential customer must use a different search engine interface each time.

These problems have encouraged the development of very large metadata databases on the Web where a content distributor either purchases the rights to content or simply acts as a distributor for smaller content providers. Examples of such are the large image databases of Getty and Corbus. This approach has its own problems. Firstly, the approach does not scale because as the databases become very large, the search time increases. Further, typically all the metadata has to be structured in a similar fashion in order to contain the same metadata keys. However, such is not always desirable as different metadata may be more appropriate depending on the targeted use of the content. For example, images captured for geological purposes would require different metadata that those captured for holiday brochures. Thirdly, smaller content providers have no way to directly sell their content (ie. they are effectively forced to use the larger distributors).

It is an object of the present invention to ameliorate one or more disadvantages of the prior art.

SUMMARY OF THE INVENTION

In accordance with one aspect of the present invention there is disclosed a method of interpreting metadata in a media browsing system, said method comprising the steps of:

receiving a description of an item of multimedia content;

reviewing the description to identify metadata associated therewith;

examining said metadata to determine those (first) metadata items that conform to one of a predetermined number of known metadata standards and converting each said first metadata item to an interpretable form used in said system;

examining said metadata to determine those remaining metadata items that do not conform to any of said known metadata standards, and for each said remaining metadata items:

(i) assessing a syntax of said item to classify said item to one of a set of types known to said system; and (ii) converting said item according to said one type to said interpretable form.

In accordance with another aspect of the present invention there is disclosed a method of maintaining a personal information landscape for a World Wide Web user, where said personal information landscape comprises a set of at least one link to a corresponding metadata entity, said metadata entities each having at least one link to at least one of a further metadata entity and a content entity, said method comprising the steps of:

(i) representing and storing each entity target of said links as an universal resource identifier (URI);

(ii) representing said links in an interface from which a user can navigate through said personal information landscape using said links to metadata entities and select to reproduce the content using said links to said content entities; and (iii) enabling the user to modify said personal information landscape by adding new links to metadata entities and one of deleting or modifying existing links to metadata entities, in which modifications are stored with the said users personal information landscape.

In accordance with another aspect of the present invention there is disclosed a method of maintaining a personal information landscape for a World Wide Web user, where said personal information landscape comprises a set of at least one link to a corresponding metadata entity, wherein each said metadata entity comprises at least one link to one of a further metadata entity or to a content entity, said method comprising the steps of:

(i) representing and storing each entity target of said links as an universal resource identifier (URI);

(ii) representing said links in an interface from which the user can navigate through said personal information landscape using said links to metadata entities and select to play or view the content using said links to said content entities;

(iii) enabling said user to search for particular entities using said metadata entities by specifying desired properties for the said entities and then performing a matching operation on said desirable properties with properties of said entities contained in the said metadata entities;

(iv) enabling said user to modify said personal information landscape by at least one of adding new links to metadata entities, deleting existing links and modifying existing links metadata entities, wherein said new links and said modifications are stored with said personal information landscape.

In accordance with another aspect of the present invention there is disclosed a method of communicating metadata between users of a multimedia browsing service, said service including storage of a table-of-contents of metadata for items able to be browsed and selected by a corresponding user of said service, said method comprising the steps of:

(a) extracting, at a first device having a corresponding first user, metadata relating to a selected media item from table-of-contents of a first user;

(b) transferring said metadata for said selected item from said first device to a second device having a corresponding second user; and (c) said second device receiving said metadata and informing said media browsing service to update a table-of-contents of said second user in said storage with said metadata for said selected media item.

In accordance with another aspect of the present invention there is disclosed a method of communicating metadata between a user device of a media browsing system and a further device not being part of said system, said method comprising the steps of:

(a) extracting said metadata from a table of contents associated with said user device and reposited with said media browsing system;

(b) associating said extracted metadata with an address of said media browsing system and a logon to said system and enveloping the associated components in a voucher; and (c) communicating said voucher from said user device to said further device thereby enabling a user of said further device access to said media browsing system using said logon and to thereby access from said media browsing system to media content referenced by said metadata.

In accordance with another aspect of the present invention there is disclosed a method of transferring a media session from a first device to a second device, said method comprising the steps of:

(a) establishing a media session sourced via a media browsing server upon said first device;

(b) actuating a control on said first device to:
(i) transfer to said second device details of said media session;
(ii) receive from second device an identification thereof known to said media browsing server; and
(iii) transfer the received identification of said second device to said media browsing server; and (c) said media browsing server terminating an output of said media session to said first device and directing said output of said media session to said second device.

Other aspects of the present invention, including apparatus and systems for implementing the methods and computer program product related thereto are also disclosed.

BRIEF DESCRIPTION OF THE DRAWINGS

One or more embodiments of the present invention will now be described with reference to the drawings and appendices in which:

FIG. 7 depicts a structured image metadata database;

Figure 15A:
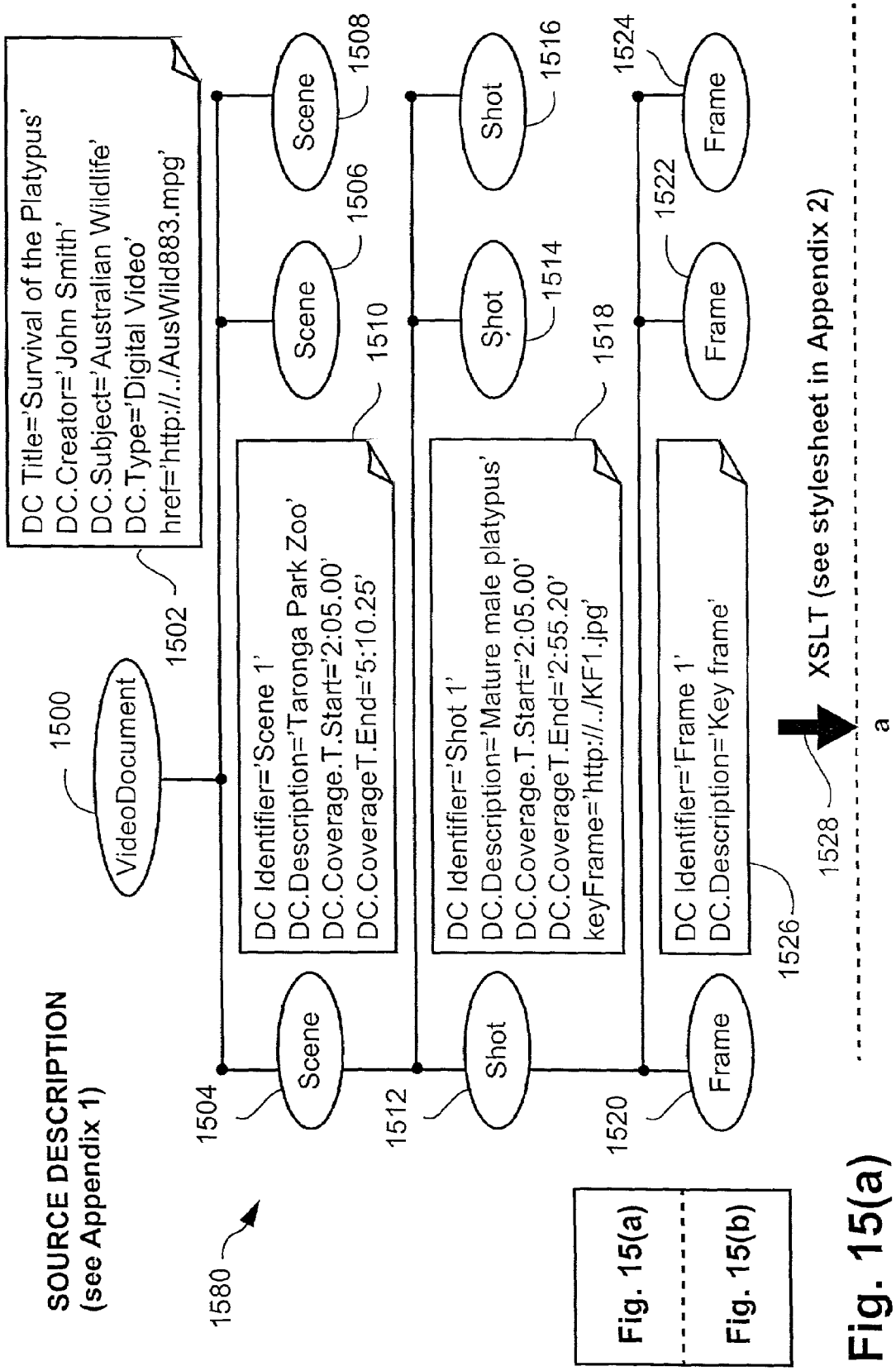
FIGS. 15A and 15B depicts an example of how a source description can be transformed into a normalised description that is presentable by the media browser arrangement.
Figure 15B:
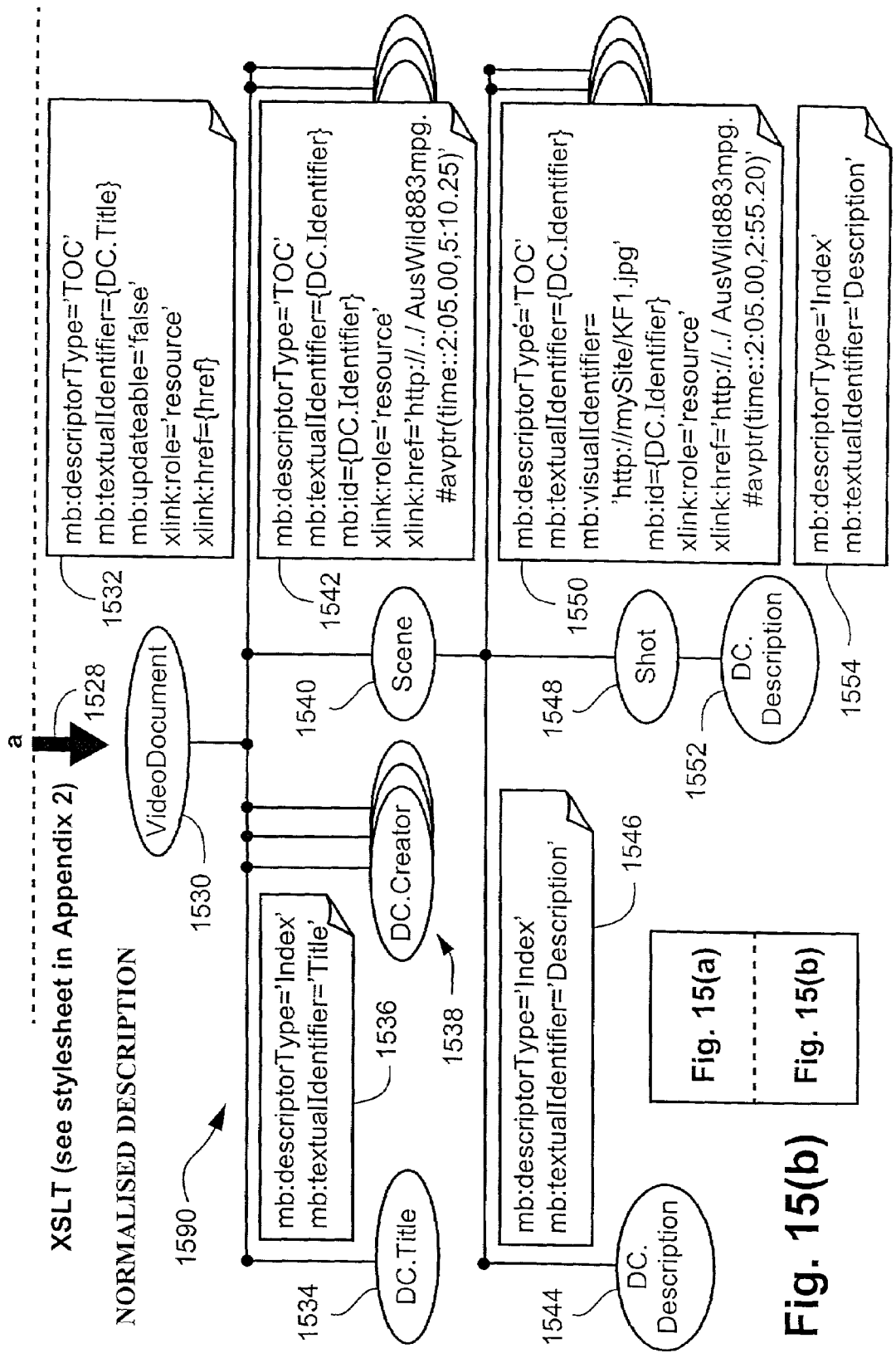

Appendix 1 is an XML source description for the example of FIG. 15; and

Appendix 2 is an XML stylesheet which may be used to transform the source description of Appendix 1 to a normalised form.

DETAILED DESCRIPTION

I. Overview

Figure 1:
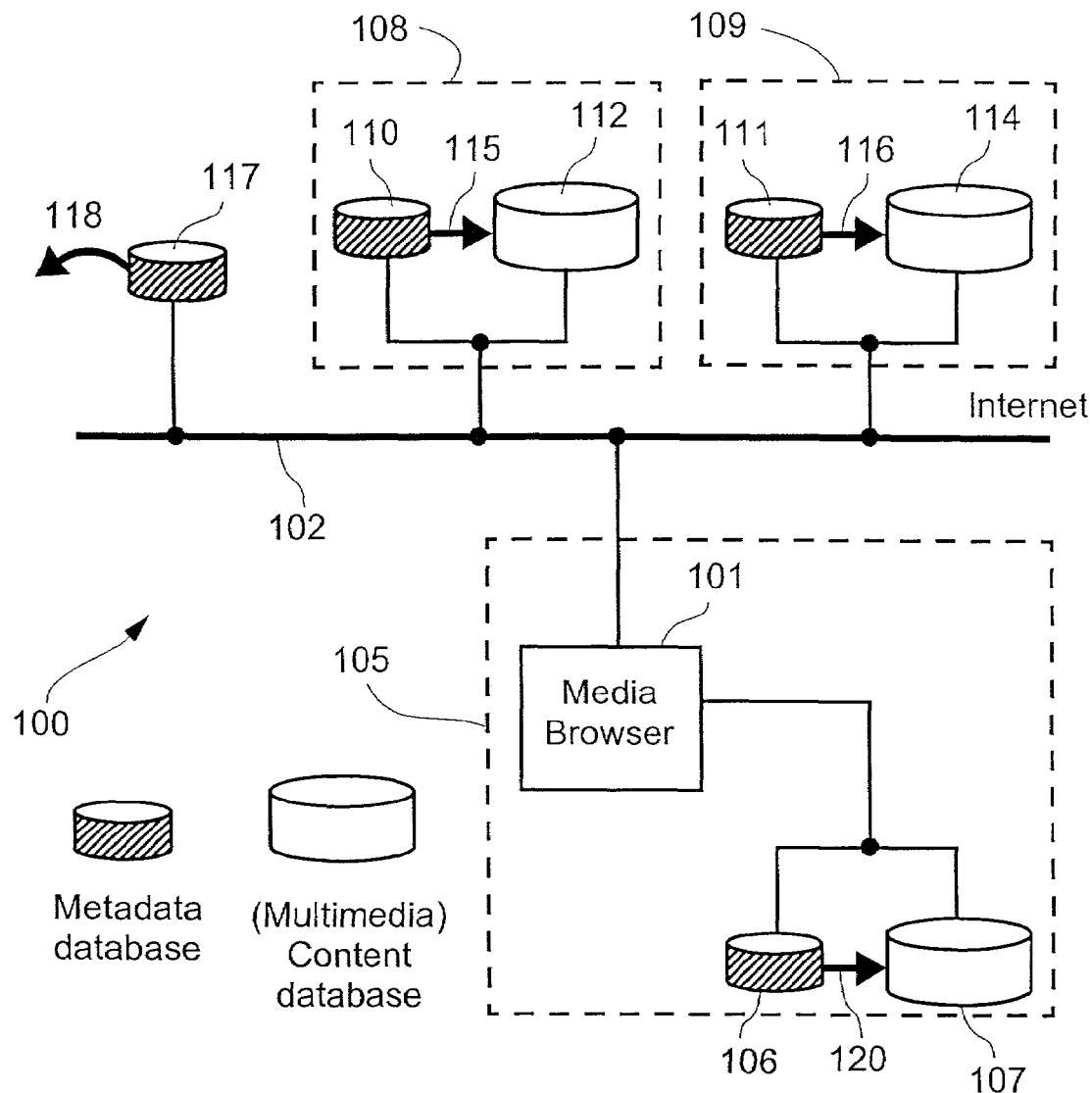
FIG. 1 is a block diagram showing the operating environment of a multimedia access system.

FIG. 1 shows a multimedia access system 100 in which a computer application program, hereinafter called a media browser 101, operates on a local computer 105 to form a connection to a computer network, such as the Internet 102. As illustrated, the Internet 102 has associated therewith a number of server computers 108 and 109, each of which may host a number of Web sites and for each of which there is a corresponding store 112 and 114 in which multimedia content may be retained. The local computer 105 similarly may also have an associated store 107, although such is not essential to the implementation. The media browser application 101 provides a single user interface for a user of the local computer 105 to browse and search the system 100 for multimedia items using electronically-accessible metadata. In other words, the media browser 101 operates on metadata. Any playing/viewing of multimedia content is achieved by the use of plug-in media tools and is separated from the metadata-related processing. The media browser 101 is described in more detail in Section IV below.

Figure 9:
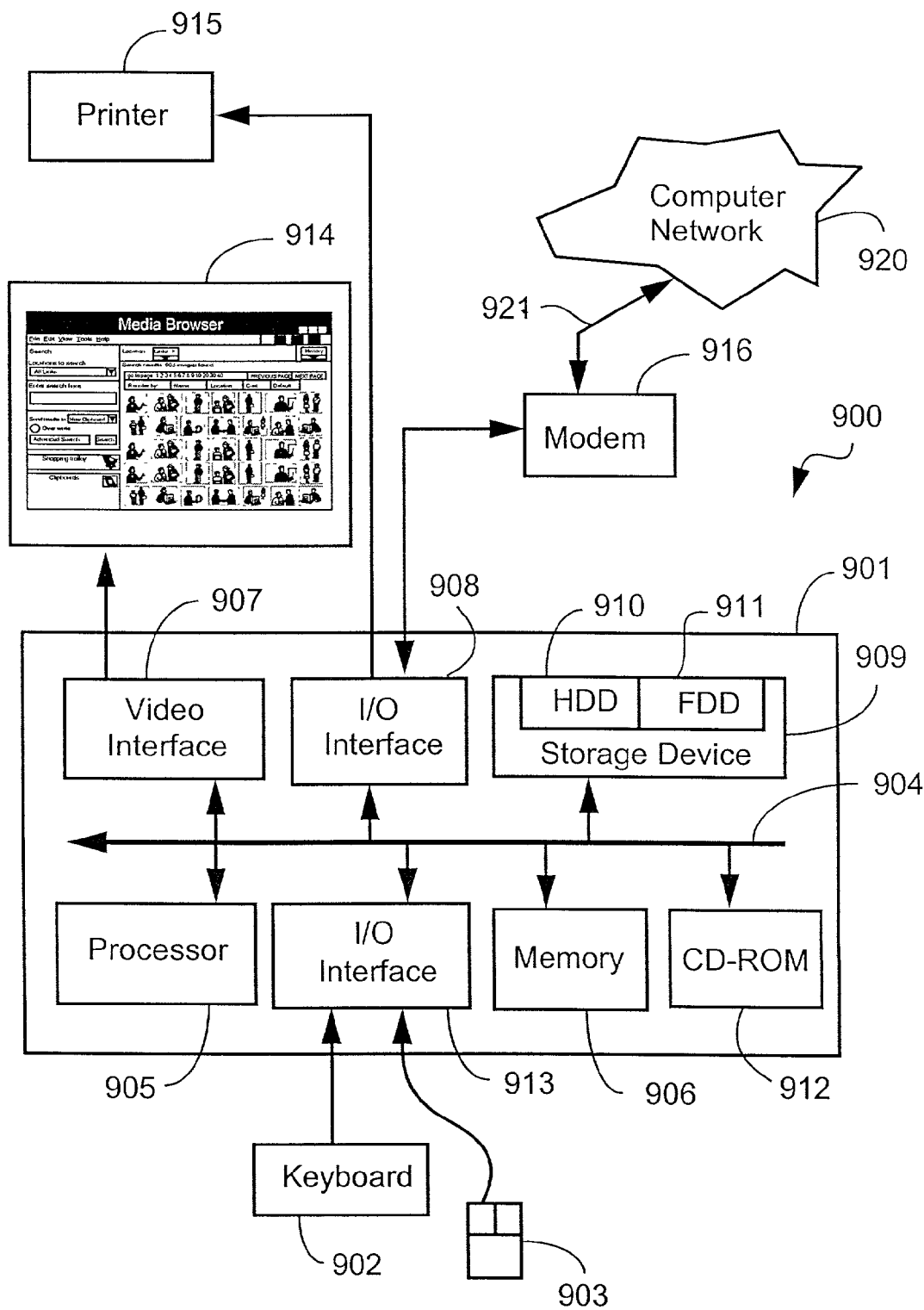
FIG. 9 is a schematic block diagram representation of a computer system upon which the media browser may operate.

The described arrangements may practiced using a general-purpose computer system 900, such as that shown in FIG. 9 wherein the processes of FIG. 1 and to be described are implemented as software, such as an application program executing within the computer system 900. In particular, the method of media browsing is effected by instructions in the software that are carried out by the computer system. The software may be divided into essentially two separate parts; one part for executing the browsing and searching requests for particular metadata stores, and another part to manage the user interface between the latter and the user. These two part can be executed on separate computers in a mode known as client-server mode. The software may be stored in one or more computer readable media, including the storage devices described below, for example. The software is loaded into computers of the system from the computer readable media, and then executed by the computers. A computer readable medium having such software or computer program recorded thereon is a computer program product. The use of the computer program product in a computer preferably effects an advantageous apparatus for media browsing.

The computer system 900 comprises a computer module 901, input devices such as a keyboard 902 and mouse 903, output devices including a printer 915 and a audio-visual output device 914. A Modulator-Demodulator (Modem) transceiver device 916 is used by the computer module 901 for communicating to and from a communications network 920, for example connectable via a telephone line 921 or other functional medium. The network 920 may for example be the Internet, and/or other network systems, such as a Local Area Network (LAN) or a Wide Area Network (WAN). Collectively, the devices 901–916 may form for example either one or any of the local computer 105 or server computers 108 and 109 of FIG. 1 and are often are described as computer workstations.

The computer module 901 typically includes at least one processor unit 905, a memory unit 906, for example formed from semiconductor random access memory (RAM) and read only memory (ROM), input/output (I/O) interfaces including a audio-visual interface 907, and an I/O interface 913 for the keyboard 902 and mouse 903 and optionally a joystick (not illustrated), and an interface 908 for the modem 916. A storage device 909 is provided and typically includes a hard disk drive 910 and a floppy disk drive 911. A magnetic tape drive (not illustrated) may also be used. A CD-ROM drive 912 is typically provided as a non-volatile source of data. The components 905 to 913 of the computer module 901, typically communicate via an interconnected bus 904 and in a manner which results in a conventional mode of operation of the computer system 900 known to those in the relevant art. Examples of computers on which the described arrangements can be practised include IBM-PC's and compatibles, Sun Sparcstations or alike computer systems evolved therefrom.

Typically, the application program is resident on the hard disk drive 910 and read and controlled in its execution by the processor 905. Intermediate storage of the program and any data fetched from the network 920 may be accomplished using the semiconductor memory 906, possibly in concert with the hard disk drive 910. The audio-visual output device 914 may be used to provide a graphical user interface to the application program by which user input may be afforded via the keyboard 902 and by clicking buttons on the mouse 903 as a mouse-cursor is manoeuvred across the interface represented on the audio-visual output device 914. In some instances, the application program may be supplied to the user encoded on a CD-ROM or floppy disk and read via the corresponding drive 912 or 911, or alternatively may be read by the user from the network 920 via the modem device 916. Still further, the software can also be loaded into the computer system 900 from other computer readable media including magnetic tape, a ROM or integrated circuit, a magneto-optical disk, or a computer readable card such as a PCMCIA card, or a website serving recorded information. The foregoing is merely exemplary of relevant computer readable media. Other computer readable media may be practiced without departing from the scope and spirit of the invention. Further the software may be received and loaded from computer readable media using a radio or infra-red transmission channel between the computer module 901 and another device, or the Internet and Intranets including e-mail transmissions or the like.

Returning to FIG. 1, the metadata used by the media browser 101 can be accessed directly from the local computer 105 or from any accessible site on the Internet 102 such as the server 108. Typically the metadata for a collection of multimedia content is stored in collections (eg. repositories or databases) with each item of content having at least one corresponding metadata item. As seen in FIG. 1, each content database or store 107, 112 and 114 has associated therewith a corresponding database 106, 110 and 111 respectively, which is configured to retain metadata items to facilitate access to the content within the corresponding respective content database or store 107, 112 and 114. Hereinafter, a metadata item is also referred to as a description of its corresponding item (typically, of content) and the term metadata collection refers to collections of such descriptions.

In the preferred arrangement, the media browser 101 is able to access the metadata without having to access the content (107, 112, 114). In other words, a description is not stored as an integral part of an item of content. This means that the media browser 101 does not need to be able to directly interpret the large number of storage/transport formats for audiovisual content in order to access metadata.

The media browser 101 assumes that each description (in the databases 106, 110 and 111) has a link to its corresponding content in the content database or store (107, 112, 114). If the content is stored electronically, these links can be actuated or electronically followed (eg. 120, 115, 116) by a user or process. Alternatively links, such as the link 118, can describe a route to a non-electronic location (eg. a film archive). Non-electronic links are not active (ie. unable to be followed by a remote user or process) and hence are only informative of available content. Accordingly, with such non-electronic links, remote users may not have a capacity to preview content using the media browser 101.

The media browser 101 requires that the metadata can be expressed in a standard manner. In the preferred arrangement, the syntax and structure of individual descriptions are determined by a schema. Descriptions of different items of content can use different schemas. Typically the schema used reflects the type of content and the typical use or purpose of the content. For example, a metadata schema for geological satellite images would most likely be significantly different to a schema for digital home video.

Schema may differ in their syntactical structure and the nature of the types of description components (hereinafter called descriptors). For example, a schema for digital home video may model descriptions of this type of content to contain a digital video tape, which contains one or more scenes, each of which contain one or more clips or shots. The geological satellite image schema may simply have a number of descriptors, with a particular geological focus, which are used to describe each image. In the preferred arrangement schemas are represented using the W3C Extensible Markup Language (XML) Schema language and individual descriptions are represented as XML documents. The metadata representation is described further in Section II.

Figure 2:
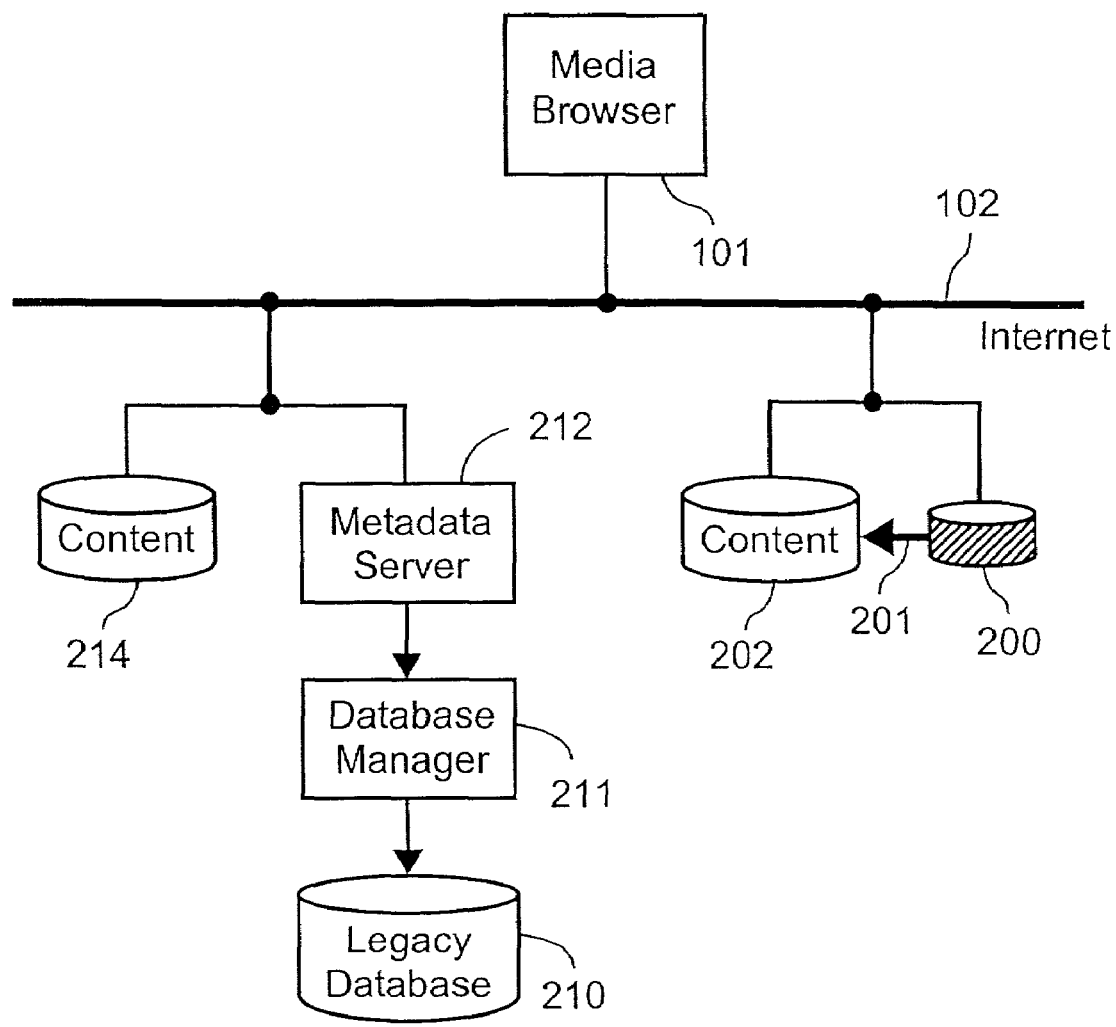
FIG. 2 is a more detailed block diagram showing how the media browser of FIG. 1 accesses metadata databases.

FIG. 2 shows an example of how a media browser 101 can access metadata over the Internet 102. All access to metadata is achieved using links with the target of each link being expressed as a Uniform Resource Identifier (URI). These links can be actuated either automatically by the media browser 101 or in response to a user action (eg. clicking on an item of interest).

In the case where the metadata is stored in an XML repository (collection of XML documents) 200, the media browser 101 can provide access to the metadata stored in the repository 200 using a link to an XML description of the repository 200. This description represents the structure of the repository 200 that is presented to a user of the media browser 101. The XML description is represented in the same way as a description of a multimedia item of content. In other words, the description preferably conforms to an XML schema that is accessible to the media browser 101, and which describes the structure of the repository 200. The XML description can contain links to other descriptions of particular sections of the repository 200 (in other words, the description of the repository 200 does not need to be contained within a single XML document). Ultimately the repository XML description has links to descriptions of multimedia items. Each description of a multimedia item in the repository 200 preferably contains a link 201 to a corresponding multimedia item in the corresponding content collection 202. This enables the media browser 101 to be able to retrieve these items if a user or customer selects to view or play the item based on the presented metadata.

In the case where access to a non-XML repository, here called a legacy database 210, is desired, the link described above with reference to FIG. 1 must operate through a server module called a metadata server 212. The metadata server 212 is preferably located, though not necessarily, at the site of the metadata (ie. either local or remote) and is configured and controlled by the owner of the metadata. The purpose of the metadata server 212 is to effectively translate the metadata stored in a legacy database 210 to the format required by media browser 101. In other words, the metadata server 212 should preferably provide access to one or more schemas for the metadata and dynamically generate XML descriptions that conform to these schemas. Preferably, a metadata server 212 need only provide schema definitions that describe the structure/syntax of the metadata collection, and the structure/syntax of the individual descriptions stored in the legacy database 210. These schema definitions may be contained in one or more XML Schema documents. As with the case where the remote metadata is stored in an XML repository 200, the descriptions of multimedia items, that the metadata server 212 generates, contain links to the corresponding multimedia items stored in a content collection 214 corresponding to the legacy database 210.

A link to a metadata server is also represented using a URI. The URI is composed of a network identifier component, which is a URI itself, and a query string which specifies details of the metadata server request. The request can be executed using a Hypertext Transfer Protocol (HTTP) "get" request over the Internet. Processing of the query results in descriptions of either the structure of the collection or multimedia items depending on how the metadata server 212 interprets the query string.

The descriptions that are dynamically generated by the metadata server 212 can be in response to media browser user browsing or search requests. Metadata servers are discussed further in Section III below.

II. Metadata Representation

The preferred arrangement assumes that all descriptions of multimedia items conform to a schema, and that schemas are expressed or represented using the W3C schema language, XML Schema. Individual descriptions are represented using XML document instances. XML Schema are also represented as XML documents. Therefore descriptions (eg. of multimedia items) can be stored along with their respective schemas in XML repositories or object stores. Alternatively, the descriptions can be stored in a database and effectively translated into XML documents when required.

Each description contains reference(s) to schemas to which it conforms. The reference is expressed using a URI (eg. http://somesite/schemas/DigitalVideoSchema.xsd). This means that once a media browser has access to a description it can directly access the schema or schemas to which the description conforms.

Technically, each XML element in a description (XML document) is declared to belong to a uniquely identified namespace. The XML document can then provide a hint to a processor, using the attribute schemaLocation (in the XMLSchema-instance namespace), for the location of a schema that contains definitions for a particular namespace. Hence an XML document, and thus also a description, indirectly rather than directly references one or more schemas.

In this document, the term "descriptor" is used to refer to a component, or atom, of a description. Each descriptor comprises a feature (descriptor name) and a value (description value). In some cases, the descriptor value comprises other descriptors, and thus may form a "complex descriptor". In other cases, the descriptor value is a scalar value such as a string or date (ie. simple or atomic descriptors). In all cases media browser 101 assumes that descriptors are represented with the element (tag) name being the descriptor name and the content of the element being descriptor value. For example, a simple descriptor may use the textual content of the element (ie. the text between the tags) to represent the value of the descriptor (eg. a date, text string, enumeration, etc.).

This assumption about the structure of the metadata is not unlike how many practitioners currently use markup languages. In other words, it does not require significant changes from how practitioners might represent particular metadata vocabularies.

Some examples of descriptors are now provided. In the simple descriptor, <Photographer>John Smith</Photographer>, Photographer is the name of the descriptor and John Smith is the value of the descriptor. The type of the text of a simple descriptor can be constrained using the simpleType construct of XML Schema.

Figure 8:
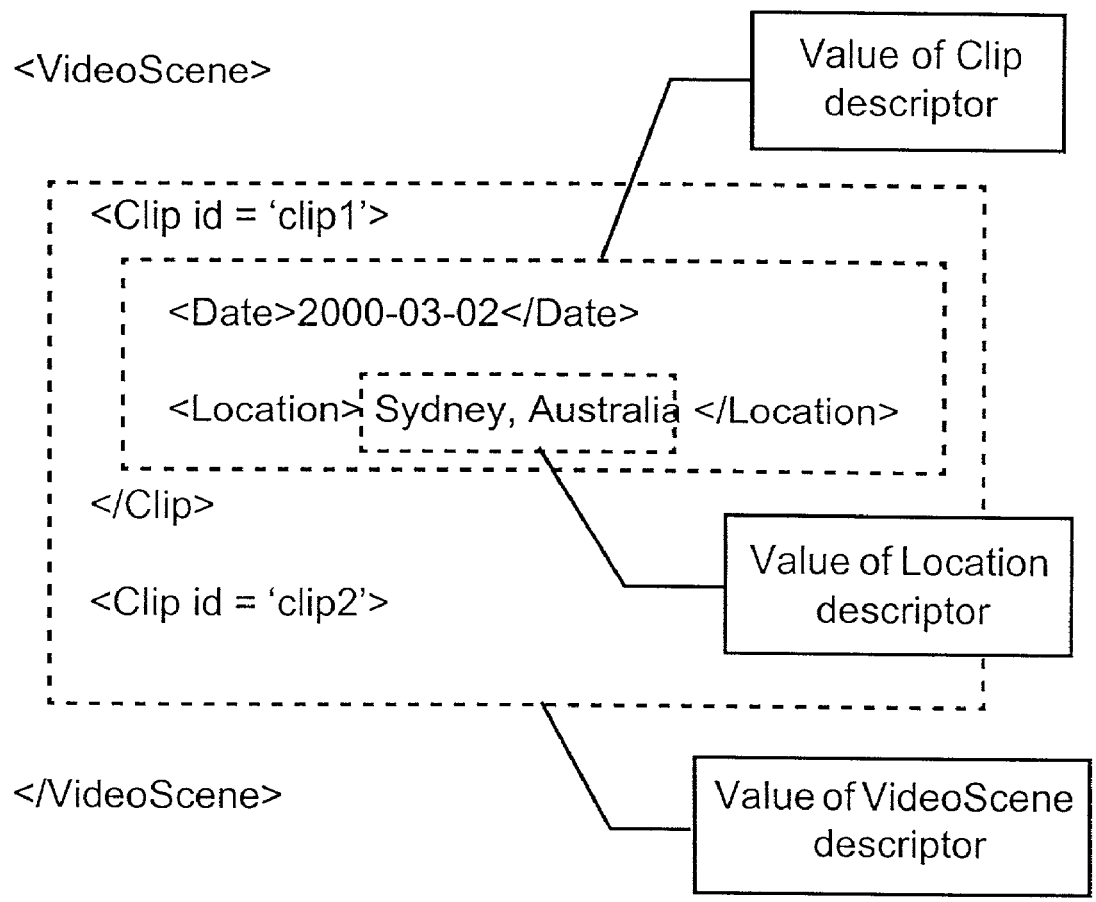
FIG. 8 shows and example of XML metadata that is used by the for browsing process.

In the example shown in FIG. 8, both VideoScene and Clip are complex descriptors. The value of the VideoScene descriptor is the markup that is contained within the start and end tags of the descriptor. The name of the descriptor is the tag name (ie. VideoScene). Similarly the value of the Clip complex descriptor is that markup contained between the start and end tags of the Clip descriptor. The Clip descriptor value contains two simple descriptors, Date and Location. The value of the Location descriptor is the text contained between the start and end Location tags (ie. Sydney, Australia).

In order to be able to better interpret the basic semantics of descriptions for the purposes of visually presenting descriptions in a meaningful way to users, the preferred arrangement includes a core schema which contains definitions of a number of basic attributes that description schema designers can use when they define their descriptors. An example of the definitions included in this core schema are shown below as Example A, in which only a fragment of the actual schema is shown. The definitions in this example belong to a unique media browser namespace which is identified in the example by the prefix "mb:". It is assumed that this prefix assignment has been performed earlier in the schema using an xmlns attribute.

A TOC descriptor is used to describe the structure of a description, and is typically a complex descriptor. A TOC descriptor is navigable in the sense that such must contain a link within either its attributes or within the attributes of its children. The target of the link can be either a further description or an item of content. A TOC descriptor is similar to an entry in a table of contents of a book in that it enables a reader to go directly to a section of the work.

Index descriptors are typically leaf nodes of a hierarchically-composed descriptor structure and are often referred to as properties (ie. the type of descriptive information that is displayed using a properties dialog in a Microsoft Windows (registered trade mark) system. Section IV below describes how the descriptorType attribute is used by the media browser.

Attributes are also used to contain visual and/or textual identifiers for a descriptor. A visual identifier (ie. visualidentifier attribute) can be the URI of a thumbnail or movie/audio track preview. A text identifier (ie. textidentifier attribute) can be used in the place of, or in addition to, a visual identifier. A text identifier typically contains a string value which describes the descriptor. In the absence of a visual identifier, the media browser can construct a visual representation based on this text value. These core attributes "drive" the user interface of the media browser. In other words, they have been included for presentation purposes.

In addition to these visualisation attributes that are defined in the core schema, the preferred arrangement uses the linking attributes of the evolving W3C XLink standard (as described at http://www.w3.org/TR/xlink) to provide linking semantics. XLink provides a framework for creating both basic unidirectional links, such as the HTML <A> linking element, and more complex linking structures. Simple linking elements are a common linking requirement for the preferred arrangement. These links can be used to represent links between two descriptors (ie. items of metadata) and links between descriptors (metadata) and content (eg. images, video, etc.). XLink also provides for other linking types such as extended links, locators and arc. The full list of linking types is described at http://www.w3.org/TR/xlink.

EXAMPLE A

```
1.   <simpleType name = 'DescriptorType'>
2.       <restriction base = 'string'>
3.           <enumeration value = 'TOC'/>
4.           <enumeration value = 'Index'/>
5.           <enumeration value = 'Other'/>
6.       </restriction>
7.   </simpleType>
8.   <attribute name = 'id' type = 'ID' />
9.   <attribute name = 'textIdentifier' type = 'string' />
10.  <attribute name = 'visualIdentifier' type = 'anyURI' />
11.  <attributeGroup name = 'DescriptorAttributes'>
12.      <attribute ref = 'mb:id' />
13.      <attribute ref = 'mb:textIdentifier' />
14.      <attribute ref = 'mb:visualIdentifier' />
15.      <attribute name = 'updateable' type = 'boolean' default = 'false' />
16.  </attributeGroup>
17.  <attributeGroup name = 'TOCDescriptorAttributes'>
18.      <attributeGroup ref = 'mb:DescriptorAttributes' />
19.      <attribute name = 'descriptorType' type = 'mb:DescriptorType' fixed = 'TOC' />
20.  </attributeGroup>
21.  <attributeGroup name = 'IndexDescriptorAttributes'>
22.      <attributeGroup ref = 'mb:DescriptorAttributes' />
23.      <attribute name = 'descriptorType' type = 'mb:DescriptorType' fixed = 'Index'/>
24.  </attributeGroup>
```

The attribute descriptorType is used to define whether a descriptor is to be treated as part of a Table of Contents (TOC descriptor), or as part of an index (index descriptor).

The existence of a link, using XLink, is asserted by an XLink linking element. These elements need to be recognised by applications in order to provide appropriate display or behaviour. XLink uses a namespace to accomplish link recognition. The XLink namespace used by the preferred arrangement has the URI, http://www.w3.org/1999/xlink, and is associated with the xlink prefix. This association is achieved using the xmlns attribute of XML (eg. xmlns: xlink='http://www.w3.org/1999/xlink'). XLink's namespace provides definitions of global attributes that can be used on elements that are in any arbitrary namespace. These global attributes (xlink:type, xlink:href, xlink:role, xlink:title, xlink:show, xlink:actuate, xlink:from and xlink:to) can be used to make elements recognisable as linking elements. For example, if the value of the xlink:type attribute is set to "simple" for a particular element, then that element is treated as a simple linking element and the value of the attribute, xlink:href, contains the target of that link. For the purposes of this description, definitions of the linking attributes using XML schema are included below in Example B.

EXAMPLE B

VideoClip, Date and Photographer are declared in a particular schema. Note that only a fragment of an actual schema is shown and reference to the media browser and XLink namespaces is assumed via the namespace prefixes mb and xlink, respectively. In XML Schema these namespace prefixes are assigned using the xmlns attribute of the XML Schema language. The media browser attributes are referenced unchanged from their definitions as seen at line 21 of Example C for TOCDescriptorAttributes. However one of the XLink attributes that are referenced, for example as seen at line 24, is further refined from its original definition. For example, the VideoClip descriptor is a simple linking element so the xlink:type attribute's value will assume the default value of "simple". With a simple link, the element (descriptor) is the link source and a single linkend must exist. This single linkend is represented using the xlink:href attribute. A value must be supplied for this attribute for the simple link to be valid (hence the use constraint for this attribute is set to "required"). Note also that the xlink:href

```
1.   <?xml version='1.0'?>
2.   <schema
3.       xmlns = 'http://www.w3.org/2001/XMLSchema'
4.       xmlns:xlink = 'http://www.w3.org/1999/xlink'
5.       targetNamespace = 'http://www.w3.org/1999/xlink'
6.       attributeFormDefault = 'qualified'
7.       version = '1.0'>
8.   <simpleType name = 'LinkType'>
9.       <restriction base = 'string'>
10.          <enumeration value = 'simple'/>
11.          <enumeration value = 'extended'/>
12.          <enumeration value = 'locator'/>
13.          <enumeration value = 'arc'/>
14.          <enumeration value = 'resource'/>
15.          <enumeration value = 'title'/>
16.          <enumeration value = 'none'/>
17.      </restriction>
18.  </simpleType>
19.  <simpleType name = 'ShowType'>
20.      <restriction base = 'string'>
21.          <enumeration value = 'new'/>
22.          <enumeration value = 'replace'/>
23.          <enumeration value = 'embed'/>
24.          <enumeration value = 'other'/>
25.          <enumeration value = 'none'/>
26.      </restriction>
27.  </simpleType>
28.  <simpleType name = 'ActuateType' >
29.      <restriction base = 'string'>
30.          <enumeration value = 'onLoad'/>
31.          <enumeration value = 'onRequest'/>
32.          <enumeration value = 'other'/>
33.          <enumeration value = 'none'/>
34.      </restriction>
35.  </simpleType>
36.  <attribute name = 'type'    type = 'xlink:LinkType' default = 'simple'/>
37.  <attribute name = 'show'    type = 'xlink:ShowType' default = 'new'/>
38.  <attribute name = 'role'    type = 'QName'          default = 'resource'/>
39.  <attribute name = 'actuate' type = 'xlink:ActuateType'/>
40.  <attribute name = 'href'    type = 'anyURI'/>
41.  <attribute name = 'arcrole' type = 'string'/>
42.  <attribute name = 'title'   type = 'string'/>
43.  <attribute name = 'label'   type = 'NMTOKEN'/>
44.  <attribute name = 'from'    type = 'NMTOKEN'/>
45.  <attribute name = 'to'      type = 'NMTOKEN'/>
46.  </schema>
```

A particular schema can use the core XLink and media browser attributes when declaring individual descriptors for a schema. In Example C below, the particular descriptors attribute for the VideoClip descriptor will assume its default value of "resource" (ie. the target of the link should be assumed to be the item of content being described).

EXAMPLE C

```
1.   <element name = 'VideoClip'>
2.       <complexType>
3.           <element name = 'Date'>
4.               <complexType>
5.                   <simpleContent>
6.                       <extension base = 'date'>
7.                           <attributeGroup ref = 'mb:IndexDescriptorAttributes'/>
8.                       </extension>
9.                   </simpleContent>
10.              </complexType>
11.          </element>
12.          <element name = 'Photographer' >
13.              <complexType>
14.                  <simpleContent>
15.                      <extension base = 'string'>
16.                          <attributeGroup ref = 'mb:IndexDescriptorAttributes'/>
17.                      </extension>
18.                  </simpleContent>
19.              </complexType>
20.          </element>
21.          <attributeGroup ref = 'mb:TOCDescriptorAttributes'/>
22.          <attribute ref = 'xlink:type'/>
23.          <attribute ref = 'xlink:role'/>
24.          <attribute ref = 'xlink:href' use = 'required'/>
25.      </complexType>
26.  </element>
```

A description conforming to this particular schema fragment may contain the fragment of Example D:

EXAMPLE D

```
1.   <VideoClip xlink:href = 'http://someSite/content/video/clip999.mpg'>
2.       <Date>2000-04-18</Date>
3.       <Photographer>John Smith</Photographer>
4.   </VideoClip>
```

In the preferred arrangement, the core media browser attributes are explicitly expressed in schemas and/or descriptions. Alternative arrangements can infer these attribute values from other information in descriptions, as described below. For example, a descriptor/element may be treated as part of the TOC if it contained a link within either its attributes or within the attributes of its children. Further, descriptors which do not have descendant links may be treated as index descriptors. Similarly visual identifiers may be automatically constructed from element (descriptor) names. Methods of inferring these attribute values are described in more detail later in this section.

Clearly there are alternative ways in which the core media browser and xlink semantics can be represented. For example, using XML Schema it is possible to define a core Descriptor type and from that core type, derive TOCDescriptor and IndexDescriptor types (see Example E below). Then individual schema definitions may extend these base types to provide implementation-based descriptors such as those defined in Example C. Also, although the preferred arrangement uses XML Schema as its schema representation languages, other suitably expressive schema languages may be used.

EXAMPLE E

```
1.   <simpleType name = 'DescriptorType'>
2.       <restriction base = 'string'>
3.           <enumeration value = 'TOC'/>
4.           <enumeration value = 'Index'/>
5.           <enumeration value = 'Other'/>
6.       </restriction>
7.   </simpleType>
8.   <complexType name = 'Descriptor'>
9.       <attribute name = 'id' type = 'ID'/>
10.      <attribute name = 'textIdentifier' type = 'string'/>
11.      <attribute name = 'visualIdentifier' type = 'anyURI'/>
12.      <attribute name = 'descriptorType' type = 'DescriptorType'/>
13.      <attribute name = 'value' type = 'xsd:anyType'/>
14.      <attribute ref = 'xlink:href'/>
15.  </complexType>
16.  <complexType name = 'TOCDescriptor'>
17.      <restriction base = 'Descriptor'>
18.          <attribute name = 'id' type = 'ID'/>
```

```
-continued

19.         <attribute name = 'textIdentifier' type = 'string'/>
20.         <attribute name = 'visualIdentifier' type = 'anyURI'/>
21.         <attribute name = 'descriptorType' type = 'DescriptorType'
                    fixed = 'TOC'/>
22.         <attribute name = 'value' use = 'prohibited'/>
23.         <attribute ref = 'xlink:href'/>
24.     </restriction>
25. </complexType>
26. <complexType name = 'IndexDescriptor'>
27.     <restriction base = 'Descriptor'>
28.         <attribute name = 'id' type = 'ID'/>
29.         <attribute name = 'textIdentifier' type = 'string'/>
30.         <attribute name = 'visualIdentifier' type = 'anyURI'/>
31.         <attribute name = 'descriptorType' type = 'DescriptorType'
                    fixed = 'Index'/>
32.         <attribute name = 'value' type = 'xsd:anyType'/>
33.         <attribute ref = 'xlink:href' use = 'prohibited'/>
34.     </restriction>
35. </complexType>
```

Interpretation of Metadata

In practice, not all the metadata that a user wishes to visualise using the media browser 101 will explicitly use the media browser 101 and the XLink attributes described above. On parsing a new description, the media browser 101 first attempts to identify the type of metadata that has been received, examples of which may include Dublin Core, MPEG-7 or DIG35 for images, each of these metadata standards that are known in the art. Typically, this can be achieved by examining either the root element of the description or the namespace declarations. If the media browser 101 identifies a metadata standard, then the media browser 101 uses an XSLT stylesheet to transform the incoming document tree (description) into one that explicitly uses the media browser and XLink attributes. No further processing is required. In other words, it is assumed that the transform results in a description that the media browser can present without further processing.

For all other descriptions, a check is performed to attempt to ensure that the preferred media browser attributes are present. If they are absent then the preferred implementation uses a list of rules for the creation of appropriate media browser attributes for the incoming metadata. The rules are as follows:

(i) An href attribute is assumed to represent the target of a simple link and is represented as an xlink:href attribute. If the target value of the link is a URI with an extension of XML or no extension, then a link to another description is assumed (ie. xlink:role is set to 'description'), otherwise the link is assumed to be a link to the relevant content (ie. xlink:role is set to 'resource'). The type of the link is assumed to be simple (ie. xlink:type is set to 'simple').

(ii) An element is classified as a TOC descriptor if either the descriptor or any of its children contains a link (ie. mb:descriptortype is set to 'TOC'). The link may be represented in the original metadata as element content or an attribute. An element not classified as a TOC descriptor is assumed to be an Index descriptor.

(iii) If a descriptor does not have a visualidentifier or a textidentifer then a textIdentifer is created with a value that is obtained either from a name attribute of the descriptor, if it exists, or from the element name. In this regard, the media browser 101 preferably always displays a visualidentifier if one exists, otherwise the textidentifer is used.

(iv) If a descriptor contains an attribute having a name that indicates that it may be able to act as a visualIdentifier (e.g., keyFrame, thumbnail, preview, etc) then a visualIdentifier attribute is created using that attribute's value. This rule can be implemented by checking each attribute name against a list of possible visualIdentifier names.

Whilst the above lists only four rules, it will be appreciated that alternate and/or additional rules may be developed to provided for meaningful interpretation of unknown metadata types.

However, the use of an XSLT stylesheet is a desired approach because a priori knowledge of the metadata format enables a stylesheet author to define informed transforms. For example, the value of the visualidentifier attribute may be taken directly from the value of another attribute. An example of a transform for some arbitrary video metadata that is based on a subset of known extended Dublin Core attributes to a form useable by Media Browser is shown in FIG. 15.

In FIG. 15 the source and transformed descriptions are depicted as XML element node trees with attributes shown in the boxes to the right of the corresponding node. Elements are represented using the oval shapes. So, for example, in the source description 1580, the VideoDocument element 1500 has five attributes 1502, namely DC.Title, DC.Creator, DC.Subject, DC.Type, and href. The notation {att_name} is used to denote the value of the attribute of the corresponding element in the source document with the name att_name. The avptr notation is a method of addressing into audiovisual content using XPointer fragments. For example:

http://../AusWild883.mpg#avptr(time::2:05.00,2:55.20)

refers to the fragment of the audio visual content AusWild883.mpg, where the fragment starts 2 minutes and 5 seconds from the start of the content, and ends at 2 minutes and 55.2 seconds.

An XSLT transform 1528 of FIG. 15 is configured with knowledge of the syntax and semantics of a source description 1580 for a video document description 1500 having a number of attributes 1502 (eg. DC.Title). For example, the shown transform assumes that the value of the DC.Identifier attribute in the set of attributes 1510 of the source Scene elements 1504, 1506, 1508, and the DC.Identifier attribute in the set of attributes 1518 of the Shot elements 1512, 1514, 1516 is just a reference identifier and does not provide additional information. For this reason, the transform uses these references as the values of the mb:id attribute. If these identifiers did carry significance to the user of the metadata then these attributes could have been transformed into index descriptors as, for example, the DC.Description attribute of the Scene element 1544. Note also that in FIG. 15 the transformed description does not maintain the initial frame granularity of the source description. In other words, the normalised description 1530 does not contain Frame description as in the source description 1500. This represents a decision made by the designer of the stylesheet 1528 which typically operates with knowledge of the media browser interface 101.

In the example of FIG. 15, it may initially appear counterproductive to transform a description that uses elements to represent structure and attributes to represent properties, into an element tree. However, concepts of what information should be represented as attributes and what information should be represented as elements often vary with media type, as described above. For this reason, transforming source metadata into an element tree is a form of normalising the metadata, and the transform 1528 thus results in a normalised description 1590 able to be processed and presented by the media browser 101.

The source description 1580 is an XML document seen in Appendix 1. The media browser 101 does not attempt to transform any relevant schema, if one exists. Consequently, the transformed description does not conform to a schema and therefore the description cannot be annotated. This is emphasised in the transformed description by setting the updateable attribute of the media browser 101 to false in the root element 1532 of the transformed description 1590. The XSLT stylesheet used to achieve the transform 1528 is seen in Appendix 2.

III. Metadata Servers

A link to a metadata server 212 is represented using a URI. An expression describing the request is appended to a URI that uniquely identifies the metadata server 212. For example, the URI: http://somesite/myMetadata/Svr?<query_string>, has an identifier component which is the part of the URI preceding the question mark symbol and a request component which carries information about the request to be sent to the metadata server 212. The identifier component is itself a URI.

The preferred arrangement interprets the link by first using the identifier part of the URI to locate the metadata server 212 on the network 102. Failure to identify the metadata server 212 results in a failed link and the media browser 101 user can be notified of the failure to detect a running process. In the preferred arrangement, the metadata server 212 must be running as a process and the process being run by the metadata server 212 cannot be initiated from the media browser 101. In alternative arrangements, the media browser 101 may be configured to initiate the one or more metadata server processes.

When an identified metadata server 212 receives a request, the server 212 interprets the request and replies with an XML description that satisfies the request. Preferably the description is sent as XML, however the description may be encoded if desired or necessary. The types and elements used in the description are preferably defined in a schema that the media browser 101 can access. Although, the descriptions are not validated against their schema by the media browser 101 in the described arrangement, the media browser 101 prefers to have access to the schema. If a schema is not available then some media browser functions may not be available. Preferably, the types and elements of the schema used by the metadata server 212 are derived using the core attributes defined above in Section II.

The requests directed at the metadata server 212 may be for metadata required for browsing or a search expression. The request can also specify various parameters that control the delivery of the XML back to the requesting media browser service.

The results of requests that are directed at a metadata server 212 are descriptions which are preferably contained in an element, either of the type, or derived from the type MetadataCollection, an example of which is provided below as Example F. The MetadataCollection type provides a means for the metadata server to explicitly return information to the requesting media browser application or service (eg. the number of items that satisfy the request and the number of items that are actually returned in the description).

EXAMPLE F

```
1.  <complexType = 'MetadataCollection'>
2.      <attribute name = 'descriptorType' type = mb:DescriptorType fixed = 'Other'/>
3.      <attribute name = 'requestID' type = 'string'/>
4.      <attribute name = 'noItemsIdentified' type = 'integer'/>
5.      <attribute name = 'noItemsReturned' type = 'integer'/>
6.      <attribute name = 'startItemReturned' type = 'integer'/>
7.  </complexType>
```

Figure 3:
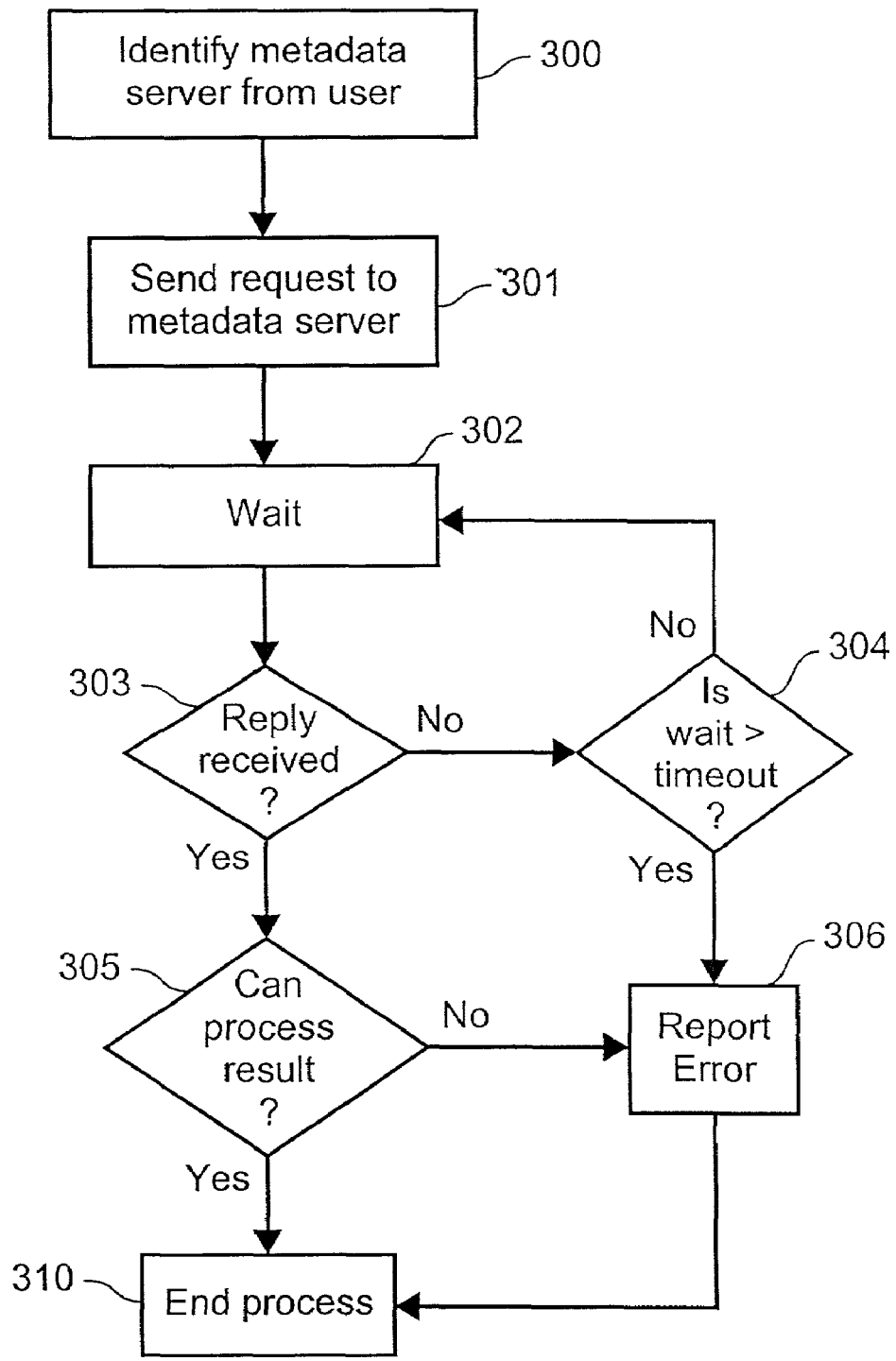
FIG. 3 is a flow chart depicting the communication process between the media browser and the metadata server.

Before details of the request syntax are described, the overall processing model for the communication performed by the media browser 101 with a metadata server 212 is described with reference to the flow chart of FIG. 3. Firstly, in step 300, the metadata server 212 is identified from the URI. The request is then sent to the identified metadata server 212 in step 301. Specifically, what occurs in the preferred arrangement is that the URI containing the metadata server request is fetched using the HTTP. In other words, steps 300 and 301 are performed as a single process. The system then waits in step 302 for a reply. A check is performed in step 303 to see if a reply has been received. If not, then the waiting period is compared with a predetermined timeout in step 304 and if the waiting period is not greater than the timeout, control passes back to step 302. If the waiting period is greater than the timeout, an error is reported to the media browser user in step 306 and the process terminates in step 310 (ie. the metadata server 212 has not been reached for some reason).

If a reply is received in step 303 the media browser 101 examines the response. If the media browser 101 cannot process the response (eg. the response is not correctly structured) then an error is reported in step 306 and the process terminates in step 310. If the response is able to be processed (ie. parsed) then it is passed to the appropriate module in the media browser 101 for further processing and the process terminates in step 310.

The request syntax will now be discussed in more detail.

Typically most legacy databases store metadata in relational databases and access these databases using Standard Query Language (SQL). On the other hand, XML documents, and hence the media browser 101, represent information (metadata) in an hierarchical fashion. The metadata server 212 request must provide a bridge between the two different representations. Although it may be simpler to implement metadata servers if the request was based on SQL, the media browser 101 uses XML-related technology. In particular, the metadata server request is based on the W3C Recommendation XPath Version 1.0, which may be found at http://www.w3.org/TR/xpath. It may also be possible to use the emerging W3C standard XQuery.

XPath provides an extremely understandable way to describe a class of nodes which are to be processed. It is declarative rather than procedural and uses a simple pattern syntax modelled after directory notation. The most common form of XPath expressions are location paths. A location path selects a set of nodes relative to a context node. A location path can be absolute (starts with a '/' to denote the root node) or relative (to a context node). For example, the expression book/author is a relative location path which selects all author children of book children of the context node. The XPath syntax is most easily understood by way of examples and examples are provided at http://www.w3.org/TR/xpath. A number of XPath examples are as follows:

(i) /* selects all the children of the root node
(ii) /doc/chapter[5]/section[2] selects the second section of the fifth chapter of the doc.
(iii) */para selects all the para grandchildren of the context node
(iv) para[@type="warning"] selects all the para children of the context node that have a type attribute with the value of warning.
(v) chapter[title="Introduction"] selects the chapter children of the context node that have one or more title children with string value equal to Introduction.

The location path syntax of XPath is directly useable for representing browsing requests and also for structured queries. In order to package unstructured queries (search expressions) as requests to the metadata server, Xpath's function notation is used. This requires a more detailed understanding of XPath.

The primary syntactic construct in XPath is the expression. An expression is evaluated to yield an object which is one of the following four basic types:

Node-set (an unordered collection of nodes without duplicates);
Boolean (true or false);
Number (a floating point value); and
String.

A location path, as discussed above, is a special case of an XPath expression. A location path returns the set of nodes selected by the path. The part of the location path that is enclosed by square brackets '[ ]' is called the predicate. The predicate is itself an XPath expression which returns a Boolean result which serves to filter the node set selected with respect to the defined axis (tree relationship between the nodes selected and the context node) of the location step.

An expression can also be a function call, which, optionally, takes arguments. The EBNF (Extended Backus Naur form) definition of a function call is taken from Section 3.2 of the above referenced W3C Recommendation found at http://www.w3.org/TR/xpath. An example of such an expression is:

FunctionCall::=FunctionName '(' (Argument(','Argument)*)?')'
Argument::=Expr

Note the production Expr is the basic construct of XPath. A core function library exists which must be implemented by XPath implementations. Each function in the library is specified using a function prototype which gives the return type, the name of the function and the type of arguments. Although no core functions exist that can be used to pass the request to perform an unstructured query, it is trivial to extend XPath by defining a user function.

Therefore, the syntax for requests is based on XPath with additional functionality to specify parameters that control the transmission of metadata to media browser. The syntax is detailed below using EBNF:

Request::=XPathExpression ('&' ParameterList)?
ParameterList::=MaximumItems? ('&' StartItem)? ('&' NumberLevels)? ('&' TransactionID)?
MaximumItems::='maxItems='Number
StartItem::='startItem='Number
NumberLevels::='noLevels='Number
TransactionID::='requestID='Nmtoken
Number::=Digit (Digit)*

The Request contains a single XPathExpression followed by an optional ParameterList. The XPathExpression matches the production LocationPath of the XPath Version 1.0 described at http://www.w3.org/TR/xpath with the exception that the predicate expression must support the following additional function call:

Function: Boolean query(unstructuredQuery).

This function can be included in a location path and can be used to request that the metadata server 212 pass the unstructured query on to a search engine associated with the database 210. For example, the location path /Lifestyles/images[query("surfing")] would therefore be interpreted by a metadata server 212 as finding all those images that are children of the Lifestyles node that satisfy the unstructured query "surfing". Note that the expression unstructuredQuery must be encoded appropriately for inclusion in the URI. Appropriate encoding is specified by the Network Working Group's Request for Comments (RFC) 2396 available from http://www.ietf.org/rfc.html.

Both Nmtoken and Digit mentioned above are defined in the XML Version 1.0 Recommendation (see http://www.w3.org/TR/1998/REC-xml-19980210).

The ParameterList component of a Request is optional. ParameterList contains the optional individual productions MaximumItems, StartItem, NumberLevels and TransactionID which specify the maxItems, startItem, noLevels and requestID parameters, respectively. If any of these parameters are not specified then the media browser 101 uses a default value.

The parameter maxItems refers to the maximum number of items to be returned by the metadata server 212. So, for example, if a particular section of a collection contained a large number of items then media browser could request the first, say (n=101) items. The default value is specified by the user within the media browser 101. This parameter is automatically inserted into the Request by the media browser 101. If the user does not specify a value, a system default is used (eg. maxItems=100)

The startItem parameter allows the media browser 101 to get the next n items starting from a specified item number. The startItem parameter is useful in retrieving search results from a metadata server 212. If it is not specified in a URI, then a value of '1' is assumed by the metadata server 212.

The parameter noLevels enables the media browser 101 to define the structure of the returned description. Typically a single (hierarchical) level of description is required, however more levels may be desirable in the event of a user requesting a particular view that contains more than one level of the hierarchy (eg. scenes and clips for a video). If this parameter is not specified then a value of one (hierarchical) level is assumed.

The requestID parameter allows a request to be formulated that refers to a previous request. For example, it may be desirable to obtain the next set of items from a previous request. If a requestID is specified then the metadata server 212 will attempt to reply using the previous request that is identified by the requestID. If the request identified by the requestID is no longer available in a cache of the metadata server 212 then the processing associated with the request will have to be repeated. The requestID is a unique value for the metadata server 212 and is generated by the metadata server 212 (and may be based on a timestamp representing the receipt of the request by the metadata server 212). The requestID can be returned to the media browser 101 using an element having the type, or being derived from the type, MetadataCollection (see Example F).

Browsing Requests

In one implementation a default Request, used when initially gaining browsing entry to a metadata collection for the purposes of browsing, may be the XPathExpression, "/*" with any desired parameters formatted in a ParameterList (eg. "/*&maxItems=100&noLevels=2"). The corresponding URI would then be:

http://mySite/myMetadataSvr?/*&maxItems= 100&noLevels=2 where //mySite/myMetadataSvr is the URI of the metadata server process.

On receipt of this request, the metadata server 212 invokes a procedure to satisfy the request. This procedure results in the dynamic generation of an XML description of the associated metadata collection. This description thus reflects a structure by which the associated metadata collection may be browsed. It is common for the metadata collection to be stored in a database of some form. For example, the metadata server 212 may be configured to provide category or publisher sections for the collection so that users can more readily browse the metadata. Typically these categories are reflected in the schema used to describe the database items. Alternatively, the metadata server 212 may reply to the request from the media browser 101 by simply sending a list of all the separate items in the database.

For the purpose of describing a typical scenario of use, consider an image metadata database with the following structure. The database is composed of a number of categories including Lifestyles, Sports and Animals as illustrated in FIG. 7. Whereas the Lifestyles category has no further structure (ie. it is composed of solely images), the Sports category is structured further into subcategories and the Animals category is structured further into subcategories and then image classes. It is not important how this data is actually stored for the purposes of the present description.

There is no fixed way that a metadata server 212 may implement its translation facility for its metadata collection. One possible way is described below.

The metadata server 212 generates descriptions based on an XML schema definitions of types for Categories, Subcategories, Classes and Images. Typically these schema definitions reside in a single XML Schema document. Preferably these definitions use the core attributes of the media browser 101 and the global XLink attributes (see Section II above). A basic example of such definitions is provided below in Example G of an XML Schema. Note, that the definitions can use the xlink:show attribute to direct the media browser 101 to "embed" the target of the link at the source (ie. the description fragment generated by the metadata server 212 would be simply included as the content of the link source element). Definitions may also set this attribute value to "replace", in which case the media browser 101 would replace the descriptor, which is the link source, with the description fragment served by the metadata server 212.

EXAMPLE G

XML Schema Example

```
1.    <?xml version='1.0'?>
2.    <schema
3.        xmlns = 'http://www.w3.org/1999/XMLSchema'
4.        xmlns:mb = 'http://www.cisra.com.au/MediaBrowser'
5.        xmlns:xlink = 'http://www.w3.org/1999/xlink'
6.        xmlns:image = 'http://www.somesite/ImageLibrary'
7.        targetNamespace = 'http://www.somesite/ImageLibrary'
8.        version = '1.0'>
9.    <element name = 'ImageLibrary'>
10.       <complexType>
11.          <complexContent>
12.             <extension base = 'mb:MetadataCollection'>
13.                <choice>
14.                   <element ref = 'im:Category' minOccurs = '0'
                                                  maxOccurs = 'unbounded'/>
15.                   <element ref = 'im:SubCategory' minOccurs = '0'
                                                  maxOccurs = 'unbounded'/>
16.                   <element ref = 'im:Class' minOccurs = '0'
                                                  maxOccurs = 'unbounded'/>
17.                   <element ref = 'im:Image' minOccurs = '0'
                                                  maxOccurs = 'unbounded'/>
18.                </choice>
19.             </extension>
20.          </complexContent>
21.       </complexType>
22.    </element>
23.    <element name = 'Category'>
24.       <complexType>
25.          <choice>
26.             <element ref = 'im:SubCatgeory'/>
27.             <element ref = 'im:Image'/>
28.          </choice>
29.          <attributeGroup ref = 'mb:TOCDescriptorAttributes'/>
30.          <attribute ref = 'xlink:type'/>
31.          <attribute ref = 'xlink:href'/>
32.          <attribute ref = 'xlink:role'/>
33.          <attribute ref = 'xlink:show'/>
34.       </complexType>
35.    </element>
```

-continued

```
36.     <element name = 'SubCategory'>
37.        <complexType>
38.           <choice>
39.              <element ref = 'im:Class'/>
40.              <element ref = 'im:Image'/>
41.           </choice>
42.           <attributeGroup ref = 'mb:TOCDescriptorAttributes'/>
43.           <attribute ref = 'xlink:type'/>
44.           <attribute ref = 'xlink:href'/>
45.           <attribute ref = 'xlink:role'/>
46.           <attribute ref = 'xlink:show'/>
47.        </complexType>
49.     </element>
50.     <element name = 'Class'>
51.        <complexType>
52.           <element ref = 'im:Image'/>
53.           <attributeGroup ref = 'mb:TOCDescriptorAttributes'/>
54.           <attribute ref = 'xlink:type'/>
55.           <attribute ref = 'xlink:href'/>
56.           <attribute ref = 'xlink:role'/>
57.           <attribute ref = 'xlink:show'/>
58.        </complexType>
59.     </element>
60.     element name = 'Image'>
61.        <complexType>
62.           <sequence>
63.              <element ref = 'im:ImageID'/>
64.              <element ref = 'im:Name'/>
65.              <element ref = 'im:Caption'/>
66.              <element ref = 'im:Photographer'/>
67.              <element ref = 'im:Keywords'/>
68.           </sequence>
69.           <attributeGroup ref = 'mb:TOCDescriptorAttributes'/>
70.           <attribute ref = 'xlink:type'/>
71.           <attribute ref = 'xlink:href'/>
72.           <attribute ref = 'xlink:role'/>
73.           <attribute ref = 'xlink:show'/>
74.        </complexType>
75.     </element>
76.     <element name = 'Name'>
77.        <complexType>
78.           <simpleContent>
79.              <extension base = 'string'>
80.                 <attributeGroup ref = 'mb:IndexDescriptorAttributes'/>
81.              </extension>
82.           </simpleContent>
83.        </complexType>
84.     </element>
85.     <element name = 'Photographer'>
86.        <complexType>
87.           <simpleContent>
88.              <extension base = 'string'>
89.                 <attributeGroup ref = 'mb:IndexDescriptorAttributes'/>
90.              </extension>
91.           </simpleContent>
92.        </complexType>
93.     </element>
94.     <element name = 'ImageID'>
95.        <complexType>
96.           simpleContent>
97.              <extension base = 'string'>
98.                 <attributeGroup ref = 'mb:IndexDescriptorAttributes'/>
99.              </extension>
100.          </simpleContent>
101.       </complexType>
102.    </element>
103.    <element name = 'Caption'>
104.       <complexType>
105.          <simpleContent>
106.             <extension base = 'string'>
107.                <attributeGroup ref = 'mb:IndexDescriptorAttributes'/>
108.             </extension>
109.          </simpleContent>
110.       </complexType>
111.    </element>
112.    <element name = 'Keywords'>
113.       <complexType>
114.          <simpleContent>
115.             <extension base = 'string'>
```

```
116.            <attributeGroup ref = 'mb:IndexDescriptorAttributes'/>
117.          </extension>
118.        </simpleContent>
119.      </complexType>
120.    </element>
121.  </schema>
```

The schema document in Example G contains a declaration for root element, ImageLibrary, that extends the MetadataCollection type defined for the media browser (mb) namespace (see Example F). It thus inherits all the attributes defined for the base type (i.e., descriptorType, requestID, noItemsIdentified, noItemsReturned, startItemReturned). In addition it is defined to contain any of the following list of descriptors: Category, SubCategory, Class or Image. What is actually returned by the metadata server as the content of this root element will depend on the request received.

The schema document also contains declarations for the following TOC descriptors: Category, SubCategory, Class and Image. Each of these descriptors is defined to contain the attribute group TOCDescriptorAttributes (from the mb namespace and defined in Example A) and a set of linking attributes (type, href, role and show from the xlink namespace).

In this example, the type, show and role attributes will default to "simple", "new" and "resource", respectively, unless overwritten in an instance (e.g., the XML document generated by the metadata server in response to a request). So, for example, the default value of the xlink:show attribute will need to be overwritten if a link to another metadata server request is to be included. In this case, usually the desired value for this attribute is "embed" which instructs the receiver of the generated description to embed the element content description as a child element of the descriptor containing the link source to the metadata server. It is also possible to set the value of the xlink:show attribute to be "replace" which means that the element content of the generated description should replace the descriptor containing the original link to the metadata server. The default value for the xlink:show attribute can be used if a link to a resource is the objective. In this case you want the resource to be displayed in a new window (hence the use of the word "new" for the default value).

Also the generated description will need to overwrite the value of the xlink:role attribute if the objective of link is to link to a further description. In this case the value of this attribute should be set to "description".

Each of the declared descriptors in Example G inherit a visualidentifier attribute (from either the TOCDescriptorAttributes or IndexDescriptorAttributes group). This attribute is used by the media browser 101 to provide a visual representation of the content of the item. For example, if the item is an image then the visualIdentifier attribute value will typically contain the URI of a thumbnail of the image. In the case of categories, subcategories and classes the visualidentifier attribute value can contain the URI of an icon. If this attribute is not specified then, preferably, the media browser 101 generates the visual identifier for the item from a provided textidentifier attribute value, or, in the event that this value is also not provided, from the name of the element (in this case Image, Class, Subcategory or Category).

On receipt of the "/*" Request, the metadata server 212 generates an XML description of the collection as in the XML fragment below of Example H. The description is contained in an element declared to be of type MetadataCollection (see Example G) and it contains returning links to the metadata server for further descriptions. Note that the metadata server needs only specify the XPathExpression in its returning links. It is the responsibility of the media browser to add the ParameterList to the URI before despatching the request.

EXAMPLE H

Returned XML Description Fragment

```
1.   <ImageLibrary
2.       requestID = '19999123'
3.       noItemsIdentified = '3'
4.       startItemReturned = '1'
5.       noItemsReturned = '3'>
6.     <Category
7.         textIdentifier = 'Lifestyles'
8.         xlink:href = "http://mySite/myMetadataSvr?Category[@textIdentifier=
                              'Lifestyles']/Image"
9.         xlink:role = 'description'
10.        xlink:show = 'embed'
11.        visualIdentifier = 'http://mySite/Metadata/icons/Lifestyles.gif'/>
12.    <Category
13.        textIdentifier = 'Sports'
14.        xlink:href = "http://mySite/myMetadataSvr?Category[@textIdentifier=
                              'Sports']/Subcategory"
15.        xlink:role = 'description'
16.        xlink:show = 'embed'
17.        visualIdentifier = 'http://mySite/Metadata/icons/Sports.gif'/>
```

```
18.     <Category
19.        textIdentifier = 'Animals'
20.        xlink:href="http://mySite/myMetadataSvr?Category[@textIdentifier
                            ='Animals']/Subcategory"
21.        xlink:role = 'description'
22.        xlink:show = 'embed'
23.        visualIdentifier = 'http://mySite/Metadata/icons/Animals.gif'/>
24. </ImageLibrary>
```

In the Example H above description, XPathExpressions in the return links to the metadata server 212 are used to identify links to each of the images in the Lifestyles category and the subcategories in the Sports and Animals categories. These links would be activated when a user selects to expand one of the above items when they were visually presented in media browser 101. In the preceding and following examples, the XPathExpressions have been specified as relative location paths assuming that the context node is the root node of the collection. Alternatively, absolute paths can be used.

In Example H above, the URI targets of the return links to the metadata server 212 contains the '[' and ']' characters. In general, according to RFC 2396, it is unwise to leave these characters unencoded in a URI because they can be excluded by some gateways and transport agents. The characters have been left unencoded in this and the following Examples for ease of reading.

If, for example, the visual identifier for the 'Sports' category was selected when the XML fragment shown in Example H was processed and presented to the user, then the corresponding returning link to the metadata server would be actuated. The metadata server 212 would respond to this link by generating and returning a description fragment as now indicated below in Example I.

EXAMPLE I

Returned XML Description Fragment

It is preferred that the returned description be well-formed. Further, the returned description must be able to be parsed by the media browser 101. The action of the media browser 101 on receiving the contents of a link depend on the xlink attribute show as described previously. Typically, this attribute will be set to "embed" in which case the received description is embedded at the source of the link. If the received description used a container element (eg. of type MetadataCollection as defined in Example F) then this element is also embedded. Preferably embedded container elements are defined as having a descriptorType value of "Other" (see Example A). Alternatively as previously mentioned, the xlink:show attribute can be set to "replace" in which case the contents of the link will replace the element containing the link source. If the xlink:show attribute is not included for the linking element in the description generated by the metadata server then the default action is "new". This means that the contents of the link are displayed in a new window. Clearly this is behaviour that is desirable for content (ie. a resource) rather than for a description.

The description of the collection may be further explored by a user selecting one of these subcategories. This action would result in the metadata server 212 generating a description of the images contained in the selected subcategory.

Note that the description of Example I, which is dynamically generated by the metadata server 212, contains only a single hierarchical level. This can be altered by specifying the noLevels parameter in the ParameterList of the URI. In some cases a Request might require two levels of hierarchi-

```
1.  <ImageLibrary
2.     requestID = '19999124'
3.     noItemsIdentified = '1200'
4.     startItemReturned = '1'
5.     noItemsReturned = '100'>
6.     <Subcategory
7.        textIdentifier = 'Basketball'
8.        xlink:href = "http://mySite/myMetadataSvr?Category[@textIdentifier=
                             'Sports']/Subcategory[@textIdentifier='Basketball']/Image"
9.        xlink:role = 'description'
10.       xlink:show = 'embed'/>
11.    <Subcategory
12.       textIdentifier = 'Football'
13.       xlink:href = "http://mySite/myMetadataSvr?Category[@textIdentifier=
                             'Sports']/Subcategory[@textIdentifier='Football']/Image"
14.       xlink:role = 'description'
15.       xlink:show = 'embed'/>
16.    <Subcategory
17.       textIdentifier = 'Hockey
18.       xlink:href = "http://mySite/myMetadataSvr?Category[@textIdentifier=
                             'Sports']/Subcategory[@textIdentifier='Hockey']/Image"
20.       xlink:role = 'description'
21.       xlink:show = 'embed'/>
22. </ImageLibrary>
``` cal description in order to generate a view that requires both the parent and the children TOC elements. For example, if the media browser 101 was using a two-level view and wished to retrieve descriptions that contained two levels of TOC hierarchy, then the media browser 101 would append the "noLevels=2" parameter to the URI. For example, the link:

http://mySite/myMetadataSvr?Category/Subcategory [Category/@textIdentifier='Sports']&noLevels=2 would result in the description fragment shown below in Example J.

The second level is assumed to be the TOC children of the level targeted by the link. Preferably, when the value of noLevels is greater than one, the values of the parameters, maxItems and startItem should refer to the lowest TOC level of the description. Similarly, the values of any returned parameters also refer to the lowest level of the description. Note also that the Index Descriptor children of the lowest TOC level can also be included in the returned XML as shown below an Example J.

EXAMPLE J

Returned XML Description Fragment the type of query used by most search engines such as Yahoo! ®, AltaVista®, etc). The major difference between the two query types is that a structured query is formulated with a knowledge of the information source (eg. the schema of the metadata database).

If a structured query is formed then this query is preferably represented using an XPathExpression, with constraints being represented as predicates for location steps, as described for browsing in the previous section. Therefore only unstructured queries need to be considered in this section.

Most metadata collections presently in existence have an unstructured search function. In many cases considerable effort has been expended to make this search function as optimal, in terms of speed and suitable results, as possible. Consequently it is advantageous to use these search facilities whenever an unstructured query is specified by a user.

Unstructured queries can be passed to the metadata server 212 using the query function call defined earlier in this section. This function call is preferably included within a predicate of a step of a location path. As location paths can contain a predicate for each of their location steps, an XPathExpression can contain more than one unstructured query expressions. However, most requests based on

```
1.      <ImageLibrary
2.          requestID = '19999125'
3.          noItemsIdentified = '500'
4.          startItemReturned = '1'
5.          noItemsReturned = '100'>
6.          <Subcategory
7.              textIdentifier = 'Basketball'
8.              xlink:href = "http://mySite/myMetadataSvr?Category[@textIdentifier=
                                    'Sports']/Subcategory[@textIdentifier ='Basketball']/Image"
9.              xlink:role = 'description'
10.             xlink:show = 'embed'>
11.             </Image
12.                 textIdentifier = 'Image1'
13.                 xlink:href = "http://mySite/images/image1.jpg'>
14.                 <ImageID> Image001 </ImageID>
15.                 Etc.
16.             </Image
17.                 textIdentifier = 'Image2'
18.                 xlink:href = "http://mySite/images/image2.jpg'>
19.                 <ImageID> Image002 </ImageID>
20.                 Etc.
m.          </Subcategory>
m+1.        <Subcategory
m+2.            textIdentifier = 'Football'
m+3.            xlink:href = "http://mySite/myMetadataSvr?Category[@textIdentifier
                                    ='Sports']/Subcategory[@textIdentifier ='Football']/Image"
m+4.            xlink:role = 'description'
m+5.            xlink:show = 'embed'>
m+x             Etc.
n.          </Subcategory>
n+1.    </ImageLibrary>
```

Searching Requests

Searching requests can originate from either the user specifying a structured query, using an advanced search option, or the user specifying an unstructured query, using the simple search option. The term "structured" query is used herein to mean a query that is composed of a set of constraints which are expressed in terms of known properties of the information source. These constraints can be combined in a conjunctive (and) or disjunctive (or) manner, or a mixture of the two. The term "unstructured" query is used herein to mean a query which comprises a list of keywords and expressions, with or without conjunctions (eg.

unstructured queries contain a single query expression. For example, the XPathExpression, //image[query("dog OR cat")], will select all the image items that are descendents of the root node and satisfy the query "dog OR cat". Note that the XPathExpression would need to be appropriately encoded before being dispatched as part of a URI (see RFC 2396). For example, space characters should be encoded using the character triplet % 20.

Typically searches can result in a large number of items. The description that is returned to the media browser 101 can be limited in the number of items the description contains by using the maxItems parameter. After receiving the first set of results, the media browser 101 may then request a further set by using the startItem parameter. To do this, the media browser 101 includes the requestID that was returned by the metadata server 212 with the response to the original request. In other words, the returned request D identifies the start of a transaction that can be accessed by later requests.

The above has a number of implications for the configuration of the metadata server 212 as such requires the metadata server 212 to be able to save and access the results of previous requests. However, traditional server arrangements cannot maintain such results of requests in a cache indefinitely. Preferably, if a request arrives referring to a previous request, the metadata server 212 attempts to match the requestID to its cached request results. If the request is no longer in the cache, it is reprocessed. In an alternative arrangement, if a match cannot be achieved, then the metadata server 212 can optionally attempt to match the request on a textual similarity basis with other requests before resorting to reprocessing the request. This approach is helpful in that it can eliminate much duplicated processing by the metadata server 212. The size of the cache for a metadata server 212 can therefore be implementation dependent.

IV. The Media Browser Application

Figure 4:
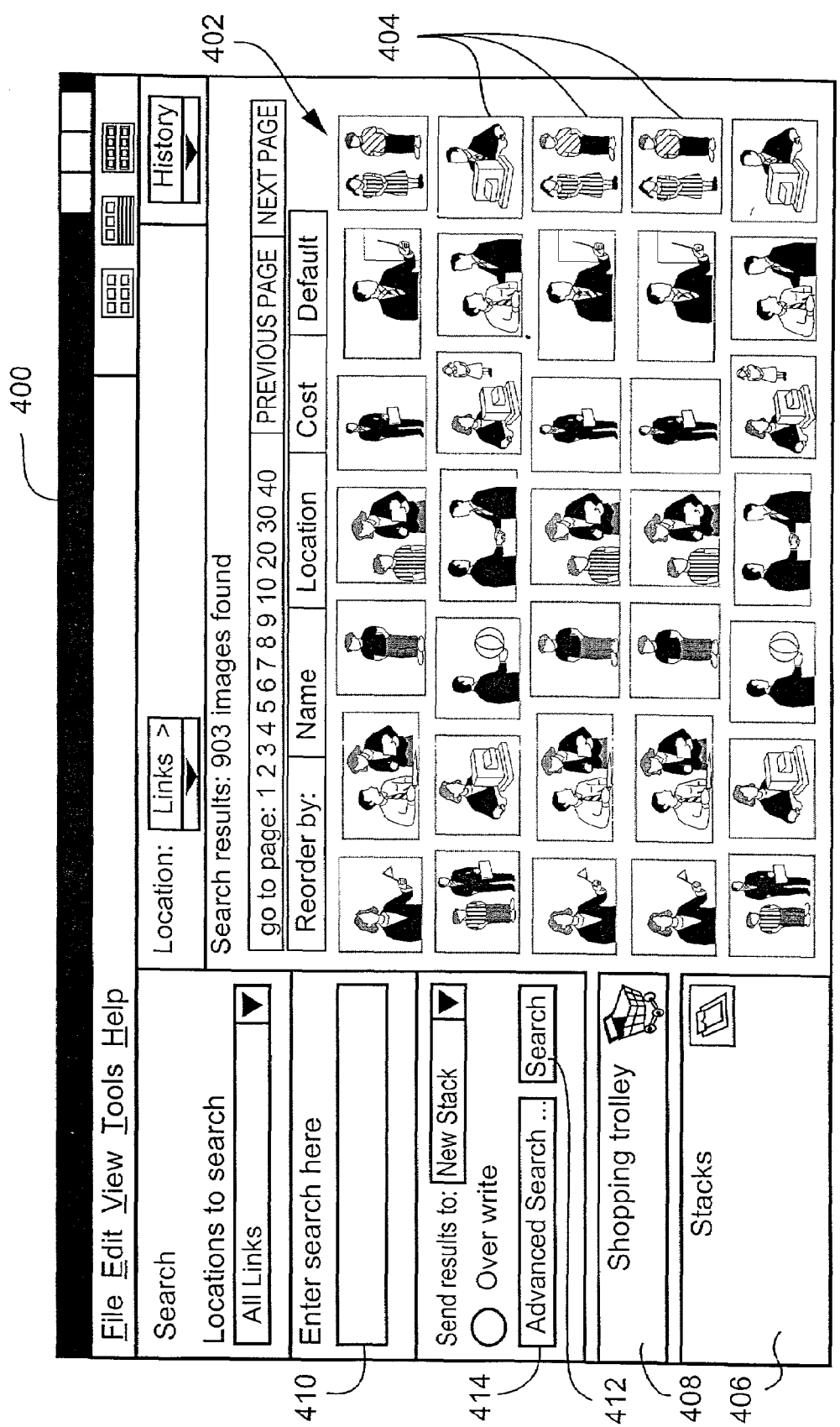
FIG. 4 shows the visual appearance of the user interface of the media browser component of the multimedia access system.

The media browser 101 provides the user with a single user interface for browsing and searching different metadata collections. An example graphical user interface 400 for the media browser 101 is shown in FIG. 4. The media browser interface 400 provides the user with the options of either browsing or searching for (particular items of) content via metadata associated with the (items of) content. The media browser 101 can be implemented as a stand-alone application (eg. like Word97 manufactured by Microsoft Corporation of the USA) or as a service able to be supplied to multiple concurrent users. The preferred arrangement implements the media browser 101 as a service. In this mode each user is required to log in to the service to access their personalised TOC. The service aspect of the media browser 101 is discussed further in Section V below. The present section is devoted to describing the functionality of the media browser 101. The description assumes a media browser service, however it should be evident that the functionality could equally well be implemented as a stand-alone program.

Typically the media browser 101 is implemented with a set of default media tool plug-ins. A user of the media browser 101 can then select, and preferably download via the Internet, further media tools to plug-in to their own implementation. Each plug-in has a defined set of target media types. The separation of media playing/viewing from metadata browsing and searching is an important concept for the media browser 101 as such allows the application to be adapted to particular users/environments.

The media browser 101 enables browsing access to the metadata by providing a Table of Contents (TOC) which represents the structure of the information landscape a user chooses to access. This information landscape can comprise links to local metadata and/or links to remote metadata and is typically customised by each user as the user discovers metadata sites which are relevant to personal interests. A default TOC is preferably provided for each new user.

The underlying information landscape is represented at all levels as a description (ie. an XML document). This means that the base structure of the description, which for XML is a tree containing nodes and links, is the same whether the user is viewing the entry point of the TOC or viewing the details of a description of a multimedia item of content (eg. a digital video). Since the TOC is a visual representation of the information landscape, the user's navigation in the TOC is unchanged for all levels of the TOC. This means that the interface 400 operates the same whether a user is browsing metadata at different Web sites, different sections of a metadata collection (eg. categories in an image metadata collection), or within a description of multimedia content (eg. a clip in the digital video tape).

The TOC is formed by items that are selectable. These items comprise the visual representations of TOC descriptors (see Section II for more details on metadata representation). The items contain visual identifiers to aid the user in browsing. Typically, the visual identifier represents the content in some way. This is especially true for visual identifiers that correspond to items of multimedia content. Examples of visual identifiers include, simple or graphically-designed text, thumbnails of images, animations, and short previews of videos. Preferably, these visual identifiers are provided by the descriptions but, if not, the media browser 101 can graphically generate them from information contained in the description (eg. textidentifier attribute or element name). Visual identifiers have been discussed in more detail in Sections II and III.

Figure 5:
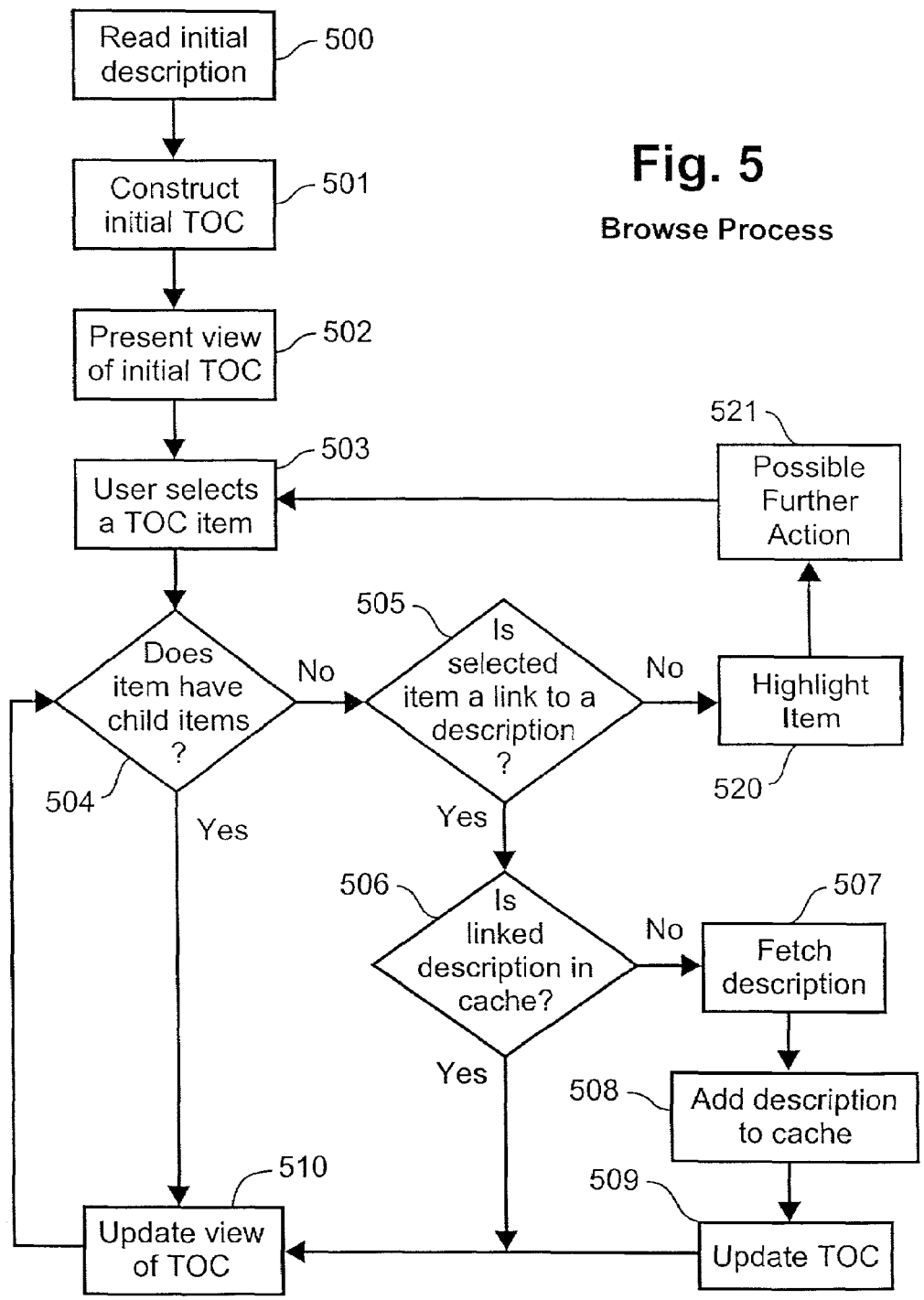
FIG. 5 is a flow chart showing the preferred browsing process of the media browser.

The browsing functionality provided in the preferred arrangement may now be described with reference to FIG. 5. On activating the media browser 101, the initial description of the information landscape is read in step 500. This initial description usually contains a set of top-level links to different metadata collections or sections of metadata collections. The media browser 101 then, in step 501, processes this description and constructs an initial TOC from the description. Typically the processing of a description involves parsing the XML document that contains the description and representing the description using an object model in the computer memory. Preferably, step 501 involves detecting all the TOC descriptors from the description and building a TOC from those descriptors. Preferably, the differentiation between TOC and index descriptors is performed using the core descriptorType attribute as described in Section II.

In step 502 which follows, a view of the initial TOC is generated and presented to the user. This view may be provided in the form of a tree structure as used by applications such as WINDOWS EXPLORER manufactured by Microsoft Corporation. Preferably, a rectangular panel 402 is provided as seen in FIG. 4 showing the visual identifiers 404 that correspond to the items of the initial level of the information landscape. For example, this could be a grid of visual identifiers identifying a number of initial metadata collections.

The media browser 101 then awaits a user event. When a user selects an item, for example by clicking on a visual identifier 404 in step 503, the corresponding descriptor is examined in step 504 to determine whether it has child TOC descriptors. This may be the case if an individual description contains more than one level of structure (eg. a description of a collection may often contain several TOC levels in one description). If the item has child TOC items, then control proceeds to step 510 and the view of the TOC is updated with the child items.

If the selected item has no child TOC items, then in the step 505, the media browser 101 determines whether the item contains a link to a description. This can be achieved explicitly if the linking element, that represents the source of the link, has a specified role of "description" (roles of linking elements are described earlier). If the role of the link is undefined, then the media browser 101 decides whether the target is a further description based on the file extension of the URI of the link target. For example, if the extension is ".xml", then a description will be initially assumed. However, if on parsing the ".xml" file, the file is found not to conform to a specified description scheme, then the media browser 101 preferably treats the ".xml" file as a resource rather than a description.

In the event that the selected item does contain a link to a further description, step 506 is implemented where the media browser 101 determines whether the specified description is available in the description cache (ie. the description has previously been fetched, perhaps for another user or a previous session with the present user). If the description is not available, then the media browser 101 fetches that description in step 507. This can be achieved by forwarding an HTTP get request to a standard web server. The returned description is processed and stored in the description cache in step 508. In step 509, the TOC is then updated to reflect the new description using the same principles that were used in creating the initial TOC. Finally the view of the TOC is also updated in step 510 and presented to the user for further interaction. After step 510, control returns to step 503 where a further selection from the TOC may be made.

The browsing event described in the previous paragraphs results preferably in the viewing panel being updated to contain the items at the new level of the information landscape. For example, this new level may show the major categories of a particular metadata collection.

In the event that, at step 505, the selected item did not contain a link to a further description, the link is treated as a link to an item of content. The visual identifier of the item is highlighted in step 520 and further actions can occur in step 521. For example, the identifier could be selected with a number of other items to be dragged to a stack 406 or a shopping trolley 408 forming part of the interface 400. If a link to an item of content is double clicked by the user then the item is immediately presented or played using the default media tool for the content type of the selected item.

A preferred implementation of the media browser 101 allows two types of searches. A simple search is constructed by the user providing a text query in a search entry box 410 and selecting a simple search function 412. The user is also able to construct an advanced structured query using a list of the available index descriptors by selecting an advanced search 414. The latter option is possible because the media browser 101 has knowledge of the schemas used for the different descriptions. Preferably, the media browser 101 can construct a list of the index descriptors which are relevant to one or more selected descriptors and the user can specify constraints for the query by entering required values for selected index descriptors. Preferably the constraints thus entered by a user are joined conjunctively (in an "AND" fashion), however clearly other alternatives (disjunctive combination or some mixture of the two) are also possible. The user should also be able to specify the type of constraint (eg. equal to, less than, greater than, contains, not equal to). For example, if a user would like to search an image database for images that are published by Publisher "ABC" and have a cost in the range $100 to $200, a query is more likely to be successful if the user can build a structured query directly from the descriptors available rather than just use keywords in a textual query. The latter approach, which corresponds to the simple search function mentioned above, could result in the strings "ABC", "$100" and "$200" being located anywhere in image descriptions. The processing of structured search queries is discussed further below.

Figure 6:
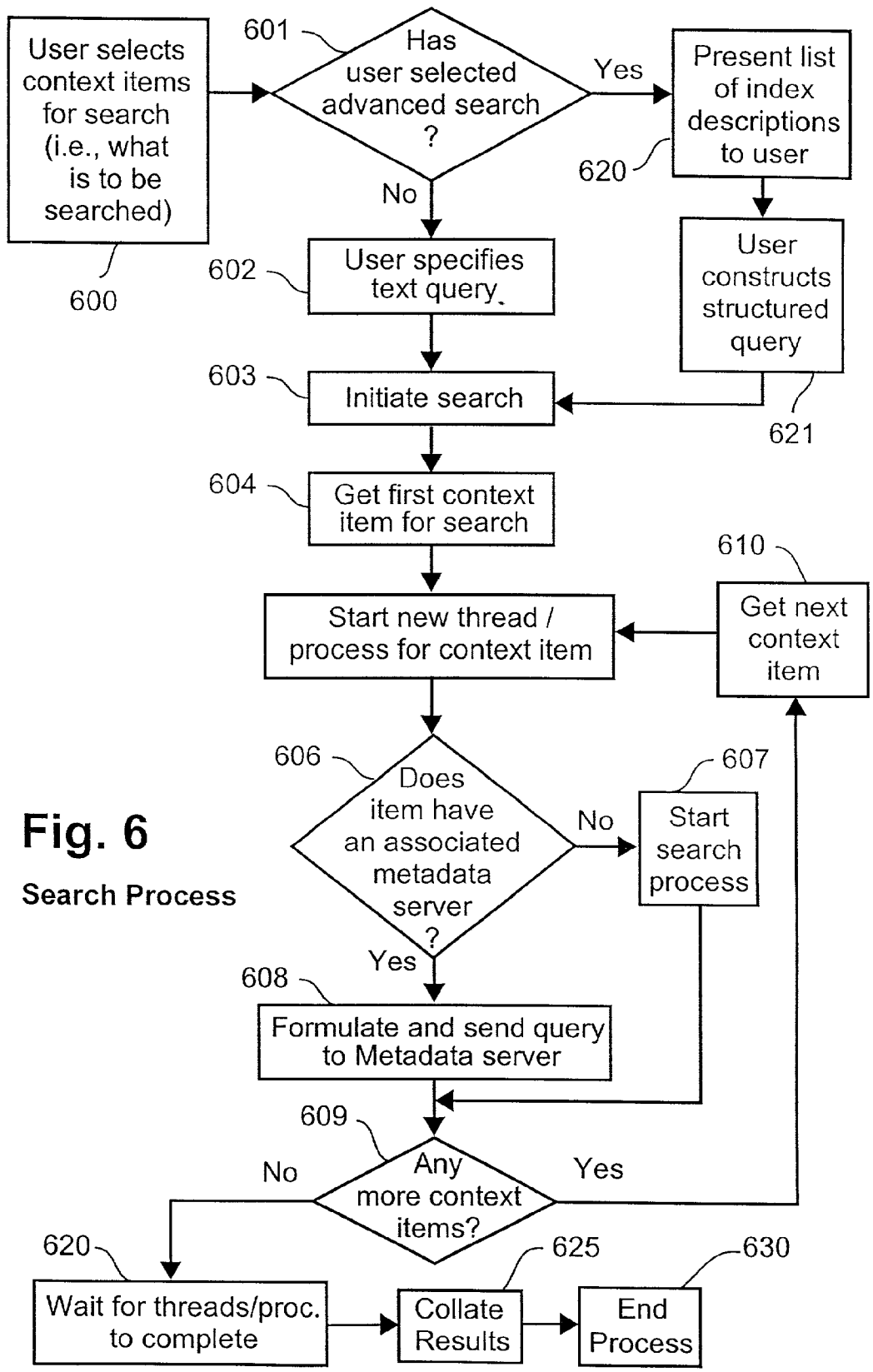
FIG. 6 is a flow chart showing the preferred searching process of the media browser.

The searching functionality of the preferred arrangement of media browser is described now with reference to FIG. 6. In a first step 600, the user specifies one or more context items for the search. These are items in the TOC that are to be searched when the search is initiated in step 603. Step 601 determines if the user selects an advanced search. If the user does not select to perform an advanced search, control passes to step 602 where the user is required to specify a text query as mentioned above. This query may be from a list of keywords or phrases that the user is interested in.

If the user selects to perform an advanced search then control passes from step 601 to step 620. A list of available index descriptors is then generated from schema definitions and declarations that are relevant to any of the descriptions contained in the list of context items. In a preferred implementation, index descriptors are distinguished from TOC descriptors by the descriptorType attribute as discussed in Section II above. The user in step 621 can then formulate a structured query based on the list of available descriptors and a set of basic search conjunctive operators (eg. AND, OR, and NOT). The user can also express acceptable ranges on particular index descriptors (eg. the price of an item must be >$100 and <$200) and indicate the type of constraint (eg. equals or contains).

In step 603 the user initiates the search with the current query (textual or structured). This is followed by step 604 where the first item in the list of context items is identified. A new thread or process is created and then started for the context item in step 605. In step 606, which follows, a check is made to see whether the identified context item has an associated metadata server. If the context item is the origin or root for a particular metadata collection, step 606 involves checking the link in the description. If the identified context item is not an origin or root item, then it is necessary to examine the TOC to establish whether a metadata server exists for a parent of the identified item. If such a check results in the location of a relevant metadata server for the identified item, then the context of the identified item within the metadata collection is included in the location path of the XPathExpression which carries the query as a request to the metadata server. For example, if a selected context item for a search was "Lifestyle category" in "Image Collection ABC" then the search request would be passed to the metadata server in a URI such as:

http://www.ImagesABC.com/MetadataSvr?/Category
       [textIdentifier='Lifestyles']/Image[query[<expression>]

where <expression> contains the unstructured query.

If an associated metadata server is identified in step 606 then the query is formulated as a URI (using the request syntax described in Section III) and sent to the identified metadata server in step 608.

If no metadata server is identified then in step 606, a search is commenced for items satisfying the request in the identified context item in step 604 and then control passes to step 609 where any further context items are detected. If further items exist then, in step 610, the next item in the list of context items is identified, and control returns to step 605. If step 609 finds no more context items remain to be identified, then control passes to step 620 where the search process waits for search results to arrive. It will be appreciated in this regard that numerous search processes on individual context items may operate and return results substantially simultaneously. When all threads, or processes, complete, the results of the individual search processes are collated in step 625 and the process ends in step 630. In an alternative embodiment, collation and display of results can begin before all threads are complete.

In the preferred implementation, the user's query (structured or unstructured) is passed unchanged to each of the selected contexts. In an alternative implementation, the effective query forwarded to each of the contexts could be modified by the system to take into account the capabilities of the context.

Users can use the browsing and searching functionality of the media browser 101 to locate multimedia content that is of interest. Users can build up temporary collections of items by dragging the visual identifiers of items onto stacks 406 as shown in FIG. 4. The stacks 406 represent collections of metadata references which can be optionally saved and recalled in a later session. The stacks 406 are treated like any other level of the information landscape in that they can be viewed in the viewing window and can be selected as a context item for a search. The stacks 406 can also be inserted in the information landscape under a "Stacks" heading on the entry TOC. Users can save the contents of stacks 406 and then retrieve and use the saved stacks 406 at later sessions.

If content is desired immediately and is available for on-line purchase, then the user can drag the item to the shopping trolley 408. The shopping trolley 408 is effectively a specialised stack. Alternative interfaces could simply represent the shopping trolley 408 as such. At any time the user can right-click on the shopping trolley to initiate a "purchase" plug-in media tool. Alternatively, the user might move the mouse over the trolley icon to display a menu of available media tool from which the user can make a selection.

The "purchase" plug-in operates in the same fashion as the media tools, already described, which provide media viewing and playing capability. The user can then select an appropriate "purchase" tool for their implementation. The purchase tool simply examines each of the items in the shopping trolley 408, establishes whether those items can be purchased on-line and, if so, redirects the user to the content provider/distributor's site to purchase the item. In an alternative configuration, users can establish accounts with a media browser service and to purchase items through these accounts. Media browser services are discussed further in Section V.

V. Media Browser Business System

The media browser 101 described in Section IV can be implemented as a service. In a preferred implementation, the media browser 101 is technically implemented as a client—server application and operated as a service to which users can login from the Internet. Each user is preferably securely identified by a password and can store up to a specified limit of data with the service. This user data is composed of an initial TOC description, user preferences, stored stacks and other information required for client operation (eg. user preferences, information about locally installed plugins, etc.). Preferably this service is provided to the user for a periodic (eg. monthly) subscription fee.

One of the main technical advantages of operating the media browser 101 as a service as described above is that descriptions can be cached. As such, for example, if company "ABC" installed a media browser service, and a large number of the users at company "ABC" used a particular metadata collection, the descriptions from this collection would be available in the description cache of the service. In other words, the descriptions would not need to be fetched for each individual user. This represents a key advantage.

In the preferred implementation, the media browser service operates as a service linked to a standard web server. The media browser client can thus be implemented using a standard Web browser. This means that users can simply go to the media browser home page to start the client on the user's own computer workstation. The server typically operates continuously just as a standard web server does in most web sites.

In the preferred implementation model, a default media browser server is operated from the site of a primary service provider (eg. the company which owns the right to the intellectual property of the technology). Other parties can purchase the rights to install their own media browser service on their own intranet. Such an option may be desirable for parties wanting to optimise the speed of the service for users of their intranet.

A further advantage of the above disclosure lies in a business system centred around the concept of the metadata server 212. As described in Section III, the metadata server 212 provides a means by which a content provider/distributor can make available the metadata stored in a legacy system, such as an SQL database. Therefore, the ability of a content provider/distributor to have a metadata server 212 serving their metadata collection effectively opens their customer base as potential customers now can access their metadata from potentially many sites. Indeed each media browser client can potentially provide access to the content provider/distributor's metadata collection. This provides the benefit of increased sales and exposure.

However, as with all Web sites hoping to introduce the Internet public to their wares/content, potential customers need to know about the existence of the metadata server 212 of the content provider/distributor. To permit this to occur, when a content provider/distributor decides to become involved in the media browser/metadata server system 100, the content provider/distributor downloads a sample (customisable) metadata server from the primary media browser service provider. With this, the content provider can modify the sample metadata server from common platform to one that incorporates a specific translator for interfacing the XML Schema format to the database format used by the corresponding database manager to access the legacy database of the content provider. One of the options for the content provider, on configuring the sample metadata server, is to select to have their newly "customised" metadata server included as a link on the default TOC entry that is distributed with all media browser services. This means that the link to the new metadata server would appear on the default service at the primary media browser service provider and would be distributed with the media browser software to each of the secondary services. This provides for direct advertising of the content provider's wares. Clearly, users can then customise their own TOC when they begin working with the media browser service. However, an initial presence of the link on the entry TOC introduces the user to the metadata collection made visible via the newly linked metadata server.

In selecting to have a link to their metadata server included in the standard TOC, the content provider/distributor may agree to be billed a certain fee for each quanta of requests that their metadata server handles. This fee may be typically very small (eg. US$1 for every 10,000 requests). Preferably the installed metadata server has an integrated billing mechanism which is responsible for keeping a tally of the number of requests and then periodically billing the content provider/distributor for the service. A credit card number to be charged may be stored in a secure fashion within the metadata server and billing performed in an automated and electronic fashion.

In summary, the provision of a metadata server by the primary media browser service permits the content provider/distributor to provide an enhanced service and mechanism for advertising and selling multimedia content. The implementation of the metadata server effectively "opens up" the metadata collection of the content provider/distributor to a wider audience than that accustomed to simply visiting a search engine operated by the content provider/distributor. In addition the metadata browser/server system makes it more attractive for potential customers to browse/search the metadata because customers can perform these actions in a more convenient (ie. single interface) and time-efficient (ie. in parallel with other metadata collections) manner.

Taking the further step of using media browser services to effectively advertise their open metadata collection widens the potential customer base yet again. For this key additional advantage, the content provider/distributor undertakes to pay a small regular fee based on the number of requests their metadata server handles during a billing period. In the event that few requests are handled then costs charged to the content provider/distributor are small. This is a significant advantage, especially to smaller content providers.

Figure 10:
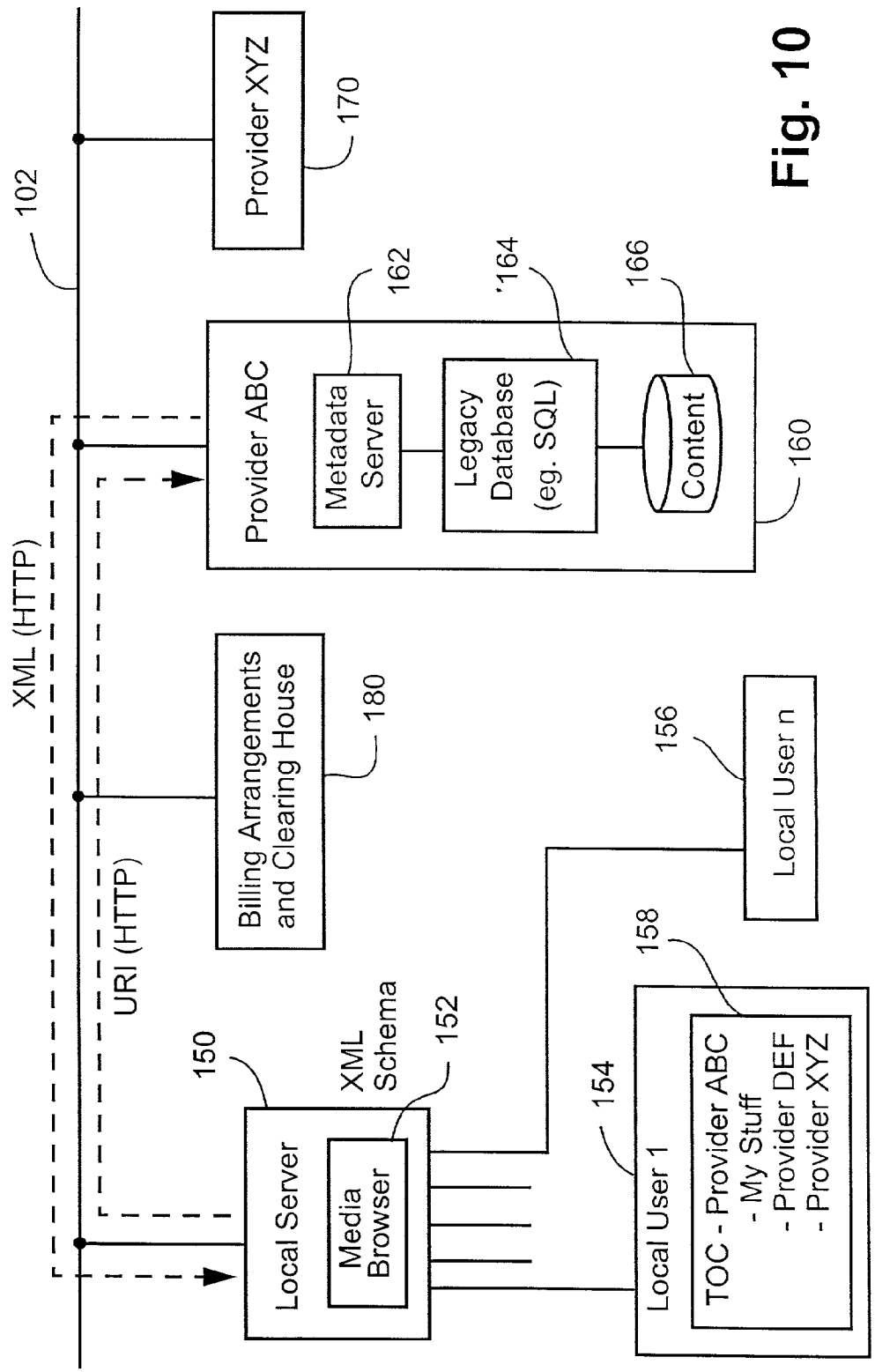
FIG. 10 depicts an example implementation of the system of FIGS. 1 to 8.

FIG. 10 shows an example implementation in which a local server 150 incorporates a media browser service 152 as described above and which is available for use by a number of local users 154 . . . 156 connected to the local server 150. The local server 150 provides for connection between the users 154 . . . 156 and a number of content providers 160 and 170, as well as financial establishment 180, via the Internet 102. The providers 160 and 170 each incorporate a legacy database 164 and a corresponding store 166 of content. Typically the database 164 comprises an array of tables that maps references to content to locations of content within the store 166. A metadata server 162 is also provided and is configured to receive media browser requests transmitted as URI's according to HTTP, and generate XML descriptions to satisfy the media browser requests. With this arrangement, local users 154 . . . 156 having access to the media browser service 152 are able to remotely access the content without having specific knowledge of, or using any call, commands or instructions unique to or associated with the legacy database 164. With such an arrangement, access for the user 154 to the content 166 may occur in a fashion transparent to nature of the database 164 (eg. whether the database is formed using SQL or dBase) whilst retaining the structural, organisational and searching attributes and functions of the database 164.

When performing a search for content across a number of content providers listed in a TOC 158, the local user 154 may, for example, be provided with positive returns for each of providers 160 and 170. At this stage, the proprietor of the local server 150 may invoice each of the providers 160 and 170 for a fee for "introducing" or facilitating access of the local user 150 to the content of each provider 160 and 170. Colloquially, this may be considered a "spotter's fee" and could be charged in a number of ways such as based on the number of searches delivering results, or the number of results delivered by any search, or simply the number of requests that the metadata server processes.

Where the local user 154 is desirous of purchasing content returned by provider 160, a financial transaction may be performed between the local user 154 and the provider 160, perhaps via the financial institution 180, and without affect on or influenced by the local server 150. In an alternative approach, the local server 150 may be interposed as a financial intermediary whereby the provider 160 bills the local server 150 for the purchase of the content, and the local server 150 on-bills to the local user 154. Such an approach may be more convenient and provide enhanced security for transactions than the previous billing and payment arrangement. For example, where content returned by a searching session is desired to be purchased from a number of content providers 160 and 170, the local user need only perform a single transaction with the local server. Since those two parties have a pre-existing relationship, user identification may be more relaxed than if the user were to purchase directly from the provider, with whom no relationship may exist. The same issues apply to the relationship between the local server 150 and the providers 160 and 170.

Although the foregoing describes arrangements and implementations applicable with respect to the provision of multimedia content, other goods and services may also be provided. For example, as seen in FIG. 1 where the link 118 is from the database 117 to physical goods, as opposed to multimedia content that may be downloaded electronically, the capacity of the user to enquire of the database 117, obtain a search result and ultimately perform a purchasing transaction remains.

Further, some implementations may have no commercial basis for a specific financial transaction. For example, patent offices worldwide may choose to make their proprietary databases available to the general public. Implementation of the media browser and servers described above enables this to be performed without a need for specially designed integration software, such as a web-page allowing a user query to be posted to more than one database. Such would therefore permit public access to a federation of distributed heterogenous databases.

VI. Customisation for Devices

Figure 11:
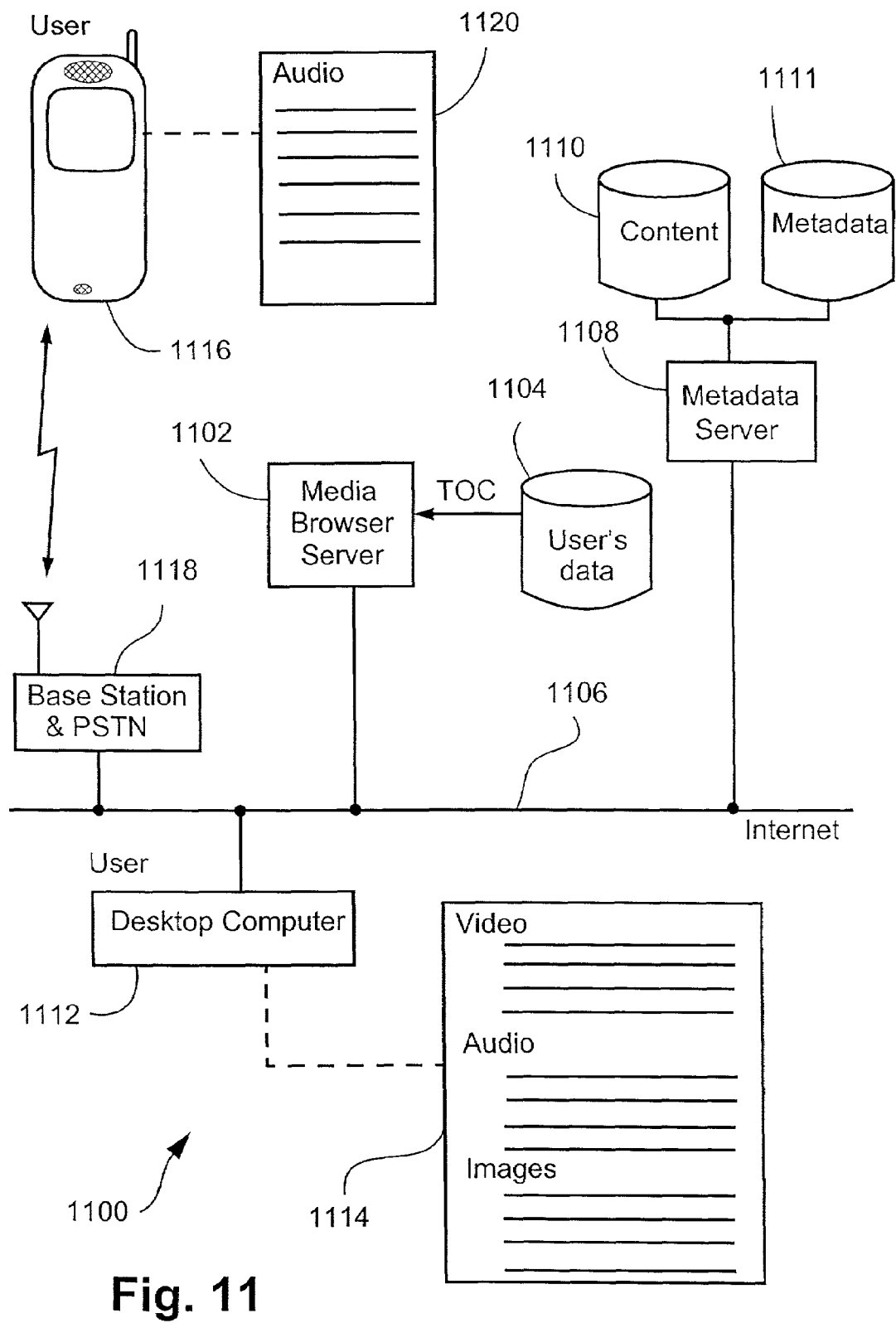
FIG. 11 depicts customisation of the media browser for different devices.

FIG. 11 shows a multimedia access system 1100 in which a user has authorised access to a media browser server 1102 for the purpose of browsing a communication network 1106, such as the Internet, to identify multimedia items of interest to the user and for which reproduction may be desired. The media browser server 1102 is associated with a database 1104 which incorporates table of contents (TOC) data specific to the user and incorporating locations previously visited or available to the user for review. With the table of contents and the media browser server 1102, the user is able to extract multimedia content via a metadata server 1108 having associated therewith a corresponding content repository 1110 and metadata repository 1111.

The user may access the media browser server 1102 by means of a desktop computer 1112, substantially corresponding to the arrangement shown in FIG. 9. With such an arrangement, the desktop computer 1112 has the capacity to reproduce, depending upon its configuration, most types of multimedia items including video, audio, and images, each provided in possibly a number of formats.

In such a situation, the table of contents as supplied to the user at the desktop computer 1112 may appear as the table of contents 1114 which includes metadata relating to video, audio and the image content items. Each of these items are able to be presented in the table of contents 1114 since the desktop computer 1112 has the capacity to reproduce each of those data formats. As a consequence, such may represent the entirety of the user's table of contents as stored within the database 1104 of the media browser server 1102.

However, and according to the present arrangement, when the same user operates an alternative device for media browsing and delivery, the table of contents presented to the user on that alternate device is modified to present only those items of content able to be reproduced on the presently used (ie. alternate) device. This is also illustrated in FIG. 11 where the user operates a mobile telephone handset device 1116 which is able to be connected to the Internet network 1106 via a cellular base station and public switch telephone network 1118. The mobile telephone handset 1116 may, in this regard, perform browsing operations through the media browser server 1102 using an appropriate data format, such as the wireless application protocol (WAP).

In this case however, the mobile telephone handset 1116 is provided with capacity to reproduce only text on a display thereof and to reproduce sound by means of the loud speaker integrally contained therein or using headset device known in the art and connectable to the handset 1106. As a consequence, text browsing (using, for example, the textual identifiers rather than the visual identifiers in the metadata) may be performed using the telephone handset to display a table of contents 1120 limited only to audio items that are able to be reproduced using the loud speaker of the handset 1116. For example, where the handset 1116 incorporates an MP3 player module, audio components within the table of contents 1120 that include MP3 compressed data may be reproduced. Further, audio encoded in other formats, such as 8 or 14-bit PCM may be reproduced band limited to the "telephone" waveband of 300 Hz–3 kHz.

Typically, the content requested by the user is stored at the site of the content provider (eg. metadata server 1108). Alternatively, the content may be stored in a secure fashion together with the media browser service 1102. With such a configuration, the media browser server 1102 can customise the streaming of the content to the device, be it the computer 1112 or telephone 1116, depending upon the destination device in use at the time. Such customisation may involve modifications of bandwidth, coding and any forms of encryption.

Such an arrangement also permits the user to browse content in the form of previews prior to that content being purchased. Once satisfied with a preview, the user may then select to buy a right to access the content. This right may allow the user a single play/view of the digital item, play/view rights for a predetermined period of time, or an unlimited copy of the digital contents (CD or electronic). When purchasing the right to use the content, the user can also specify the quality of the service (QOS) desired for the purchased content (eg. the number of channels, associated movie clips, etc). Once a purchase is made, the QOS will represent the maximum QOS available to the user irrespective of the device being used. This is because if the user logs onto the media browser server 1102 from a device that cannot utilise the purchased QOS, a lower QOS will result. An example of this is where the user purchases the right for reproduction of CD quality audio using the desktop computer 1112. At some later time, whilst in possession of the telephone handset 1116, the user may select reproduction of the previously purchased CD audio which, by virtue of the lower quality output of the telephone handset, may be reproduced at a lower quality of service (eg. telephone quality). Such a change in the QOS can be detected by the media browser server 1102 depending upon the device connected at the time, thereby providing for the media browser server 1102 to extract the appropriate content via the metadata server 1108 at the reproduction QOS applicable to the device in use at the time.

In each instance of the examples noted above, the TOC provided to the user is one derived from the user's data within the repository 1104, but modified by the media browser server 1102 depending on the particular device being used at the time. With such an arrangement, the media browser server 1102 has the capacity to detect the type of device connected to the server 1102 at any time and ensure delivery of content to that device in an appropriate format without delivery of superfluous information. Such an arrangement is desirable through automatically limiting user selections to content that is able to be reproduced, and also in the reduction of bandwidth being consumed by data transfers across the system 1100.

VII. Controlling Right To Use

One problem associated with the provision of electronic multimedia content to users is the extent to which the user may reproduce and/or copy that content for private use and/or distribution. This is particularly important in the case of the on-line sale of audio and video content and in the maintaining of copyright and the provision of royalties to artists and performers. Specifically, this problem is realised once a user has browsed the content available and has purchased a content selection. Typically, the purchasing provides a right to use the content with, in most cases, the purchase price being related to the manner in which the content may be used. Typically, content may be provided with a right to use that varies from a single play or use of the content, a play for a predetermined period of time (eg. one hour, one week, one year), indefinite usage by the purchaser (user) and, in some instances, the right to distribute the content either inhibited or uninhibited by further rights to use.

Figure 12:
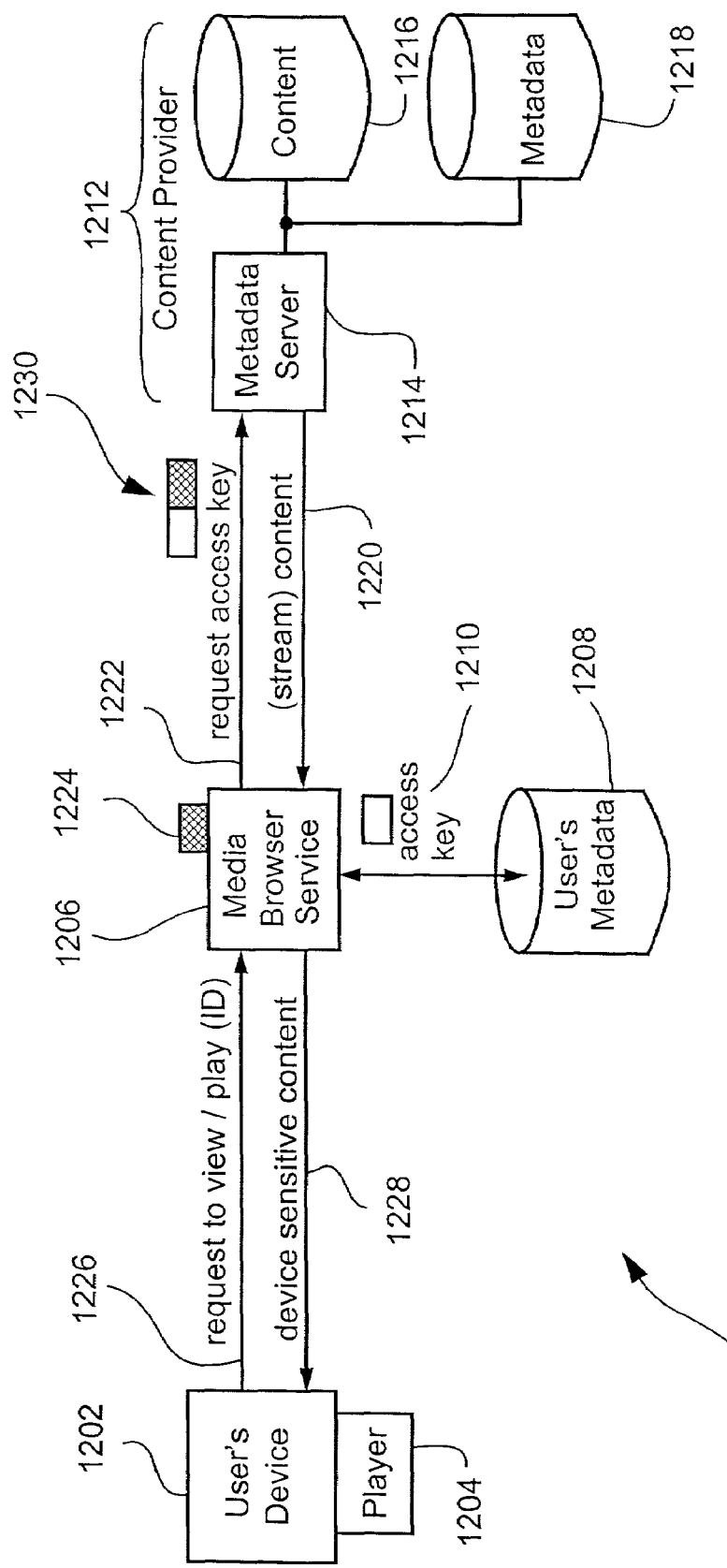
FIG. 12 shows an arrangement by which the right to use multimedia content may be controlled.

An arrangement 1200 providing for such control over the right to use is illustrated in FIG. 12 where a user's device 1202 accesses multimedia content via a media browser service 1206, the content being obtained from a content provider 1212 incorporating a metadata server 1214, a content repository 1216, and a metadata repository 1218 related to the content. As with the previous arrangements, the user of the device 1202 has metadata 1208 associated with the media browser service 1206 and which form the links and control that enable the content to be retrieved from the content provider 1212 and delivered to the user's device 1202.

At the time of purchase, a rich link to metadata from the repository 1218 relating to the stored content 1216 is forwarded to the user. This rich link, which can also be described as metadata, includes a link to the content, the metadata also including information regarding the stored-content 1216 (eg. the listing of the program material) and is used for searching the content, access and usage information giving the user the right to use the content. The access information is required for the user to enable the digital content to be delivered/streamed to the user as and when required. In this fashion, the user does not store the content but, whenever the content is required to be reproduced, the user merely accesses the content via the media browser service 1206. As with the previous arrangement, the content may alternatively be stored with the media browser service 1206 in which case the service 1206 acts as a trusted service for the content provider 1212.

The arrangement 1200 may be operated using either one of the unencrypted or encrypted content being delivered to the user's device 1202. In either case, after purchase, a request 1226 to either view or play the stored content 1216 is issued from the user's device 1212 and received by the media browser service 1206.

In the case of unencrypted delivery, an access key 1230 is sent 1222 from the media browser service 1206 to the metadata server 1214 in response to the request 1226. The metadata server 1214 validates the access key 1230 before delivering/streaming 1220 the stored content 1216. The content 1216 is preferably delivered to the media browser service 1206 and from there to the user 1202 in a device sensitive manner 1228, which in this case is not encrypted. The access key 1230 is preferably formed of two parts. The first part comprises a key part 1210 which is stored with the user's metadata 1208 as part of the media browser service 1206 and operates to identify the user and the item of content that the user has a right to access. The key part 1210 may be a key value entered by the user at the time of purchase of the content 1216 and represents an equivalent to a personal identification number enabling access to that content, and may relate to the specific purchase of content and thus incorporates information regarding the user and the content being purchased. Alternatively, the key part 1210 may be automatically generated by the metadata server 1214. Another part 1224 of the access key 1230 may be unique to the media browser service 1206. As a consequence, the access key 1230 is formed by an authenticated two-part key pair arrangement which, upon receipt by the metadata server 1214, provides for the delivery of the content 1216 to the user's device 1202 whereupon it may be reproduced using a player 1204 forming part of the device 1202.

It is to be noted that this (unencrypted) method described only ensures that the user is a valid receiver of the content purchased. Once the metadata server 1214 delivers the content, the metadata server 1214 has no control over the user storing the content or the content being intercepted by other potential users.

In the case of encrypted content being sent to the user, when the metadata server 1214 receives a valid access key 1230, the metadata server 1214 responds by sending 1220 the content 1216 to the media browser service 1206. This delivery need not be encrypted since, in most implementations, the link between the media browser service 1206 and the metadata server 1214 may be a permanent or otherwise trusted connection. Encryption however may be applied for additional protection. The media browser service 1206 then encrypts the streamed content 1220 using key information that identifies the user's current session and sends the encrypted content to the user's device. In this regard, the key information may be made of or generated from an identification (ID) provided by the user's client device during the request 1226.

The player 1204 at the user's device 1202 then conditionally decrypts the content if it has a valid decryption key. This key may be the key information used to encrypt the content. Alternatively it may be a private key of a public/private key encryption pair. The session ID can form part or whole of a decryption key for the content. The requested time of streaming from the server 1206 may additionally or alternatively be used.

This (encrypted) method of content delivery provides protection at three separate levels. Firstly, at the metadata server 1214, content is only delivered to the media browser server 1206 if a valid access key is received. Preferably, the media browser server 1206 checks whether a request is valid with respect to the set time in the right of use conditions. That is, the media browser server 1206 checks on expiry date before sending the access key 1230 to the metadata server 1214 of the content provider 1212. The media browser service can do this by checking the link to usage information. This requires the usage information to be structured according to a predetermined schema. Alternatively, and preferably, the media browser may just send the request and the metadata server will check the usage rights.

Secondly, the encrypted content cannot be intercepted between the media browser server 1206 and the user's device 1202 because it will not play for another session or user.

Thirdly, the content cannot be stored at the client because the player 1204 conditionally decrypts the content.

Alternatively, the key information used to encrypt the content may include other information such as the access key and expiry date obtained from the right to use metadata, or by a biometric information that can be checked by the player 1204. For example, the biometric information may include a fingerprint, or a voice key identification, to name but a few.

VIII. Communicating Links Between Users

It is often desirable for different users to exchange links to content the users find interesting.

Figure 13A:
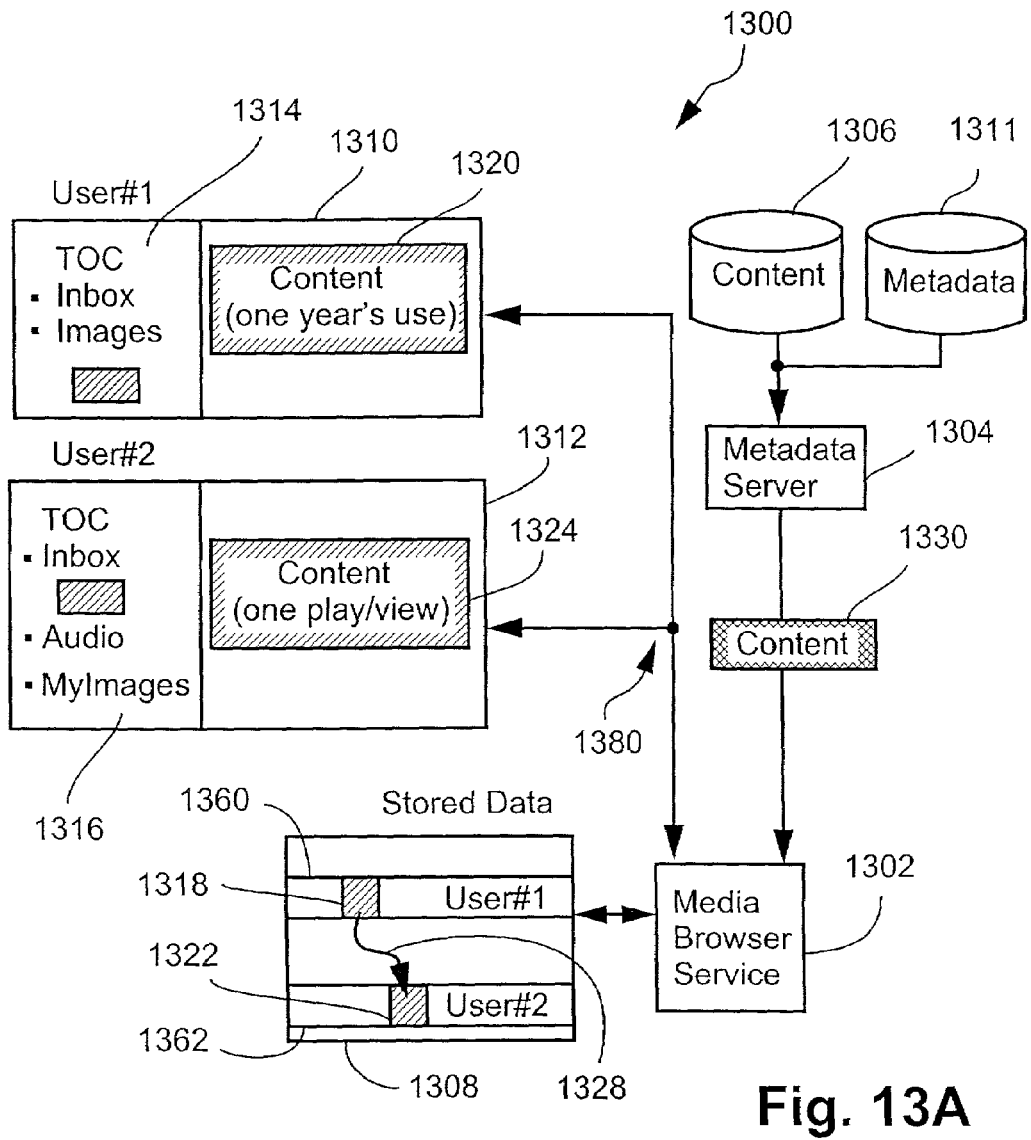
FIGS. 13A, 13B and 13C illustrate methods by which metadata links may be communicated between devices.

FIG. 13A shows an arrangement 1300 where a media browser service 1302 is associated with a metadata server 1304 for the provision of content 1306 to users. The service 1302 incorporates a repository 1308 of tables of contents for each of a number of users. A number of users 1310 and 1312 are registered with and coupled to the service 1302 by means of a communications network 1380, which is typically a public switched telephone network (PSTN) which may incorporate radio frequency components, such as cellular and microwave links in addition to wired landlines.

The first user 1310 has a table of contents 1360 stored within the repository 1308 and similarly the second user 1312 has a table of contents 1362. The table of contents 1360 of the first user 1310 includes a metadata item 1318. Upon logon to the service 1302 by the first user 1310, the TOC 1360 is reproduced 1314 at the user device and is seen to include an image thumbnail corresponding to the item 1318. The metadata item 1318 provides for content 1330 to be delivered to the first user 1310, with the content 1330 as received being associated with the one year use period as seen at 1320.

Where the first user 1310 desires to share the content 1330 with the second user 1312, with knowledge of logon details of the second user 1312 with the service 1302, the first user can transfer the metadata from his TOC 1314/1360 to the TOC 1362. This is seen in FIG. 13A by a transfer 1328 of the metadata 1318 within the repository 1308 from the TOC 1360 to the TOC 1362 to provide metadata 1322. However, since the second user 1312 has not purchased the content 1330, the right-to-use metadata associated with the transfer is altered from "one year's use" to "one play/view" thereby permitting the second user 1312 only a single reproduction of the content 1330. At subsequent logon by the second user 1312, the TOC 1362 is loaded to the user's device and appears as a TOC 1316 where the metadata 1322 is presented in an Inbox of the TOC 1316.

Figure 13C:
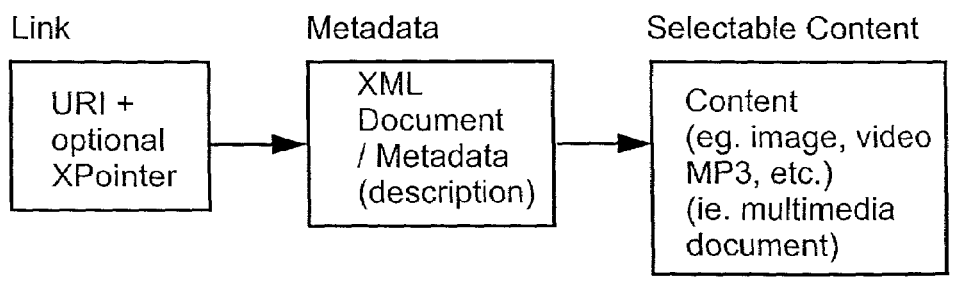
Figure 13B:
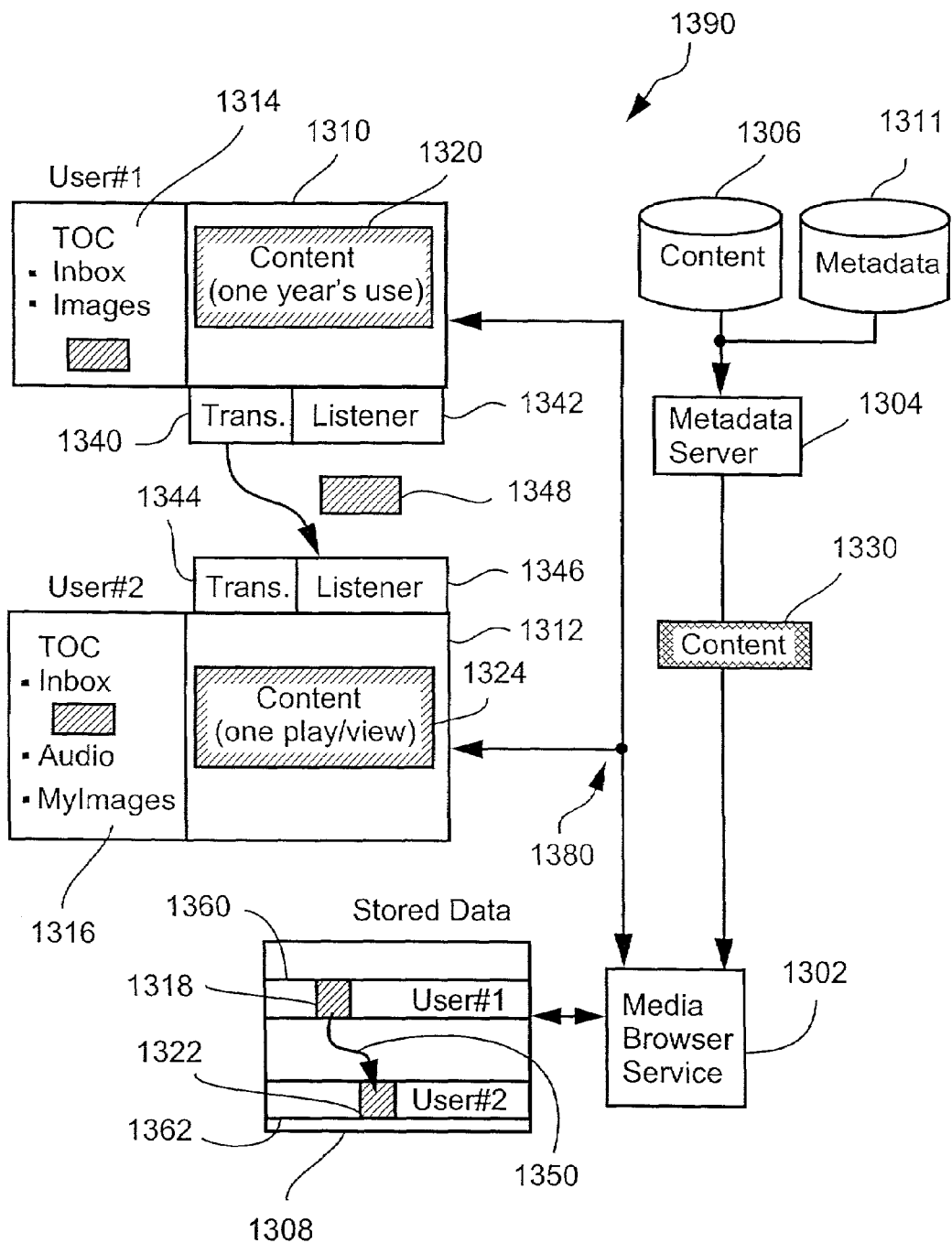

FIG. 13B shows an arrangement 1390 similar to that of FIG. 13A and where like reference numerals relate to corresponding devices having corresponding functions. The arrangement 1390 of FIG. 13B however provides for the wireless communication of the metadata 1318 from the first user 1310 to the second user 1312. In this configuration, each of the user devices are provided with transmitters 1340, 1344 and complementary listeners (receivers) 1342, 1346, as illustrated which provide for bi-directional direct communication between the user devices, using wireless communications such as RF or IR. With such an arrangement, the first user 1310 may transfer the metadata 1348 from the TOC 1314 via the transmitter 1340 for reception by the listener 1346 which can then attend to the conveyance of the metadata to the TOC 1316. From there, the network connection 1380 enables the second user 1312 to update the TOC 1362 with the new item entry 1322. The specific advantage of this approach is that the sender of the information, does not need to know the logon details of the recipient.

A further implementation may be obtained through wired or wireless communication of metadata to a person who is not a registered user of the media browser service 1302. In such an instance, the metadata may be wrapped in a voucher which contains the URI of the sender's 1310 media browser service 1302, together with an anonymous user login for the service 1302. The recipient of the voucher may then select the voucher (eg. via a mouse click) to access the media browser service 1302 and view the metadata via the anonymous login. The recipient can then play the content, dependent upon the right-to-use information in the metadata being sufficiently permissive.

The voucher may be sent by e-mail. The voucher may also be sent in a wireless fashion if a transmitter/listener environment exists between the two devices. The received voucher would then appear on the recipient device's desktop.

In a situation where the metadata 1326 is conveyed using any one of the above described methods, a number of possibilities remain where the metadata includes the right to use information. Firstly, the right to use may be left unchanged and as such may be a default case for content that is provided free of charge. Such an arrangement is unlikely to be supported by content providers who charge a fee for their service. A further possibility is that the right to use defaults to a single use 1328 as illustrated in FIGS. 13A and 13B. A further alternative is that the right to use is altered in some way dictated by the rights to use information of the original metadata. This may involve communication with the metadata server of the content provider and new rights to use being transmitted to the new user. This process could automatically be initiated by the receiving media browser client. In this fashion, the transfer transaction may only be performed with the knowledge of the media browser and/or metadata server who then have the capacity to modify the table of contents of the new user and as a consequence the right to use information.

It is preferable to communicate just the metadata 1326 rather than the content (not illustrated in FIGS. 13A and 13B) for a number of reasons. Firstly, mobile devices usually have larger receive bandwidths than transmit bandwidths (because such does not require an expensive transmitter) and thus the device supplying the link is not burdened by transmitting content. Also, the metadata can include information about the right to use the content and therefore the arrangement is attractive to content providers who desire to limit unlicensed use of the content. This is seen in FIG. 13A where the first user 1316 has a one year use 1318 of the content but, upon providing the metadata links 1326 to the second user 1320, the second user is provided with a "one play only" right to use 1328. Further, an advantage of transmitting only the metadata is that the metadata can be added to the table of contents of the receiving user 1320 and therefore can be used for searching. Such metadata can also enable the receiving user 1320 to purchase the content and to obtain full rights to use as required.

Preferably the metadata in each of the described cases is a link to either an individual description or to a metadata item in the metadata repository associated with the metadata server 1304. The communicated link can either contain the rights to use information or contain a reference or link to this information. The relationship between links, metadata and selectable content is shown in FIG. 13C. Since links, as described above, can also contain attributes, such links can be loosely described also as metadata.

In some instances it may be preferable to stream the content rather than the metadata. The advantage of streaming the content is that the stream content will be able to be received effectively at the same time (synchronised for singing along (karaoke) etc).

IX. Switching Sessions Between Devices

Figure 14:
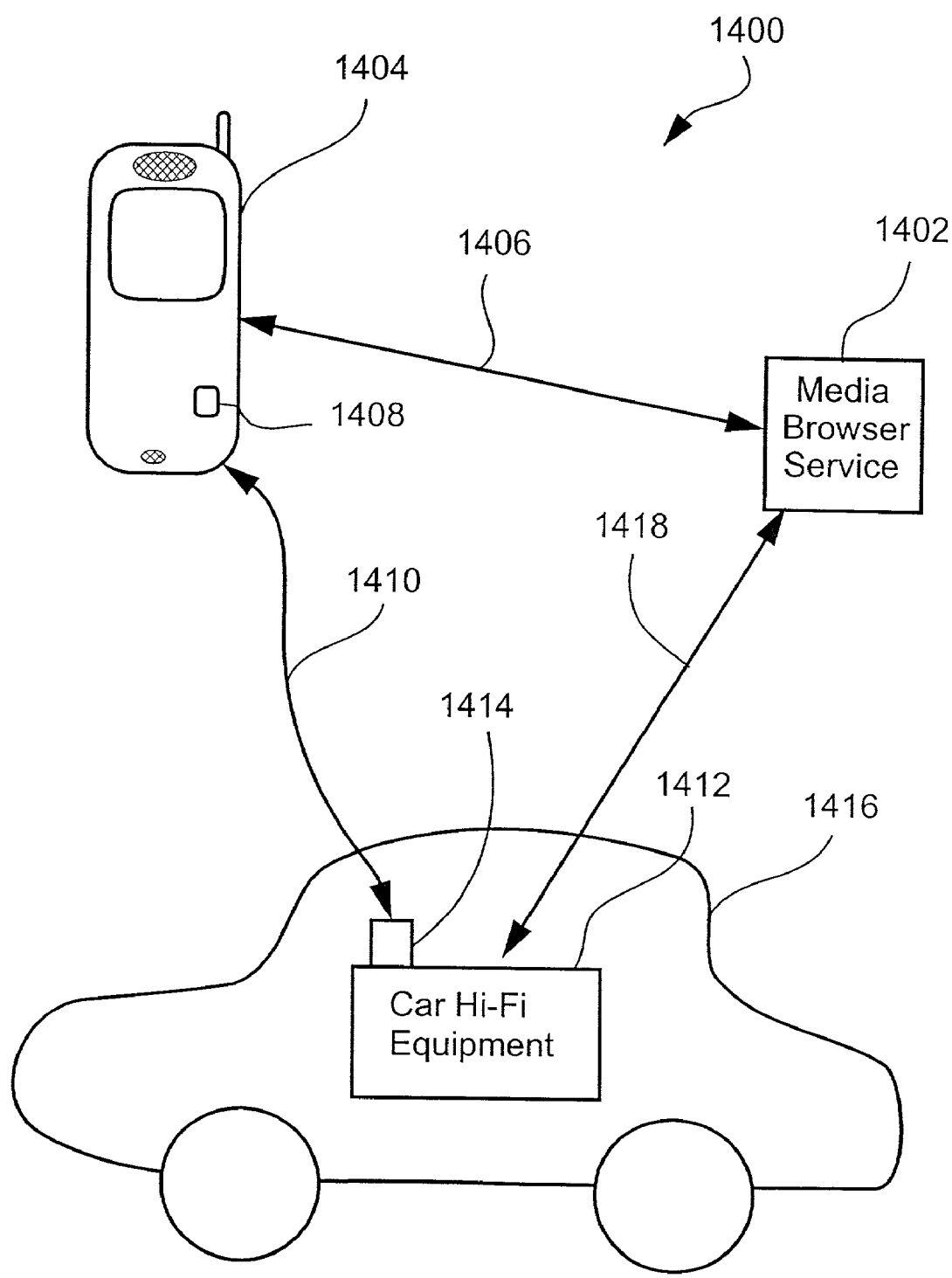
FIG. 14 shows an arrangement by which a current media browser session may be switch from one device to another.

FIG. 14 shows an arrangement 1400 that enables the user to switch a current media browser session from one device to another. Shown is a media browser service 1402 configured to provide multimedia data streaming to a user operating, for example, a mobile telephone handset 1404 or hi-fi audio equipment 1412 within a motor vehicle 1416, each of which are provided with appropriate players for reproduction of the multimedia stream.

In an exemplary operation, the user in possession of the mobile telephone 1404 may request streaming media from a provider accessible via the media browser service 1402. Such may involve payment or may be free of charge. Upon making the request, the telephone 1404 may also transmit to the media browser service 1402 a public key to enable the provider to authenticate the use of the media. The provider can then send to the telephone 1404, via the media browser service 1402 if such are not one and the same, metadata relating to the session. This includes a session identifier and may include a key that is used to unlock the media. The key is encoded with the public key of the telephone 1404 so that only the specific destination telephone 1404 can decode the media using a complementary private key stored within the telephone 1404. The private key is typically secured within memory of the telephone 1404 and is not intended for export from that device, thereby preventing some other device masquerading as the telephone 1404.

After the user has received the media using the telephone 1404 for some time, the user then decides to divert the session (playback) to the equipment 1412 within his/her motor vehicle 1416. To achieve a diversion of the session, the user aims an infra-red (IR) transmitter/receiver (not illustrated in FIG. 14, but known for use with hand portable electronic devices) incorporated in the telephone 1404 at a corresponding IR transmitter/receiver 1414 associated with the car equipment 1412, and through depression of a transmit button 1408, the telephone 1404 transmits the metadata associated with the session to the car equipment 1412.

The car equipment 1412 then operates to renegotiate the session with the media browser service 1402, performing the same step that the telephone 1404 performed to commence the session. This may involve negotiating extra payment, for example where the quality of service able to be reproduced by the equipment 1412 is greater than that of the telephone 1404 and such is desired by the user. A specific handover time is also negotiated, thereby permitting seamless transfer between the players. It will be appreciated in this connection that the car equipment 1412 will include some form of RF transceiver apparatus to permit appropriate communications with the media browser service 1402, via a cellular telephone network for example.

When the handover time is reached, the media browser service 1402 stops sending session media to the telephone 1404 and commences sending the media to the car equipment 1412. The metadata used by the telephone 1404 is now invalid and no more media can be obtained using that particular metadata. The switchover may involve obtaining estimates of the path delays of the telephone 1404 and the car equipment 1412. Methods of estimating path delay in network connections between two participants are known per se in the networking arts.

A specific advantage of this arrangement is that, via the notification to the media browser service 1402, the nature of the content stream may be altered conditional upon the destination device upon which reproduction is to be performed. This may be performed subject to the quality of service purchased when the original sessions was entered. In an alternative, the change of destination device may prompt the user to improve the quality of service by accepting new terms of delivery and any costs associated therewith. In this fashion, the delivery of MP3 audio to the telephone handset 1404 may be replaced by the streaming of CD quality audio to the car hi-fi equipment 1412. Further, having alighted from the motor vehicle 1416, the user may choose to transfer the session to a more advanced device, such as the desktop computer 1112 of FIG. 11, in which case video may be streamed together with the audio where the content being supplied at the time includes a video component (eg. a music video which may be "listened to" on the telephone or in the car radio or viewed (watched and listened to) via the desktop computer 1112).

X. Usage Information

With the various arrangements described above, such as for example FIG. 12, it will be appreciated the content provider 1212 can readily accumulate information about the number of times particular content items have been requested from their metadata server 1214 via the media browser server 1206, or any other such server (not illustrated). However, extra usage information may be provided by the media browser service 1206 and such may include:

(a) the type of devices that are being used to play/view particular items of content; and (b) the usage of particular content items according to demographic and/or geographic indications at the media browser server 1206.

The content provider 1212 will only have total usage statistics from their own metadata server 1214. There may be commercial value in obtaining usage information from individual media browser services. This information could be used to influence how the content provider 1212 advertises their metadata server (ie. whether to pay to have their link included in a default TOC of a particular service).

Although web servers can effectively already provide these statistics for downloads, having this information for streaming content gives more accurate statistics because it measures "uses" rather than downloads. When a user downloads some digital content, no information is obtained about the number of times the content is actually used since the content is stored by the user. With the described arrangements, the content is not stored by the user but streamed or otherwise supplied on each occasion an access is made via the media browser service 1206. Also, obtaining statistics on the usage per device type can assist content providers target their support/research into playing platforms.

XI. Providing Suitability Rating Control

With the various arrangements described, an allowable rating may be associated with a user account with the media browser service 1206, or a particular device. The former requires that there be a range of media browser accounts. Such may be implemented for example by a parent (controller) and child (controlled) accounts. The ratings control could be used for:

(a) controlling playing/viewing; and/or (b) controlling buying.

Although users can currently place rating controls on people using the web (ie. child pages, etc) these rating levels are generally decided globally. The concept of parent/child accounts and allowing parent accounts to specifically control the content able to be played/viewed/purchased using one or more other accounts that are designated as being under the parent's control is a highly desirable and customisable method of controlling access. Importantly, the parent is able to control the access of just their own children.

Access may also be controlled by the reproduction device. In this case the parent and child could have their owner user accounts or use the same account. However, the device used by the child may be used to limit the access to some of the available items.

XII. Locating Media Browser Services

A content provider 1212 may wish to be able to identify, possibly all, media browser services (such as 1206) available over the computer network (Internet, Web, etc). Such may be desired so that the content provider may advertise their content to these services. The content provider 1212 may therefore conduct a search of the network to identify servers that offer the particular (media browser) service and to which the advertising material may be distributed.

XIII. User Interface Navigation

The user interface described above with reference to FIG. 4 is, like most graphical user interfaces (GUI's), a device which seeks to maximise functionality through optimal presentation of graphical information, some of which is selectable. Such a GUI is expected to be used by semi-professional/business users such as graphic designers, marketing persons, and the like, as well as by domestic computer users. As with all GUI's, display real estate is expensive and it is always desirable to optimise information presentation. Navigation through a hierarchical data collection (eg. database, filesystems) is an important component of most GUI's. Traditionally, GUI navigation is performed using a tree-representation of the data collection by which the user selects certain branches of the tree so as to locate desired data. Such a presentation, which occurs for example in WINDOWS EXPLORER (trade mark of Microsoft Corporation of USA), occupies substantial display real estate, typically along an entire side of the display screen (eg. 914). Significantly, where many branching levels are encountered, such trees extend across the width of the display screen occupying further display real estate that may be desired for other purposes.

Figure 16:
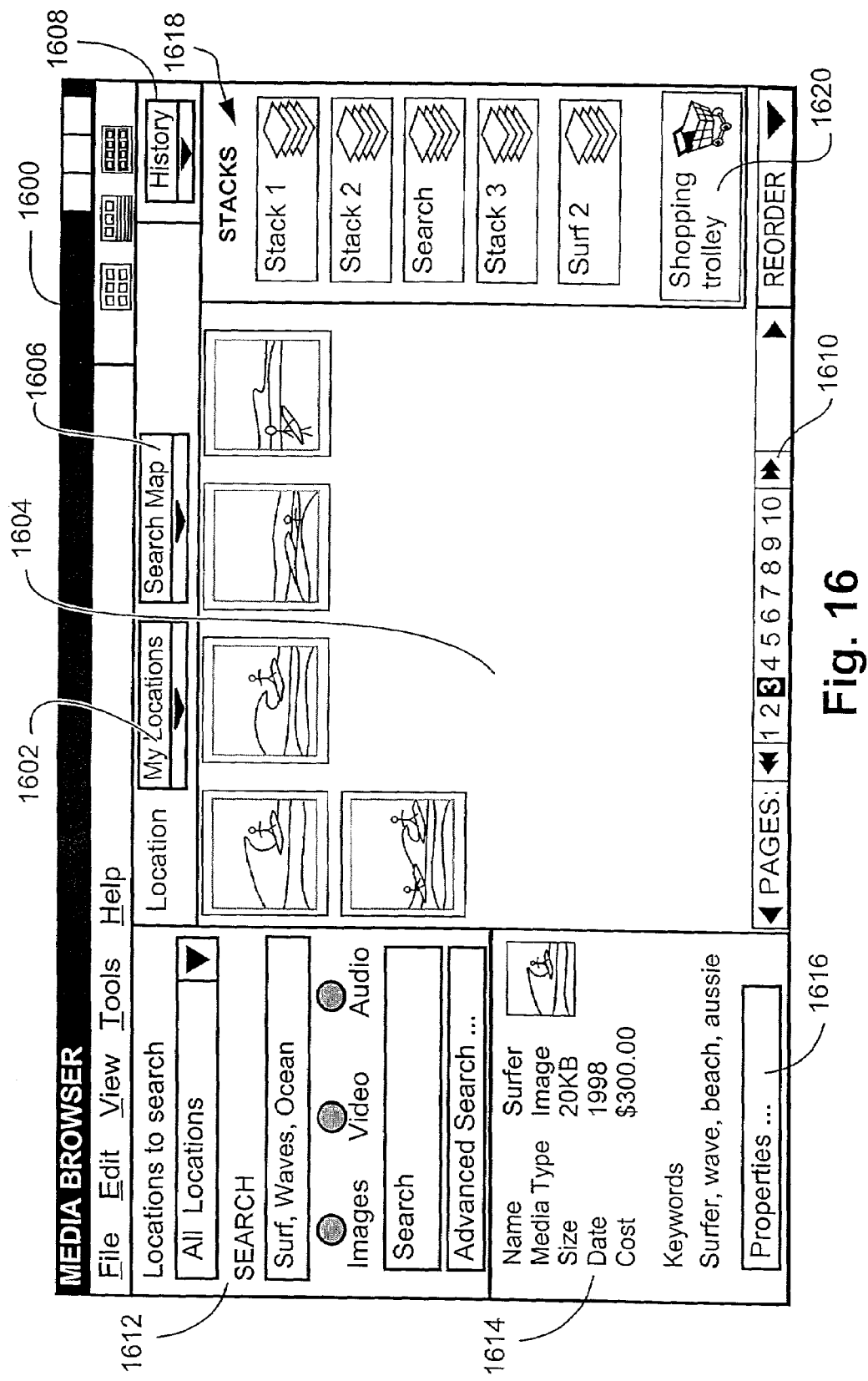
FIG. 16 is an illustration of a preferred media browser graphical user interface.

An alternative GUI which may be used with the media browser arrangements described herein as well as in other arrangements, is an interface 1600 shown in FIG. 16. When a user logs onto the media browser service, the user is presented with his/her current TOC. The top-level items appear in a browse window represented by their visual identifiers.

Navigation through a user's information landscape, or TOC, can be achieved by the user interacting with a hierarchical "breadcrumb", which is formed from locations

1602 and 1606 both located above the viewing window 1604. The term "location" is used to refer to non-leaf node TOC descriptors. Within each level of the breadcrumb a user can select to pull down a menu of other contained location options at that level of the breadcrumb.

Figure 17A:
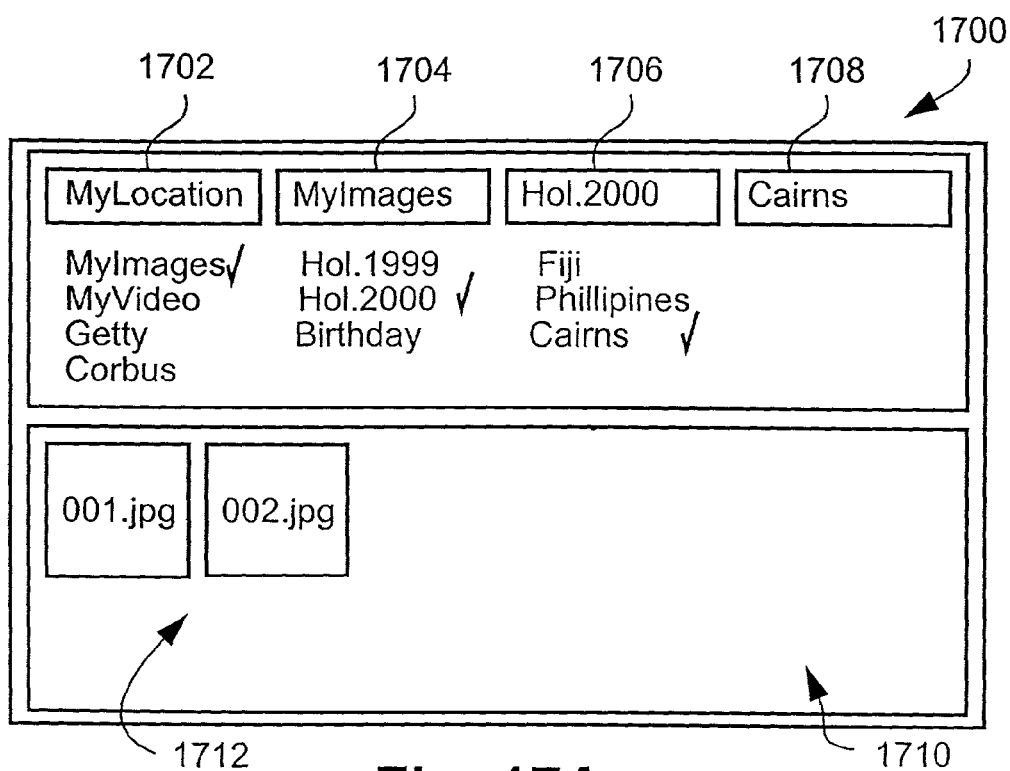
FIGS. 17A and 17B illustrate how "breadcrumb" navigation is used in the interface of FIG. 16.
Figure 17B:
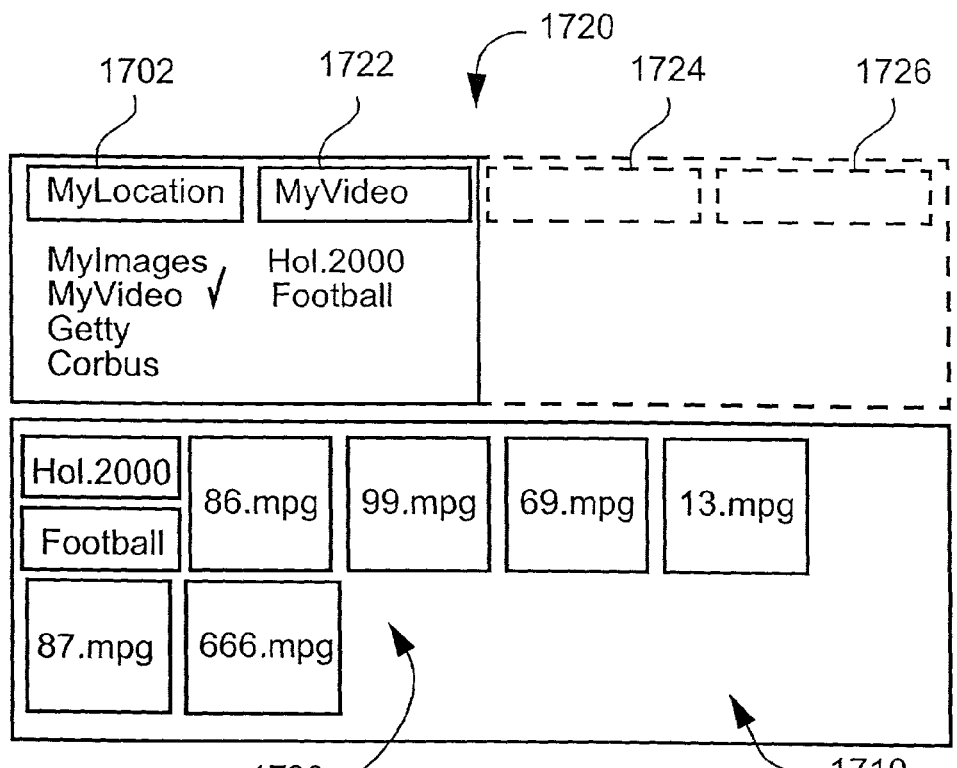

Navigation using the hierarchical breadcrumb is exemplified in FIGS. 17A and 17B. FIG. 17A shows a portion 1700 of the GUI 1600 in which the user's TOC is found under a selectable tab 1702 entitled MyDocuments. When selected the tab 1702 lists the directly contained locations thereunder. Selecting a contained location, by clicking the mouse 903 for example, creates an adjacent list 1704 for the selected location. From FIG. 17A it will be apparent that the user has selected MyImages. Similar selections create new lists in order to reveal two JPEG images taken during a holiday in Cairns in 2000. In FIG. 17A it will be apparent that the ticks (✓) next to each location name indicate the selected path into the data collection thereby providing the user with an appropriate contextual reference for the traversal of the data collection. Where, at any time, the user desires to follow an alternative path into the data collection, any unselected location may be selected thereby revealing the corresponding breadcrumb display. The breadcrumb lists in this regard display only those locations contained in the selected location. A display window 1710 is arranged beneath the lists to display a representation (eg. a thumbnail image) of any TOC items 1712. FIG. 17B shows the result of where the user, from the configuration of FIG. 17A, has selected MyVideo and the navigation display has altered to show those locations having video content. Note that in each of FIG. 17A and FIG. 17B, the subdirectory Hol.2000 is indicated since both the MyImages and MyVideo locations contain a location of that name. As before, further contained locations 1724 and 1726 may be listed upon appropriate selection of items from displayed locations. FIG. 17B shows the display window having items 1730 which are contained in the MyVideo location.

It will be apparent that although this navigation method is described with respect to locations (nodes in an XML description), such may also apply to directories in a file system.

One of the advantages of this navigation approach over a standard tree-based method is that it is simple to exit from one sub-branch and directly enter another without having to navigate up and down along the various branch paths. The other advantage of this navigation method is that such uses very little screen space, which is valuable where screen space is limited, such as with mobile devices. A user can also navigate through his/her TOC using the standard method of simply double clicking on visual identifiers in the viewing window 1606 in order to display child items of the clicked item. Alternatively, previously visited locations can be re-displayed by selecting the desired location in a history list 1608 located to the right of the breadcrumb on the interface in FIG. 16.

The user can define the number of items to display in the viewing window. Often it is desirable to be able to visually present as many items as possible (eg. search results). However if too many items are displayed the content of the items becomes difficult to understand. If a location contains more items than can be viewed in a single window 1606 then a viewing window control 1610 below this window can be used to page through the content. Paging was selected in preference to scrolling because trial users expressed this preference in early useability studies.

The panel on the top left of FIG. 16 is the search panel 1612. Users can select a location from their TOC to be searched. Both simple text-based searches and advanced searches are accommodated to allow the user to select the desired descriptors and their required values. In an advanced search, a user can construct a query by specifying constraints on selected descriptors. In other words, the resulting query is similar to a browsing expression with a filter and can be expressed directly as an XPath location. Although the interface 1600 allows the user to filter search expressions based on content types (eg. image, video and/or audio), the media browser server can represent metadata for any media type. A media type selector is included in the interface to improve the useability of the interface for the target users.

A panel 1614 on the bottom left displays a set of commonly used properties (index descriptors) for the currently selected item in the viewing window. The properties viewed in this panel are predetermined. If the selected descriptor does not contain index descriptors with these descriptor names, and these properties can not be identified by examining the available index descriptors (detecting, for example, other index descriptors which might also have a type date or a similar descriptor name), then no values are displayed.

The panel 1618 on the right hand side of FIG. 16 contains a list of all the current stacks that are open in the interface. Stacks are a user's personalised stores of links to metadata (ie. each item in a stack is just a URI with an optional XPointer). Stacks can be used to store search results, references to favourite images from a set of image libraries or a current work set for another task. Items can be dragged from the viewing window onto any of the open stacks. Stacks are treated like locations and can be opened and viewed in the viewing window. When an opened stack is closed the previous non-stack location is replaced in the viewing window. If a user is finished with a stack they can choose to save the stack for use in a later session. This results in the stack data being saved to the user's personal data.

A shopping trolley icon 1620 at the bottom right of the interface 1600 is just a specialised stack for items for purchase. A "purchase wizard" may be invoked from this icon to facilitate shopping and payment where required. The wizard preferably is able to purchase the content associated with the metadata in the shopping trolley using the user's account with the media browser. In other words, if the content was owned by different content providers, it would not be necessary for the user to have to visit each vendor to purchase those items provided by that vendor.

To implement a media browsing session, using the arrangements described herein, such as the configuration of FIG. 11, a user would typically, using the local computer 1112, run a traditional Internet browsing application, such as NETSCAPE NAVIGAVTOR (trade mark of Netscape Corp. of USA) or INTERNET EXPLORER (trade mark of Microsoft Corp.) in order to manage access to the Internet 1106. Using the Internet browser, the user accesses the media bowser server 1102 which prompts the user to enter a login name and password. When satisfied that the user is authorised for access, the server 1102 launches the media browser application within the local computer 1112 and the user is initially presented with a TOC 1114. Where the user selects "Images" from the TOC 1114, a GUI window 1900 shown in FIG. 18A can be presented where the user has made use of features and icons 1904, 1906 available within a search section 1902 to identify all images 1904, as compared with other media such as audio, video and text, from the users own bookmarked locations 1906. Alternatively, the user may have searched other directories 1908, using keywords 1910, or an advance search 1912, including selectable icons 1914 for each of images, video and audio. A search is commenced by selection of an icon 1916.

Figure 18A:
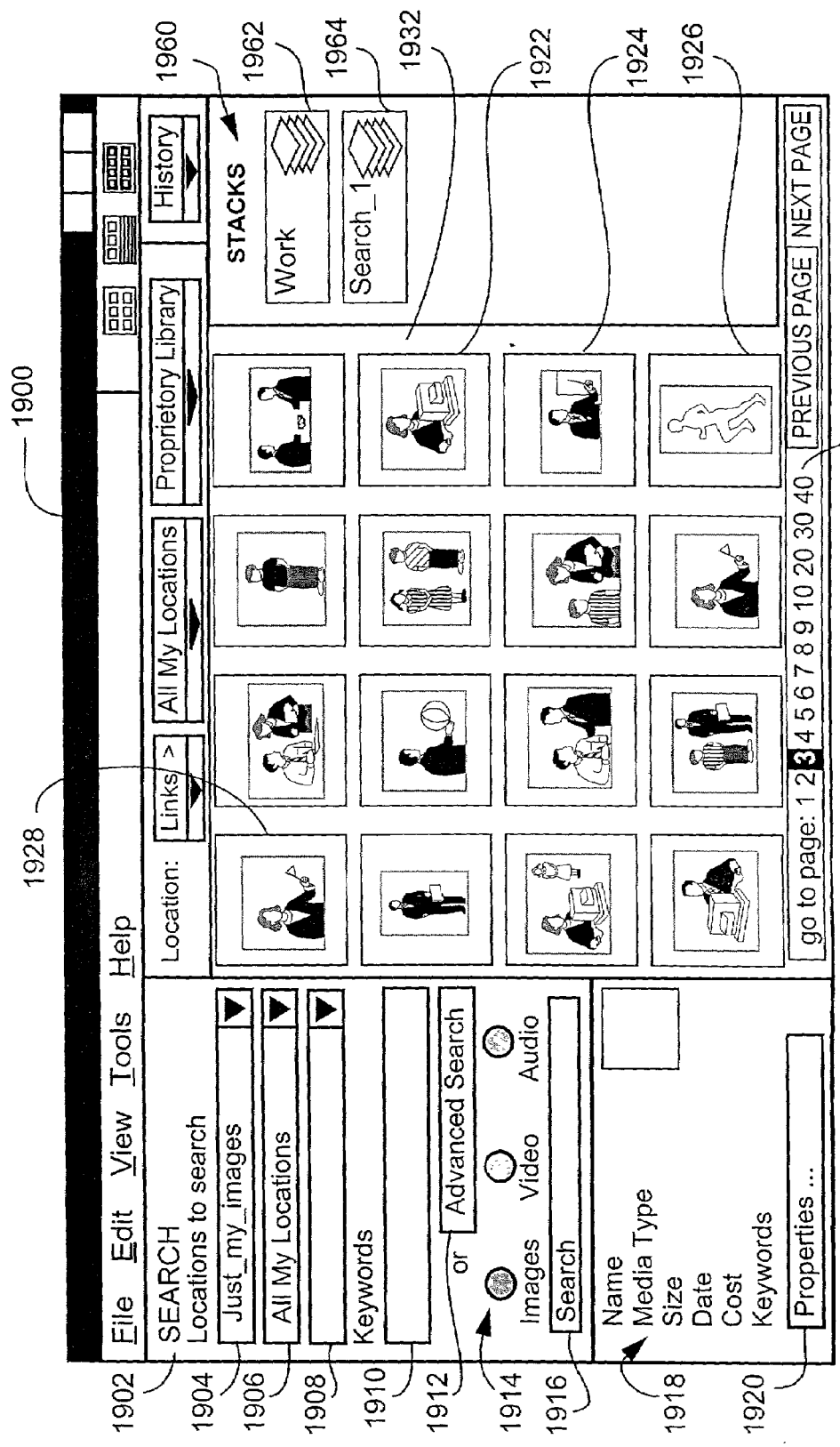
FIGS. 18A to 18D depict system user via a further modified media browser graphical user interface.

In the example of FIG. 18A, the search for the user's own images has returned a number of browser pages of search results, each result be indicated by a thumbnail image 1922, 1924, 1926 etc which is displayed in a main data portion 1932 of the GUI window 1900. The extent of the search result is indicated by a paging bar 1930 which provides for selection of a page of the search result. In this example, the number "3" is highlighted indicating the user is viewing page 3 of the search result. Each thumbnail image 1922, 1924, 1926 etc. represents part of the metadata associated with the real image that may be desired for ultimate viewing, use and/or purchase. Where desired, the user may view detailed information regarding the real image by selecting a "properties" icon 1920, the icon 1920 being located within a properties summary area 1918 in which other metadata associated with the image may, for a selected one of the thumbnails 1922, 1924, 1926, be displayed.

Figure 18B:
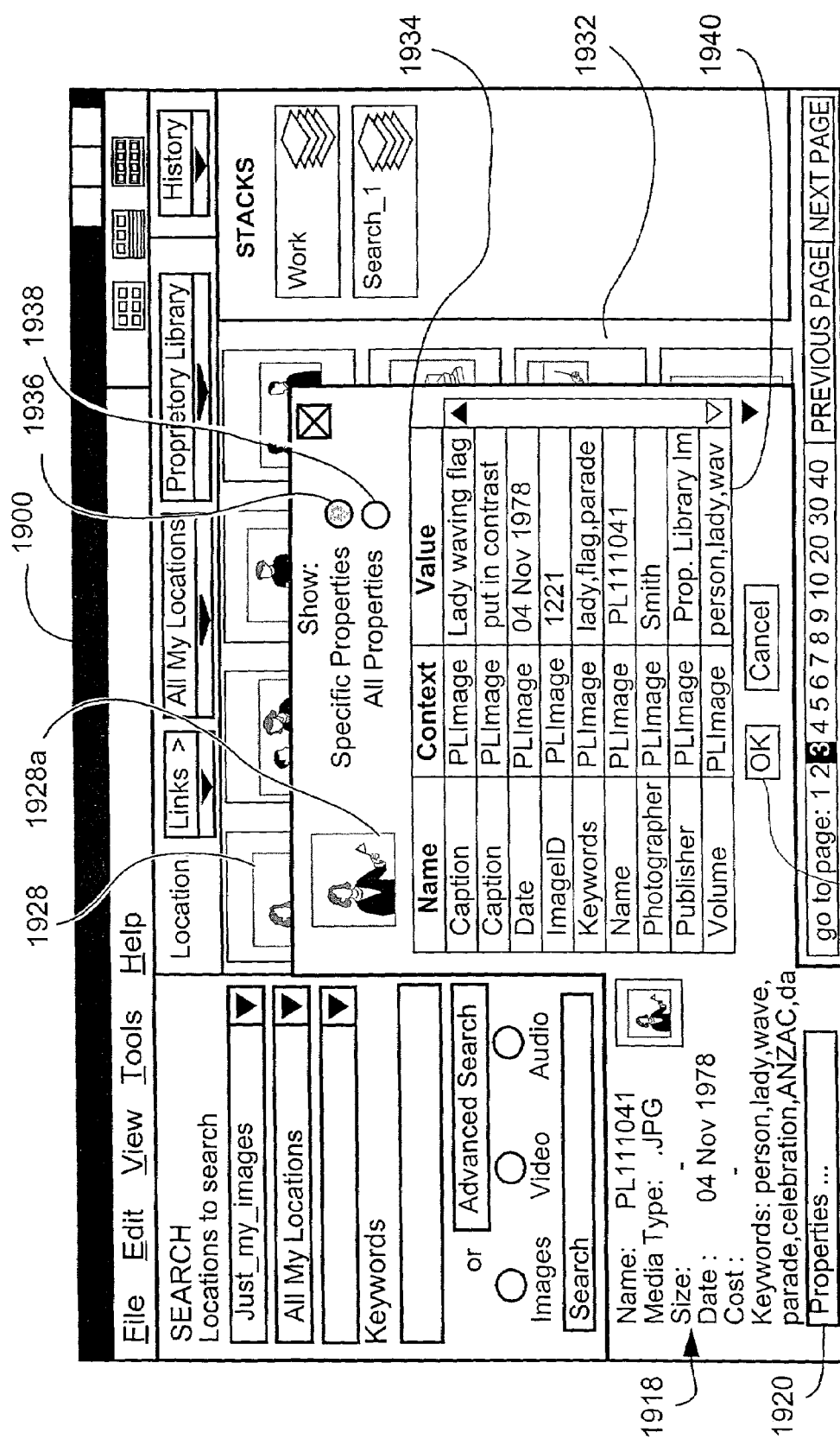

Turning now to FIG. 18B, the user has selected the thumbnail 1928 of FIG. 18A as well as the properties icon 1920. When this occurs, the properties summary area 1918 expands across the browser window 1900, to a large extent occluding many of the thumbnail images displayed in main data portion 1932. The expanded summary portion 1934 includes a representation of the selected thumbnail 1928a and permits the user to select either a view of "Specific Properties" 1936 or "All Properties" 1938 of the selected image. A table 1940 is presented in the expanded summary portion 1934 which contains various categories of information regarding the image including publishing details, keywords associated with the image and the like. In some implementations, certain ones of the entries in the table 1940 may be altered by the user and saved using an "OK" icon 1942 as part of the users TOC or own metadata record. Such may include various captions, or keywords, but would not ordinarily included proprietorship information such as publisher and photographer etc. Such a change alters the properties of the media item.

Figure 18C:
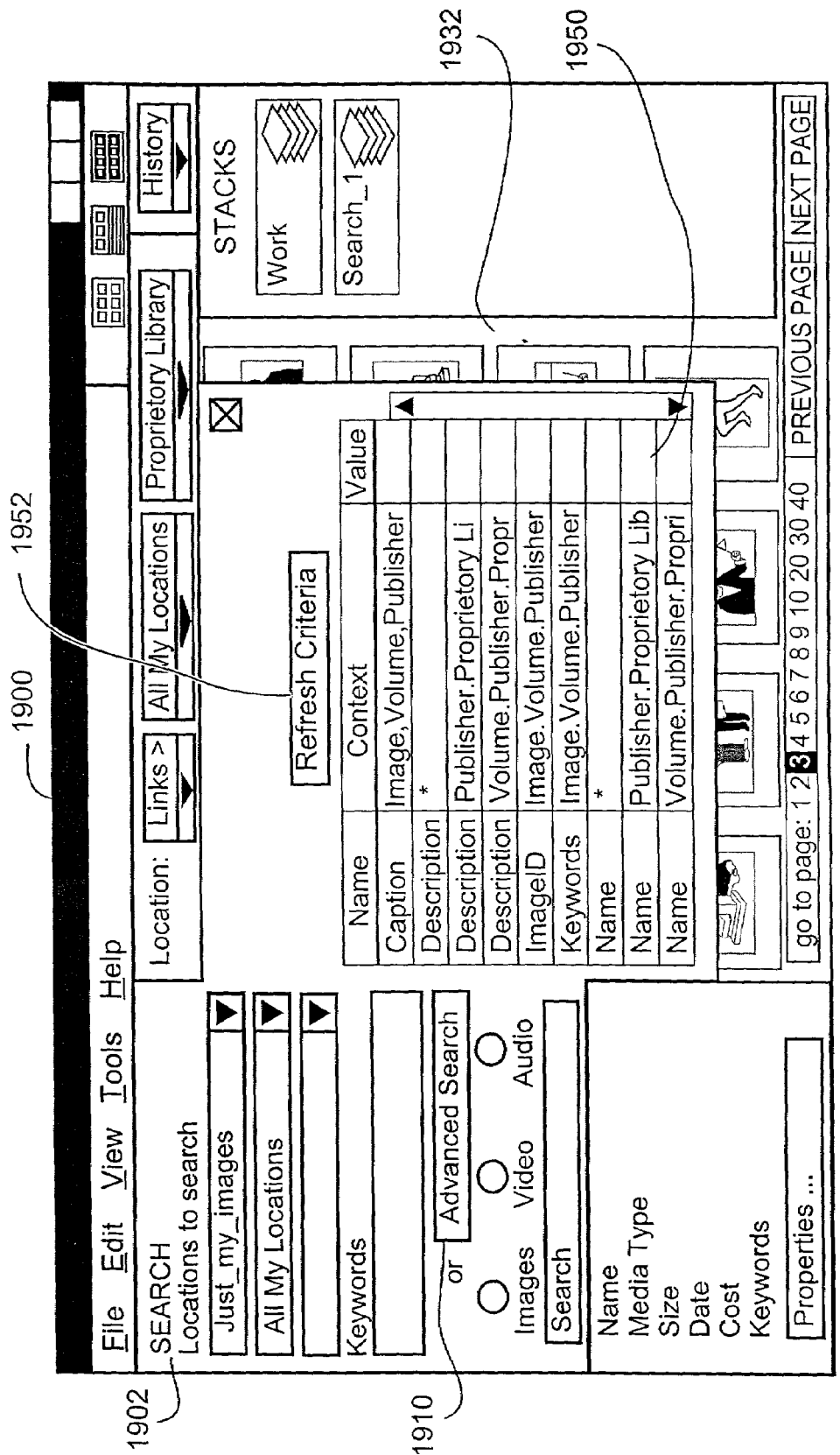

In the situation where the user wishes to search within his own images, rather that obtain the entire set as in FIG. 18A, the "Advance Search" icon 1910 may be selected which, as shown in FIG. 18C, causes the "Search" area 1902 to be expanded, across the main data area 1932, to display a table 1950 of searchable criteria within the expanded search section. The criteria indicated in the table 1950 encompass those that may be present in the properties table 1940 of FIG. 18B. The user may amend values within the table 1950 to adjust the extent of the search result to be obtained, with such being confirmed by selection of a further icon 1952.

Returning to FIG. 18A user may, as desired, select any one or more of the media items in the main portion 1932 (ie. the thumbnails 1922, 1924, 1926 etc. in this example) and drag those items to one of a number of stacks in a stack area 1960. In this fashion, the user can readily create his own media collection arranged, where desired according the user's own sorting scheme. In FIG. 18A, two stacks, 1962 and 1964 are depicted, each of which is formed as a selectable icon. The stack 1964 relates to a previous search result that the user has recorded.

Figure 18D:
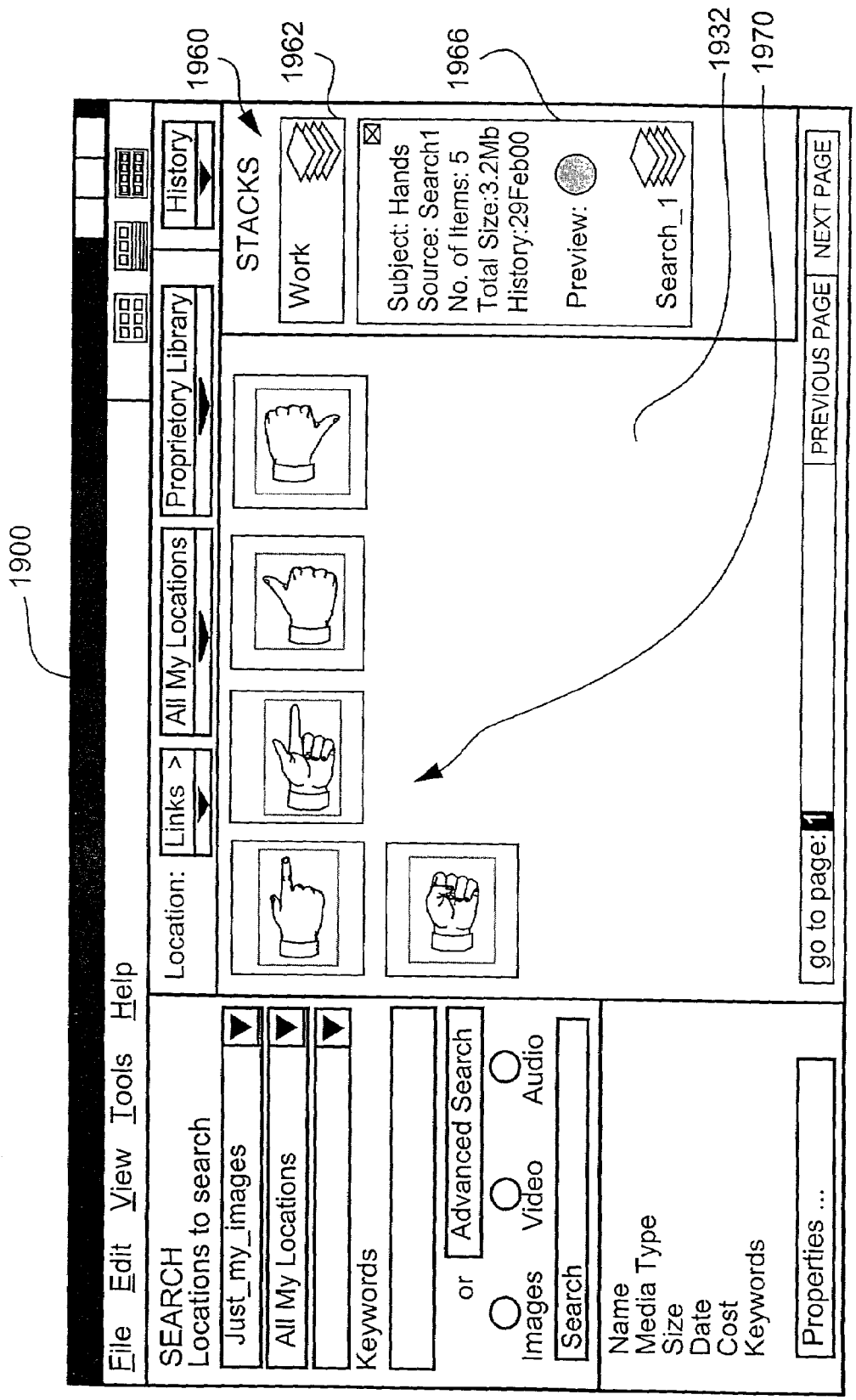

When the stack icon 1964 is selected for opening, as shown in FIG. 18D, the media references recorded within the stack 1964 are displayed in the main data area 1932, in this case a series of thumbnail images 1970 of human hands. When this occurs, as also seen in FIG. 18D, the stack icon 1964 expands within the stack area 1960 to form a summary information component 1966 related to the content of the selected stack which, in this case, is entitled "Search_1". The displayed information may include:

(i) details of the creation of the collection (eg.: as a result of a search and include the query used by the search);

(ii) the number of items and total size of the collection;

(iii) a history of activities performed on collection, such as a logging of when items were added or removed from the stack; and, where appropriate (iv) animated previews of the content of the collection. For example if the stack contained video items (or links to), then summaries of these items could be animated into a collection preview. Such may involve the launching of appropriate preview tools such a media player window or the like.

There exist a number of advantages of displaying this information as part of the collection icon. The advantages include:

(i) making it readily apparent to the user that the displayed information represents properties of the stack collection;

(ii) obviates any need for the user to otherwise specifically select the display of stack summary information; and (iii) the summary information may vary depending upon the manner in which the collection was created. For example, as the stack collection is modified, by addition or deletion for example, the summary information may be automatically updated.

The arrangements of FIGS. 18A to 18D provide ways of automatically showing information about items and collections of items (in this case links to metadata) when the collection is opened for viewing. Unlike prior art arrangements, the information is displayed as part of an expansion of the collection icon, this preferably occurring in an animated fashion when the collection is opened by a user. In contrast, whilst summary information can be shown for items in WINDOWS EXPLORER (Microsoft Corp.), such information is either displayed by either right-clicking the collection item (folder) and the system displaying a properties dialog, or the information is displayed within the browse window which contains the icons of the child items of the collection. With the arrangements of FIGS. 18A to 18D when a user opens a stack (collection), the stack icon expands, and summary information (in addition to the stack name) is displayed in the enlarged area of the stack icon itself.

XIV. Alternative Structured Information Processing System

The description so far has been in reference to browsing and searching using metadata and then accessing associated content. It should be clear to those skilled in the art that many of the features described above also apply if the repository being accessed contains information that is not necessarily linked to particular items of content. For example, the equivalent of a metadata server, called here an information server, may be configured to also accept requests from a process for particular structured information that is stored in a source associated with the information server. The information source, like the metadata repository, may be publicly represented by a schema. The communication between the requesting process and the information server may be configured substantially as described in Section III of this description (ie. browsing and search requests thereby being possible). The result of a request is an XML document that represents structured information. An example of this more general implementation, given at the end of Section V, shows how users may potentially access different patent databases worldwide using a single user interface.

Clearly, the process of making requests of the information servers would operate somewhat differently. For example, the differentiation between TOC and index descriptors may no longer be useful. Instead the main feature of such structured information receiving processes could be to decorously format information from a variety of heterogeneous sources. For such an end objective, the ability to use the previously described advanced search, to selectively identify the information required is very useful. The results of any browsing and searching requests could be presented to the user in various formats depending on the data types involved and using predetermined formats that may or may not have been customised for a particular user.

INDUSTRIAL APPLICABILITY

The arrangements and implementations described above are applicable to the computer and data processing industries and particularly those providing multimedia services. The implementations specifically provide for Internet service providers to add commercial value to the searching services they provide and/or host whilst facilitating the matching of vendors and purchasers of content.

The foregoing describes at least one embodiment of the present invention, and modifications and/or changes can be made thereto without departing from the scope and spirit of the invention, the embodiment(s) being illustrative and not restrictive.

APPENDIX 1

```
<?xml version='1.0'?>
<!-- (C) Copyright Canon Information Systems Research Australia (CISRA) 2000 -->
<!-- All rights reserved -->
<!-- Source description for transformation example in Fig 15 -->
<VideoDocument
    DC.Title = 'Survival of the Platypus'
    DC.Creator = 'John Smith'
    DC.Subject = 'Australian Wildlife'
    DC.Type = 'Digital Video'
    href = 'http://www.cisra.com.au/MediaBrowser/examples/content/AusWild883.mpg'>
    <Scene
        DC.Identifier = 'Scene 1'
        DC.Description = 'Taronga Park Zoo'
        DC.Coverage.T.Start = '2:05.00'
        DC.Coverage.T.End = '5:10.25'>
        <Shot
            DC.Identifier = 'Shot 1'
            DC.Description = 'Mature male platypus'
            DC.Coverage.T.Start = '2:05.00'
            DC.Coverage.T.End = '2:55.20'
            keyFrame = 'http://www.cisra.com.au/MediaBrowser/examples/content
                        /AusWild883_KF1.jpg'>
            <Frame
                DC.Identifier = 'Frame 1'
                DC.Description = 'Key Frame'/>
            <Frame
                DC.Identifier = 'Frame 2'
                DC.Description = 'Description of Frame 2'/>
            <Frame
                DC.Identifier = 'Frame 3'
                DC.Description = 'Description of Frame 3'/>
        </Shot>
        <Shot
            DC.Identifier = 'Shot 2'
            DC.Description = 'Zoo habitat'
            DC.Coverage.T.Start = '2:55.24'
            DC.Coverage.T.End = '4:02.10'
            keyFrame =
'http://www.cisra.com.au/MediaBrowser/examples/content/AusWild883_KF2.jpg'>
        </Shot>
        <Shot
            DC.Identifier = 'Shot 3'
            DC.Description = 'Interaction with humans'
            DC.Coverage.T.Start = '4:02.14'
            DC.Coverage.T.End = '5:10.25'
            keyFrame = 'http://www.cisra.com.au/MediaBrowser/examples/content
                        /AusWild883_KF3.jpg'>
        </Shot>
    </Scene>
    <Scene
        DC.Identifier = 'Scene 2'
        DC.Description = 'Natural habitat'
        DC.Coverage.T.Start = '7:15.25'
        DC.CoverageT.End = '3:05.20'>
    </Scene>
```

APPENDIX 1-continued

```
    <Scene
        DC.Identifier = 'Scene 3'
        DC.Description = 'Mating scene'
        DC.Coverage.T.Start = '10:20.45'
        DC.Coverage.T.End = '2:02.05'>
    </Scene>
<VideoDocument>
```

APPENDIX 2

```
<?xml version='1.0'?>
<!-- (C) Copyright Canon Information Systems Research Australia
(CISRA) 2000 -->
<!-- All rights reserved -->
<!-- XSLT 1.0 -->
<xsl:stylesheet
    xmlns:xsl='http://www.w3.org/1999/XSL/Transform'
    xmlns:mb = 'http://www.cisra.com.au/MediaBrowser'
    xmlns:xlink ='http://www.w3.org/1999/xlink'
    version = '1.0'>
<xsl:output
    method = 'xml'
    version = '1.0'
    standalone = 'yes'
    indent = 'yes'/>
<xsl:template match = 'VideoDocument'>
    <VideoDocument
        xmlns:mb = 'http://cisra.com.au/MediaBrowser'
        xmlns:xlink = 'http://www.w3.org/1999/xlink'
        mb:descriptorType = 'TOC'
        mb:textualIdentifier = '{@DC.Title}'
        mb:updateable = 'false'
        xlink:type = 'simple'
        xlink:role = 'resource'
        xlink:href = '{@href}'>
        <DC.Title
            mb:descriptorType = 'Index'
            mb:textualIdentifier = 'Title'>
            <xsl:value-of select = '@DC.Title'/>
        </DC.Title>
        <DC.Creator
            mb:descriptorType = 'Index'
            mb:textualIdentifier = 'Creator'>
            <xsl:value-of select = '@DC.Creator'/>
        </DC.Creator>
        <DC.Subject
            mb:descriptorType = 'Index'
            mb:textualIdentifier = 'Subject'>
            <xsl:value-of select = '@DC.Subject'/>
        </DC.Subject>
        <DC.Type
            mb:descriptorType = 'Index'
            mb:textualIdentifier = 'Type'>
            <xsl:value-of select = '@DC.Type'/>
        </DC.Type>
        <!-- Now push all scene children -->
        <xsl:apply-templates select = 'Scene'/>
    </VideoDocument>
</xsl:template>
<xsl:template match = 'Scene'>
    <Scene
        mb:descriptorType = 'TOC'
        mb:textualIdentifier = '{@DC.Identifier}'
        mb:id = '{@DC.Identifier}'
        xlink:role = 'resource'
        xlink:href = '{//VideoDocument/@href}#avptr(time::{@DC.
                Coverage.T.Start},{@DC.Coverage.T.End})'>
        <DC.Description
            mb:descriptorType = 'Index'
            mb:textualIdentifier = 'Description'>
            <xsl:value-of select = '@DC.Description'/>
        </DC.Description>
        <!-- Now push all scene children -->
        <xsl:apply-templates select = 'Shot'/>
    </Scene>
</xsl:template>
```

APPENDIX 2-continued

```
<xsl:template match = 'Shot'>
    <Shot
        mb:descriptorType = 'TOC'
        mb:visualIdentifier = '{@keyFrame}'
        mb:id = '{@DC.Identifier}'
        xlink:role = 'resource'
        xlink:href = '{//VideoDocument/@href}#avptr(time::{@
                DC.Coverage.T.Start},{@DC.Coverage.T.
                End})'>
        <DC.Description
            mb:descriptorType = 'Index'
            mb:textualIdentifier = 'Description'>
            <xsl:value-of select = '@DC.Description'/>
        </DC.Description>
    </Shot>
</xsl:template>
</xsl:stylesheet>
```

The claims defining the invention are as follows:

1. A method of transferring a media browsing session, said method comprising the steps of:
   (a) establishing via a first device a media browsing session upon the first device and sourced via a media browsing server;
   (b) detecting user actuation of a control on the first device to cause the first device to:
      (i) transfer to a second device a session identifier and a key for decoding the media associated with the media browsing session;
      (ii) receive from the second device an identification thereof known to the media browsing server; and
      (iii) transfer the received identification of the second device to the media browsing server; and
   (c) the media browsing server thereby terminating an output of the media browsing session to the first device and directing the output of the media session to the second device and modifying a quality of service of the media browsing session dependent upon reproduction attributes of the second device.

2. A method according to claim 1, wherein the modifying alters the media browsing session from a form reproducible by the first device to a form reproducible by the second device.

3. A method according to claim 1, wherein a quality of reproduction of the media browsing session is limited by reproduction attributes of the second device to be no better than those of the first device.

4. A method according to claim 1, wherein, when the second device offers a higher quality of reproduction of the media browsing session than that of the first device, and step (c) comprises a commercial transaction to enable the modifying.

5. A method according to claim 1, wherein the media browsing session is originated at a selected quality of service and reproduction of the media browsing session on each device is performed at a maximum quality of service afforded by that corresponding device and no reproduction is better than the selected quality of service.

6. A method according to claim 1, wherein the devices are selected from a group consisting of: a desktop computer, a portable computer, a mobile telephone, and a mobile sound reproduction apparatus.

7. A method according to claim 1 wherein step (c) further comprises the steps of:
 (i) the second device renegotiating the media browsing session with the media browsing server according to at least one attribute of the second device;
 (ii) establishing a handover time at which transfer of the media browsing session is to occur from the first device to the second device; and
 (iii) performing the transfer at the handover time.

8. A method according to claim 7 wherein one said attribute comprises a price of reproduction of the media browsing session upon the second device.

9. A computer readable medium having a computer program recorded thereon and adapted to make a first device transfer a media browsing session, said program comprising:
 code for establishing a media browsing session upon the first device and sourced via a media browsing server; and
 code for detecting user actuation of a control on the first device to cause the first device to:
  (i) transfer to a second device a session identifier and a key for decoding the media associated with the media browsing session;
  (ii) receive from the second device an identification thereof known to the media browsing server; and
  (iii) transfer the received identification of the second device to the media browsing server;
 the media browsing server thereby terminating an output of the media browsing session to the first device and directing the output of the media session to the second device and modifying a quality of service of the media browsing session dependent upon reproduction attributes of the second device.

10. A multimedia reproduction device comprising:
 means for establishing a media browsing session upon the multimedia reproduction device and sourced via a media browsing server; and
 means for detecting user actuation of a control on the multimedia reproduction device to cause the multimedia reproduction device to:
  (i) transfer to a further multimedia reproduction device a session identifier and a key for decoding the media associated with the media browsing session;
  (ii) receive from the further multimedia reproduction device an identification thereof known to the media browsing server; and
  (iii) transfer the received identification of the further multimedia reproduction device to the media browsing server;
 the media browsing server thereby terminating an output of the media browsing session to the original multimedia reproduction device and directing the output of the media session to the further multimedia reproduction device and modifying a quality of service of the media browsing session dependent upon reproduction attributes of the further multimedia reproduction device.

* * * * *

UNITED STATES PATENT AND TRADEMARK OFFICE
CERTIFICATE OF CORRECTION

PATENT NO. : 7,099,946 B2
APPLICATION NO. : 09/986809
DATED : August 29, 2006
INVENTOR(S) : Alison Joan Lennon et al.

It is certified that error appears in the above-identified patent and that said Letters Patent is hereby corrected as shown below:

TITLE PAGE:
Item (73) Assignee: "Canon Kabushiki Kaishsa, Tokyo (JP)" should read
-- Canon Kabushiki Kaisha, Tokyo (JP) --.

COLUMN 3:
Line 27, "links" (first occurrence) should read -- links to --; and
Line 37, "from" should read -- from a --.

COLUMN 4:
Line 4, insert two spaces before "(i) transfer";
Line 37, "and" should read -- an --;
Line 38, "by the for" should read -- by the --;
Line 52, "switch" should read -- switched --;
Line 53, "depicts" should read -- depict --;
Line 55, "arrangement," should read -- arrangement; --; and
Line 60, "depict a system user via" should read -- depict --.

COLUMN 5:
Line 23, "may" should read -- may be --;
Line 25, "and to" should read -- to --;
Line 34, "part" should read -- parts --;
Line 47, "a" should read -- an --;
Line 57, delete "are" (second occurrence); and
Line 64, "a" should read -- an --.

COLUMN 10:
Line 12, "system." should read -- system). --;
Line 16, "(ie. visuali-" should read -- (i.e., visualI- --; and
Line 18, "(ie. textidentifer" should read -- (i.e., textIdentifier --.

COLUMN 11:
Line 5, "xmins" should read -- xmlns.

COLUMN 15:
Line 61 and 66, "visualidentifier" should read -- visualIdentifier --; and
Lines 62 and 67, "textidentifier" should read -- textIdentifier.

UNITED STATES PATENT AND TRADEMARK OFFICE
CERTIFICATE OF CORRECTION

PATENT NO. : 7,099,946 B2
APPLICATION NO. : 09/986809
DATED : August 29, 2006
INVENTOR(S) : Alison Joan Lennon et al.

It is certified that error appears in the above-identified patent and that said Letters Patent is hereby corrected as shown below:

COLUMN 16:
Line 10, "provided" should read -- provide --;
Line 15, "visualidentifier" should read -- visualIdentifier --;
Line 30, "audiovi-" should read -- audio-vi- --; and
Line 33, "audio visual" should read -- audio-visual --.

COLUMN 22:
Line 12, delete "an".

COLUMN 23:
Example G, "60. element name = 'Image'>" should read
-- 60. <element name = 'Image'> --;
Example G, "96. simpleContent>" should read -- 96. <simpleContent> --.

COLUMN 26:
Line 13, "of" (second occurrence) should read -- of a --;
Line 17, "visualidentifier" should read -- visualIdentifier --;
Line 23, "visualiden-" should read -- visualIden- --; and
Line 27, "textidentifier" should read -- textIdentifier.

COLUMN 27:
Example I, "17. textIdentifier = 'Hockey" should read
-- 17. textIdentifier = 'Hockey' --.

COLUMN 29:
Line 20, "an" should read -- in --.

COLUMN 30:
Line 62, "% 20." should read -- %20. --.

COLUMN 31:
Line 5, "request D" should read -- requestID --;

COLUMN 32:
Line 23, "(eg. textidentifier" should read -- (e.g., textIdentifier --.

COLUMN 35:
Line 32, "tool" should read -- tools --; and
Line 44, "and to" should read -- to --.

UNITED STATES PATENT AND TRADEMARK OFFICE
CERTIFICATE OF CORRECTION

PATENT NO. : 7,099,946 B2
APPLICATION NO. : 09/986809
DATED : August 29, 2006
INVENTOR(S) : Alison Joan Lennon et al.

It is certified that error appears in the above-identified patent and that said Letters Patent is hereby corrected as shown below:

COLUMN 37:
Line 48, "to" should read -- to the --;

COLUMN 39:
Line 15, "with" should read -- with the --;
Line 17, "using" should read -- using a --;

COLUMN 43:
Line 11, "mation," should read -- mation --.

COLUMN 45:
Line 19, "sessions" should read -- session --; and
Line 36, "appreciated" should read -- appreciated that --.

COLUMN 46:
Line 21, "owner" should read -- own --; and
Line 46, "filesystems)" should read -- file systems) --.

COLUMN 48:
Line 16, "panelare" should read -- panel are --;
Line 51, "NAVIGAVTOR" should read -- NAVIGATOR --;
Line 55, "bowser" should read -- browser --; and
Line 65, "users" should read -- user's --.

COLUMN 49:
Line 5, "be" should read -- being --;
Line 6, "1926 etc" should read -- 1926, etc. --;
Line 12, "1926 etc." should read -- 1926, etc. --;
Line 37, "included" should read -- include --;
Line 41, "that" should read -- than --;
Line 51, "FIG. 18A" should read -- FIG. 18A the --;
Line 53, "1926 etc." should read -- 1926, etc. --;
Line 56, "arranged," should read -- arranged --; and
Line 56, "according" should read -- according to --.

UNITED STATES PATENT AND TRADEMARK OFFICE
CERTIFICATE OF CORRECTION

PATENT NO. : 7,099,946 B2
APPLICATION NO. : 09/986809
DATED : August 29, 2006
INVENTOR(S) : Alison Joan Lennon et al.

It is certified that error appears in the above-identified patent and that said Letters Patent is hereby corrected as shown below:

COLUMN 50:
Line 9, "appropriate" should read -- appropriate, --; and
Line 14, "such" should read -- such as --.

Signed and Sealed this

Twelfth Day of June, 2007

JON W. DUDAS
*Director of the United States Patent and Trademark Office*